(12) United States Patent
Oshita

(10) Patent No.: US 7,227,700 B2
(45) Date of Patent: Jun. 5, 2007

(54) WIDE ZOOM LENS SYSTEM

(75) Inventor: Koichi Oshita, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/225,093

(22) Filed: Sep. 14, 2005

(65) Prior Publication Data

US 2006/0056047 A1    Mar. 16, 2006

(30) Foreign Application Priority Data

Sep. 15, 2004  (JP)  ............... 2004-268954
Aug. 29, 2005  (JP)  ............... 2005-248136

(51) Int. Cl.
*G02B 15/14*    (2006.01)

(52) U.S. Cl. ............... 359/689; 359/676; 359/691; 359/900

(58) Field of Classification Search ............... 359/676, 359/689, 691, 900
See application file for complete search history.

(56) References Cited

U.S. PATENT DOCUMENTS

| 6,124,984 | A  | 9/2000 | Shibayama et al. |
| 6,771,430 | B2 | 8/2004 | Obama |
| 6,771,433 | B2 | 8/2004 | Ohashi |
| 6,870,688 | B2 | 3/2005 | Obama |
| 2005/0013015 | A1 | 1/2005 | Sensui |

FOREIGN PATENT DOCUMENTS

| JP | 11-23967     | 1/1999 |
| JP | 11-23967 A   | 1/1999 |
| JP | 2003-107348  | 4/2003 |
| JP | 2003-107348 A| 4/2003 |
| JP | 2003-107352  | 4/2003 |
| JP | 2003-107352 A| 4/2003 |

*Primary Examiner*—Ricky Mack
*Assistant Examiner*—Darryl J. Collins
(74) *Attorney, Agent, or Firm*—Miles & Stockbridge PC

(57) ABSTRACT

Providing a wide zoom lens system having a wide angle of view in the wide-angle end state and a high speed aperture ratio suitable for a solid-state imaging device with securing high optical performance. The system includes, in order from an object, a first lens group having negative refractive power and a second lens group having positive refractive power. The first lens group includes, in order from the object, a negative meniscus lens having convex surface facing to the object, a negative lens, and a positive lens having convex surface facing to the object. The second lens group includes, in order from the object, a positive lens, and a negative lens. At least one surface of the negative meniscus lens of the first lens group is composed of an aspherical surface. Zooming is carried out by changing a distance between the first and second lens groups. Given conditions are satisfied.

21 Claims, 63 Drawing Sheets

FIG. 2
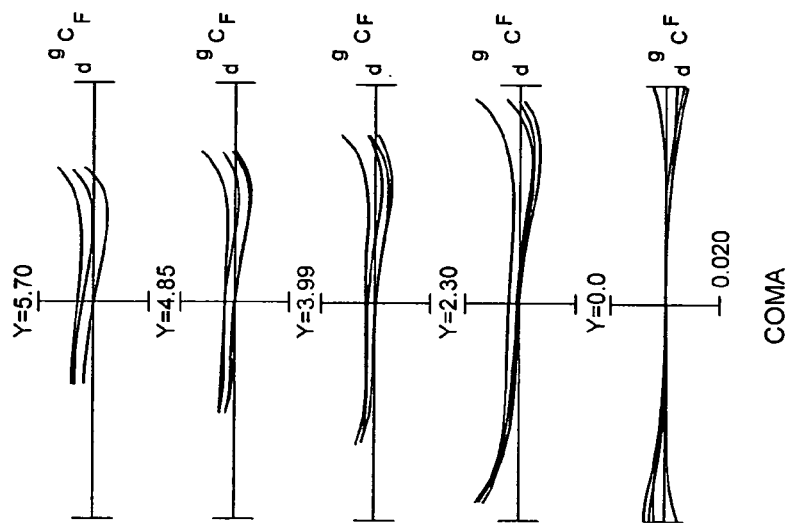
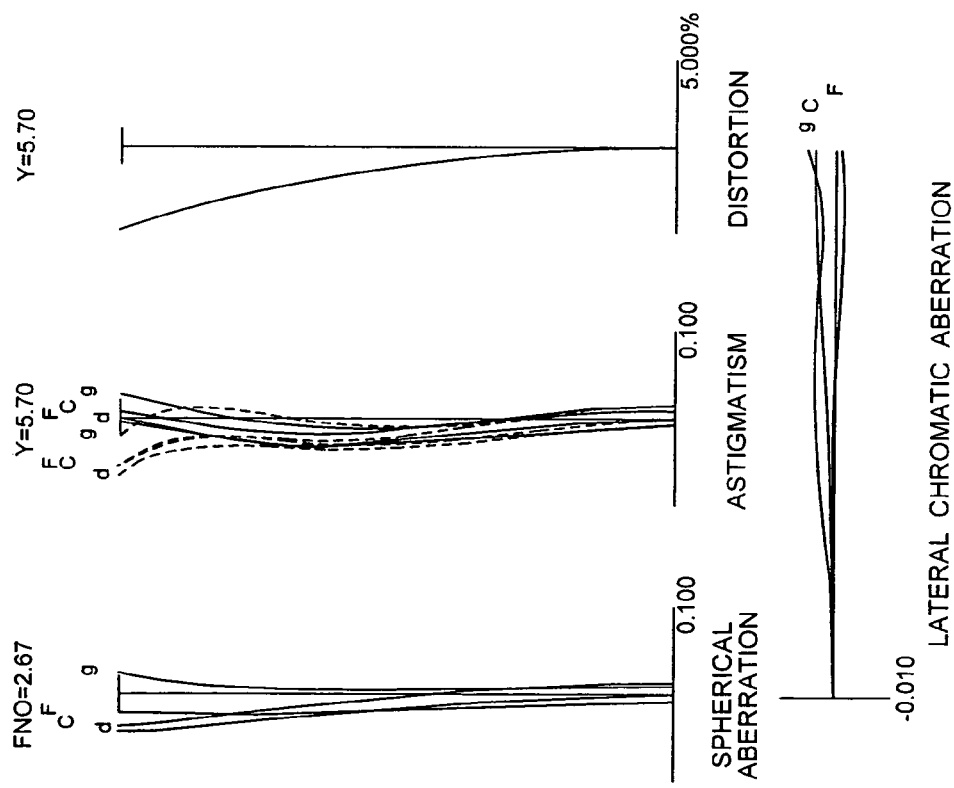

FIG. 5
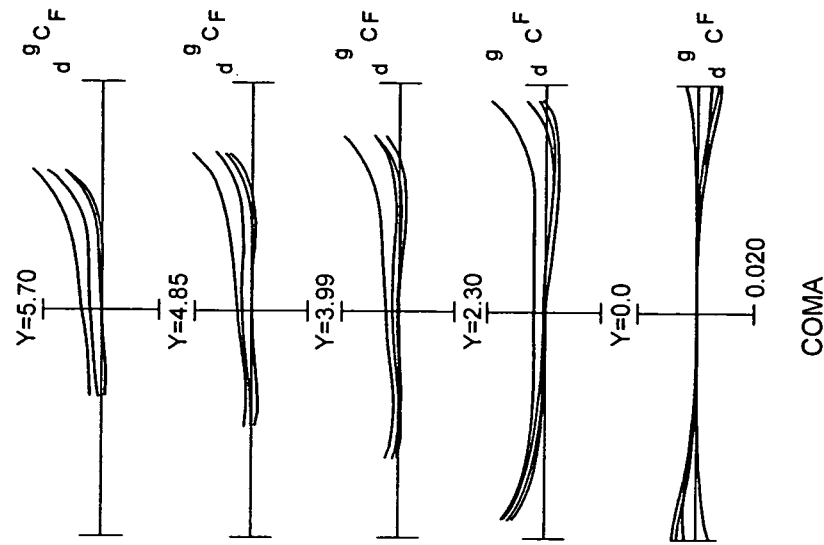
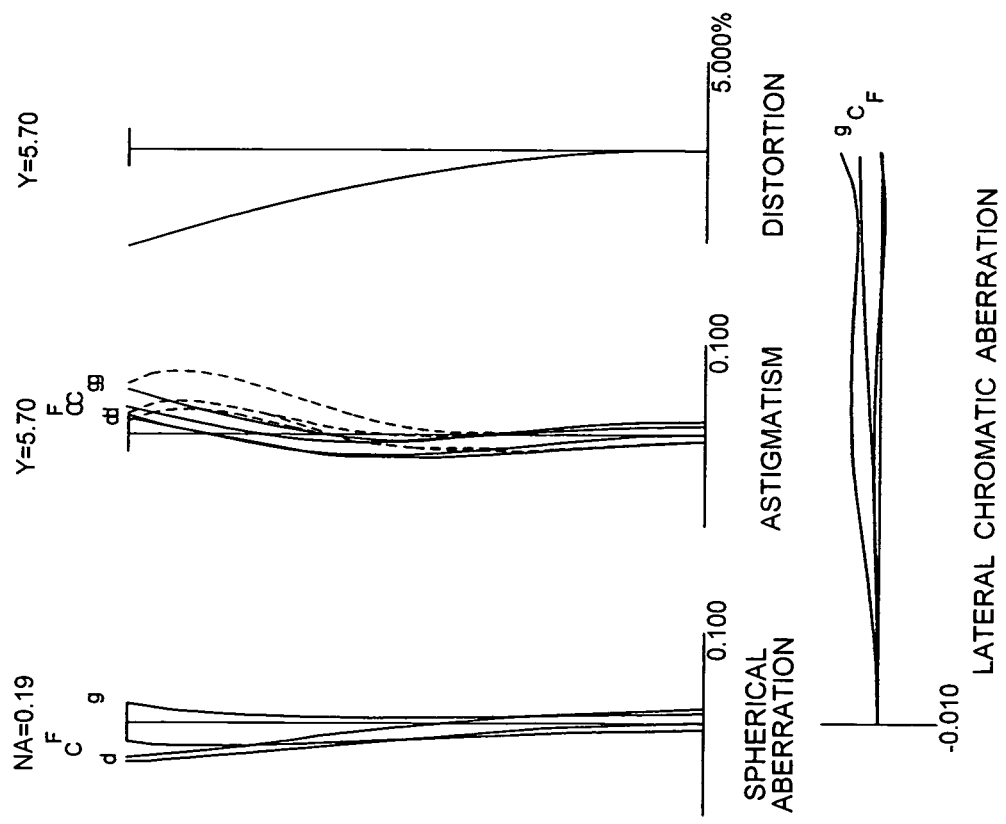

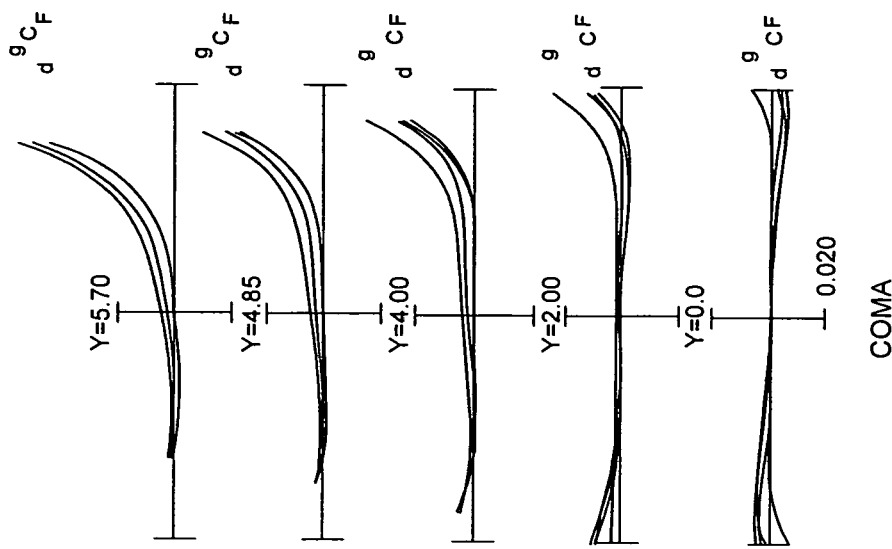
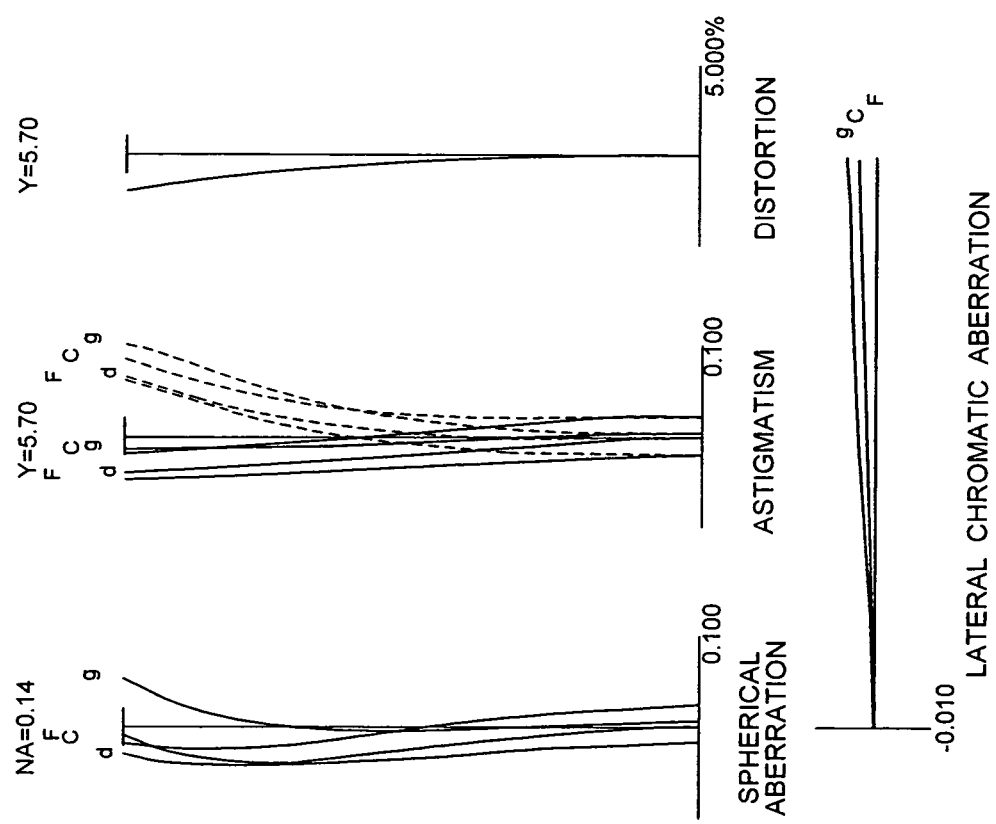
FIG. 20

FIG. 37
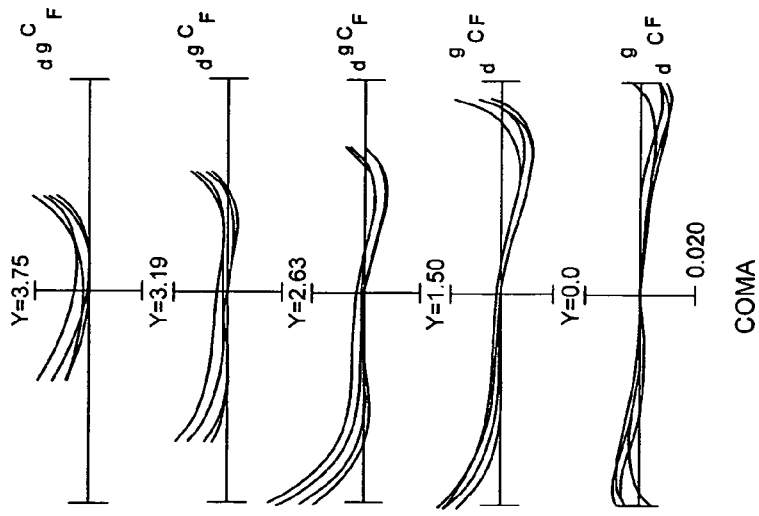
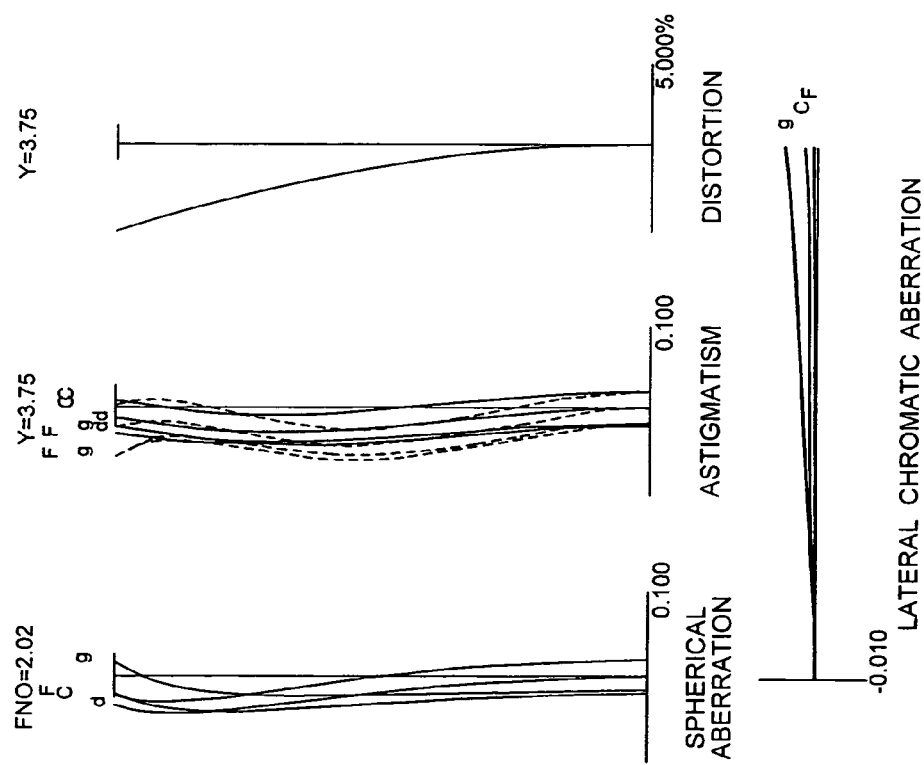

FIG. 42
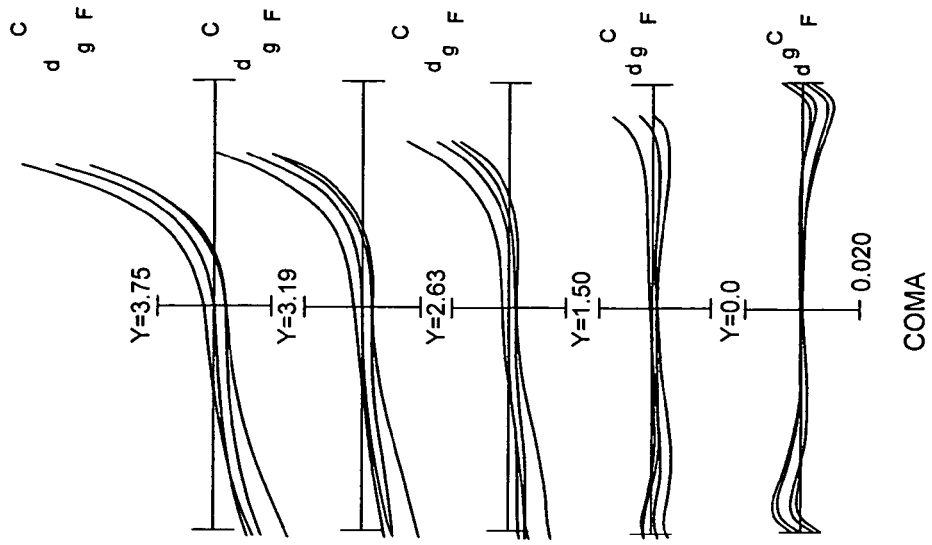
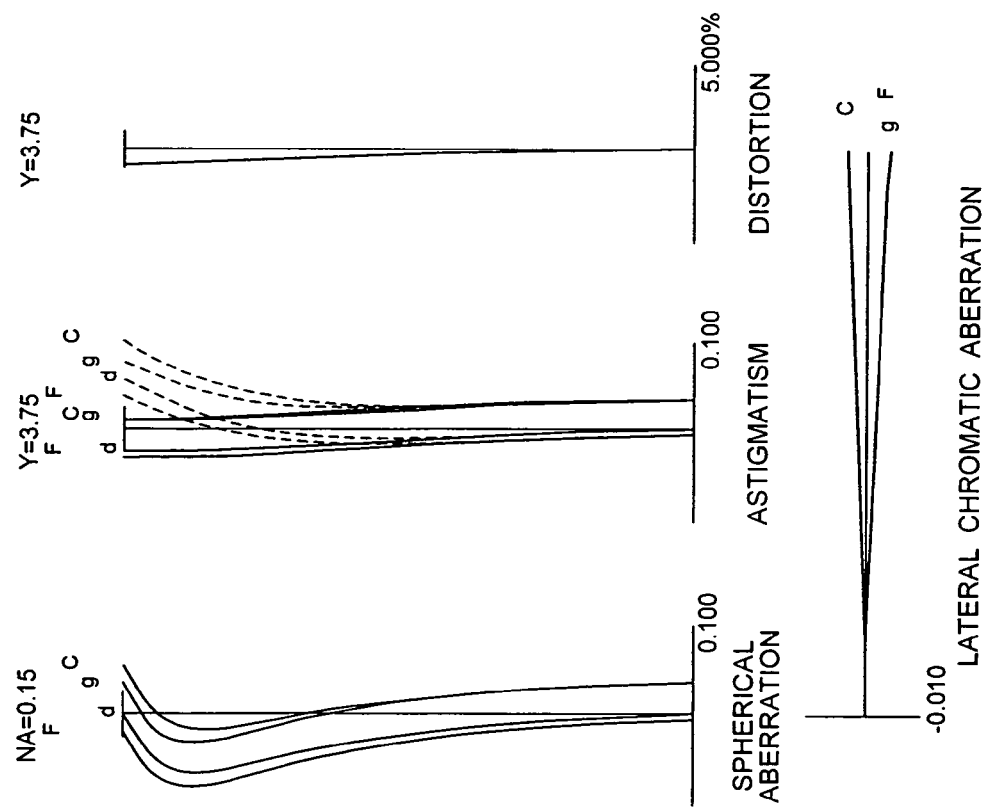

WIDE ZOOM LENS SYSTEM

The disclosure of the following priority applications are herein incorporated by reference:

Japanese Patent Application No. 2004-268954 filed on Sep. 15, 2004 and

Japanese Patent Application No. 2005-248136 filed on Aug. 29, 2005.

BACKGROUND OF THE INVENTION

1. Field of the Invention

The present invention relates to a wide zoom lens system suitable for a still camera and a digital camera.

2. Related Background Art

A so-called digital still camera using a solid-state imaging device such as a CCD has recently gained in popularity in place of a film camera. Accordingly, zoom lens systems having a zoom ratio of about three suitable for a solid-state imaging device have been proposed in Japanese Patent Application Laid-Open Nos. 11-23967, 2003-107348, and 2003-107352.

However, the zoom lens system proposed in Japanese Patent Application Laid-Open No. 11-23967 has an angle of view in the wide-angle end state of about 60 degrees, so that it has not met expectations to have a wider angle of view.

In order to solve this, the zoom lens systems proposed in Japanese Patent Application Laid-Open Nos. 2003-107348, and 2003-107352 have been known. However, they have an angle of view in the wide-angle end state of about 80 degrees and f-number in the wide-angle end state of about 2.7, so that they have not been sufficient in both ways of a wide angle of view and a high speed aperture ratio.

SUMMARY OF THE INVENTION

The present invention is made in view of the aforementioned problems and has an object to provide a wide zoom lens system capable of being a wide angle of view in the wide-angle end state and a high speed aperture ratio suitable for a solid-state imaging device with securing high optical performance.

According to a first aspect of the present invention, a wide zoom lens system includes, in order from an object, a first lens group having negative refractive power, and a second lens group having positive refractive power. The first lens group includes, in order from the object, a negative meniscus lens having a convex surface facing to the object, a negative lens, and a positive lens having a convex surface facing to the object. The second lens group includes, in order from the object, a positive lens, and a negative lens. At least one surface of the negative meniscus lens in the first lens group is composed of an aspherical surface. The focal length is varied by changing a distance between the first lens group and the second lens group, and the negative lens in the first lens group is satisfied with the following conditional expressions (1A) and (1B):

$$67 < \nu 12 \tag{1A}$$

$$2.05 < n12 + 0.007 \times \nu 12 \tag{1B}$$

where ν12 denotes Abbe number of the negative lens in the first lens group at d-line (λ=587.6 nm), and n12 denotes refractive index of the negative lens in the first lens group at d-line (λ=587.6 nm).

In the first aspect of the present invention, the negative meniscus lens in the first lens group preferably satisfies the following conditional expressions (2) and (3):

$$1.69 < n11 < 1.90 \tag{2}$$

$$2.29 < n11 + 0.012 \times \nu 11 < 2.39 \tag{3}$$

where n11 denotes refractive index of the negative meniscus lens in the first lens group at d-line (λ=587.6 nm), and ν11 denotes Abbe number of the negative meniscus lens in the first lens group at d-line (λ=587.6 nm).

In the first aspect of the present invention, it is preferable that a third lens group having positive refractive power is disposed to the image side of the second lens group, focusing is carried out by moving the third lens group along the optical axis, and the following conditional expressions (4), (5), and (6) are preferably satisfied:

$$-1.3 < f2/f1 < -0.9 \tag{4}$$

$$1.5 < f3/f2 < 2.5 \tag{5}$$

$$0.3 < D23W/f2 < 0.6 \tag{6}$$

where f1 denotes the focal length of the first lens group, f2 denotes the focal length of the second lens group, f3 denotes the focal length of the third lens group, and D23W denotes a distance between the second lens group and the third lens group in the wide-angle end state.

In the first aspect of the present invention, the following conditional expressions (7) and (8) are preferably satisfied:

$$28 < \nu 13 < 35 \tag{7}$$

$$1.79 < n13 \tag{8}$$

where ν13 denotes Abbe number of the positive lens in the first lens group at d-line (λ=587.6 nm), and n13 denotes refractive index of the positive lens in the first lens group at d-line (λ=587.6 nm).

In the first aspect of the present invention, the following conditional expression (9) is preferably satisfied:

$$0.3 < f1/r12A < 1 \tag{9}$$

where r12A denotes a radius of curvature of the object side surface of the negative lens in the first lens group.

In the first aspect of the present invention, it is preferable that the second lens group includes, in order from the object, the positive lens disposed to the most object side, the negative lens, and a positive lens disposed to the most image side, at least one surface of the positive lens disposed to the most object side is composed of an aspherical surface, and the following conditional expressions (10A) and (10B) are preferably satisfied:

$$67 < \nu 25 \tag{10A}$$

$$2.05 < n25 + 0.007 \times \nu 25 \tag{10B}$$

where ν25 denotes Abbe number of the positive lens disposed to the most image side at d-line (λ=587.6 nm), and n25 denotes refractive index of the positive lens disposed to the most image side at d-line (λ=587.6 nm).

In the first aspect of the present invention, the following conditional expressions (11) and (12) are preferably satisfied:

$$28 < \nu 23 < 42 \quad (11)$$

$$1.75 < n23 \quad (12)$$

where ν23 denotes Abbe number of the negative lens in the second lens group at d-line (λ=587.6 nm), and n23 denotes refractive index of the negative lens in the second lens group at d-line (λ=587.6 nm).

According to a second aspect of the present invention, a wide zoom lens system includes, in order from an object, a first lens group having negative refractive power, a second lens group having positive refractive power and a third lens group having positive refractive power. The first lens group includes, in order from the object, a negative meniscus lens having a convex surface facing to the object, a negative lens, and a positive lens having a convex surface facing to the object. The second lens group includes, in order from the object, a positive lens disposed to the most object side, a cemented lens constructed by a positive lens cemented with a negative lens, and a positive lens disposed to the most image side. At least one surface of the negative meniscus lens in the first lens group and at least one surface of the positive lens disposed to the most object side of the second lens group are composed of respective aspherical surfaces. The focal length is varied by changing a distance between the first lens group and the second lens group. Focusing is carried out by moving the third lens group along the optical axis, and the following conditional expressions (2), (1A), (1B), (10A) and (10B) are satisfied:

$$1.69 < n11 < 1.90 \quad (2)$$

$$67 < \nu 12 \quad (1A)$$

$$2.05 < n12 + 0.007 \times \nu 12 \quad (1B)$$

$$67 < \nu 25 \quad (10A)$$

$$2.05 < n25 + 0.007 \times \nu 25 \quad (10B).$$

According to a third aspect of the present invention, a wide zoom lens system includes, in order from an object, a first lens group having negative refractive power, and a second lens group having positive refractive power. The first lens group includes, in order from the object, a negative meniscus lens having a convex surface facing to the object, a negative lens, and a positive lens having a convex surface facing to the object. The second lens group includes, in order from the object, a positive lens, and a negative lens. At least one surface of the negative meniscus lens of the first lens group is composed of an aspherical surface. The focal length is varied by changing a distance between the first lens group and the second lens group, and the following conditional expressions (1A), (7) and (8) are satisfied:

$$67 < \nu 12 \quad (1A)$$

$$28 < \nu 13 < 35 \quad (7)$$

$$1.79 < n13 \quad (8).$$

Other features and advantages according to the present invention will be readily under stood from the detailed description of the preferred embodiments in conjunction with the accompanying drawings.

BRIEF DESCRIPTION OF THE DRAWINGS

FIG. 2 is graphs showing various aberrations of the wide zoom lens system according to Example 1 of the present invention in the wide-angle end state focusing on infinity.

FIG. 5 is graphs showing various aberrations of the wide zoom lens system according to Example 1 of the present invention in the wide-angle end state where the shooting distance R is 500 mm.

FIG. 20 is graphs showing various aberrations of the wide zoom lens system according to Example 3 of the present invention in the intermediate focal length state where the shooting distance R is 500 mm.

FIG. 37 is graphs showing various aberrations of the wide zoom lens system according to Example 6 of the present invention in the wide-angle end state focusing on infinity.

FIG. 42 is graphs showing various aberrations of the wide zoom lens system according to Example 6 of the present invention in the telephoto end state where the shooting distance R is 300 mm.

DESCRIPTION OF THE MOST PREFERRED EMBODIMENTS

Figure 1:
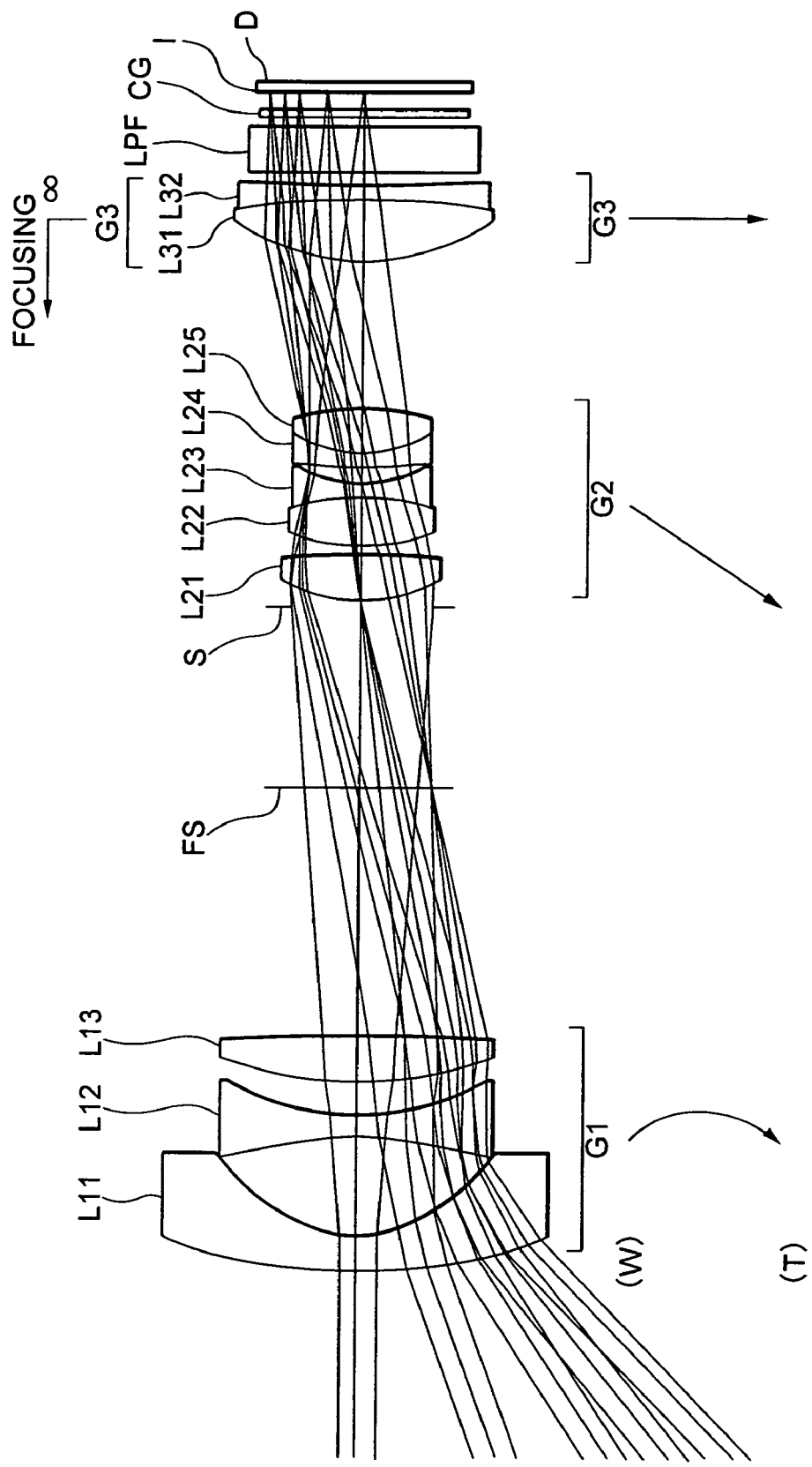
FIG. 1 is a diagram showing a lens configuration of a wide zoom lens system according to Example 1 of the present invention.

A wide zoom lens system according to each embodiment of the present invention is explained below.

A wide zoom lens system according to the present invention includes, in order from an object, a first lens group having negative refractive power, and a second lens group having positive refractive power. The first lens group includes, in order from the object, a negative meniscus lens having a convex surface facing to the object, a negative lens, and a positive lens having a convex surface facing to the object. The second lens group includes, in order from the object, a positive lens disposed to the most object side and a negative lens. The focal length is varied by changing a distance between the first lens group and the second lens group.

In this case, by constructing at least one surface of the negative lens in the first lens group to be an aspherical surface having refractive power decreasing along the surface from the optical axis to the periphery, negative distortion conspicuously producing in the wide-angle end state upon widening the angle of view is preferably corrected. Accordingly, preferable aberration correction is accomplished by constructing the first lens group by simple three lenses.

In the wide zoom lens system constructed as described above, the following conditional expressions (1A) and (1B) are satisfied:

$$67 < v12 \quad (1A)$$

$$2.05 < n12 + 0.007 \times v12 \quad (1B)$$

where v12 denotes Abbe number of the negative lens in the first lens group at d-line ($\lambda$=587.6 nm), and n12 denotes refractive index of the negative lens in the first lens group at d-line ($\lambda$=587.6 nm).

Conditional expressions (1A) and (1B) is for preferably correcting lateral chromatic aberration and distortion produced upon widening the angle of view of the zoom lens system. Lateral chromatic aberration produced in the negative meniscus lens in the first lens group can be preferably suppressed by applying a low dispersion glass material to the negative lens in the first lens group. When the values of conditional expressions (1A) and (1B) are equal to or falls below the respective lower limits, it becomes difficult to preferably correct lateral chromatic aberration over entire angle of view of 80 degrees or more, so that it is undesirable. In order to secure the effect of the present invention, it is preferable to set the lower limit of conditional expression (1A) to 80.

In the wide zoom lens system constructed as described above, the following conditional expressions (2) and (3) are satisfied:

$$1.69 < n11 < 1.90 \quad (2)$$

$$2.29 < n11 + 0.012 \times v11 < 2.39 \quad (3)$$

where n11 denotes refractive index of the negative meniscus lens in the first lens group at d-line ($\lambda$=587.6 nm), and v12 denotes Abbe number of the negative meniscus lens in the first lens group at d-line ($\lambda$=587.6 nm).

The way to fabricate an aspherical surface is classified broadly into two ways, in which one is a cutting method that a glass material is directly cut to be formed with an aspherical surface and the other is a mold method that a mold of an aspherical surface is prepared in advance and transferred on to a glass material. In order to fabricate in large quantities with low cost, it is preferable that the mold method can be applied. Conditional expressions (2) and (3) define terms for this purpose.

Conditional expression (2) defines an appropriate range of refractive index of the negative meniscus lens in the first lens group. When the value n11 is equal to or falls below the lower limit of conditional expression (2), the radius of curvature of the image side surface of the negative meniscus lens in the first lens group becomes too small, so that it becomes difficult to correct various aberrations and it also becomes difficult to mold upon fabricating an aspherical surface by a glass mold method. On the other hand, when the value n11 is equal to or exceeds the upper limit of conditional expression (2), although it is convenient to correct various aberrations, glass materials having high refractive index are generally expensive, so that the price of the whole lens system becomes too expensive. In order to secure the effect of the present invention, it is preferable to set the upper limit of conditional expression (2) to 1.83.

Conditional expression (3) defines an appropriate range of the terms for fabricating the negative meniscus lens in the first lens group by a glass mold method. In order to fabricate it by a glass mold method, it is necessary to use a glass material having a low transition point. When the value n11+0.012×v11 is equal to or exceeds the upper limit of conditional expression (3), although it is convenient to correct various aberrations, a glass material having high transition point is to be used, so that it becomes difficult to fabricate an aspherical surface by the glass mold method. On the other hand, when the value n11+0.012×v11 is equal to or falls below the lower limit of conditional expression (3), since a glass material having high dispersion is to be used, it becomes difficult to preferably correct various aberrations, in particular, chromatic aberration. In order to secure the effect of the present invention, it is preferable to set the upper limit of conditional expression (3) to 2.34.

The wide zoom lens system according to each example of the present invention includes a third lens group having positive refractive power disposed to the image side of the second lens group and focusing is carried out by moving the third lens group along the optical axis and the following conditional expressions (4), (5), and (6) are preferably satisfied:

$$-1.3 < f2/f1 < -0.9 \qquad (4)$$

$$1.5 < f3/f2 < 2.5 \qquad (5)$$

$$0.3 < D23W/f2 < 0.6 \qquad (6)$$

where f1 denotes the focal length of the first lens group, f2 denotes the focal length of the second lens group, f3 denotes the focal length of the third lens group, and D23W denotes a distance between the second lens group and the third lens group in the wide-angle end state.

For the role of the third lens group there are two parts, in which one is a so-called field lens for optimizing the position of the exit pupil of the whole optical system to the imaging device locating the image plane and the other is a focusing lens for carrying out focusing by moving the third lens group along the optical axis. In this manner, by separating the focusing lens from the first and second lens groups moving upon zooming, the mechanism of the lens barrel can be simplified, so that it is desirable. It is needless to say that the freedom for correcting aberrations can be further increased by making the third lens group movable upon zooming.

Conditional expression (4) is for securing a zoom ratio of three or more. When the ratio f2/f1 is equal to or exceeds the upper limit of conditional expression (4), it becomes difficult to secure the sufficient zoom ratio and Petzval sum becomes too large in positive direction, so that it becomes difficult to correct curvature of field. On the other hand, when the ratio f2/f1 is equal to or falls below the lower limit of conditional expression (4), although it is convenient to secure the zoom ratio, the whole dimension of the zoom lens system becomes large, so that it is undesirable. In order to secure the effect of the present invention, it is preferable to set the upper limit of conditional expression (4) to −1.1.

Conditional expression (5) defines the focal length of the third lens group. When the ratio f3/f2 is equal to or exceeds the upper limit of conditional expression (5), the moving amount of the third lens group upon focusing becomes too large, so it is undesirable. On the other hand, when the ratio f3/f2 is equal to or falls below the lower limit of conditional expression (5), refractive power of the third lens group becomes too large, so the position of the exit pupil cannot be optimized to the solid-state imaging device and, in addition, the dimension of the zoom lens system becomes large, so that it is undesirable.

Conditional expression (6) defines an arrangement of the third lens group. When the ratio D23W/f2 is equal to or exceeds the upper limit of conditional expression (6), the effect of the third lens group as a field lens becomes weak, so it is undesirable. On the other hand, when the ratio D23W/f2 is equal to or falls below the lower limit of conditional expression (6), the back focal length becomes too short, so that it is undesirable. When both of conditional expressions (5) and (6) are satisfied, the optimum position of the exit pupil to the solid-state imaging device can be obtained.

When the third lens group is used as a focusing lens group, in order to suppress variation in chromatic aberration caused by focusing, it is preferable that the third lens group is composed of a cemented lens constructed by a positive lens cemented with a negative lens or a single lens. When the third lens group is composed of a single lens, it is preferable that the third lens group uses a glass material having Abbe number of 70 or more at d-line ($\lambda$=587.6 nm).

In the wide zoom lens system according to each example of the present invention, it is preferable to satisfy the following conditional expressions (7) and (8):

$$28 < v13 < 35 \qquad (7)$$

$$1.79 < n13 \qquad (8)$$

where v13 denotes Abbe number of the positive lens in the first lens group at d-line ($\lambda$=587.6 nm), and n13 denotes refractive index of the positive lens in the first lens group at d-line ($\lambda$=587.6 nm).

Conditional expressions (7) and (8) are for accomplishing preferable correction of various aberrations including lateral chromatic aberration. When the value v13 is equal to or falls below the lower limit of conditional expression (7), 2nd order lateral chromatic aberration becomes large, so it becomes difficult to preferably correct lateral chromatic aberration over wide angle of view. On the other hand, when the value v13 is equal to or exceeds the upper limit of conditional expression (7), it becomes difficult to correct 1st order lateral chromatic aberration.

When the value n13 is equal to or falls below the lower limit of conditional expression (8), curvature of field in the wide-angle end state and coma in the telephoto end state become worse, so that it is undesirable.

In the wide zoom lens system according to each example of the present invention, it is preferable to satisfy the following conditional expression (9):

$$0.3 < f1/r12A < 1 \qquad (9)$$

where r12A denotes the radius of curvature of the object side surface of the negative lens in the first lens group.

Conditional expression (9) is for preferably correcting spherical aberration and coma over wide angle of view. When the ratio f1/r12A is equal to or falls below the lower limit of conditional expression (9), the radius of curvature of the object side concave surface of the negative lens in the first lens group becomes small, coma produced in the negative meniscus lens in the first lens group cannot be canceled, and it becomes difficult to preferably correct spherical aberration in the telephoto end state. On the other hand, when the ratio f1/r12A is equal to or exceeds the upper limit of conditional expression (9), since the radius of curvature of the object side concave surface of the negative lens in the first lens group becomes excessively large, it becomes difficult to correct coma, and negative distortion in the wide-angle end state increases.

In the wide zoom lens system according to each example of the present invention, the second lens group includes a positive lens disposed to the most object side, a negative lens, and a positive lens disposed to the most image side, at least one surface of the positive lens disposed to the most object side is composed of an aspherical surface, and the following conditional expressions (10A) and (10B) are preferably satisfied:

$$67 < v25 \qquad (10A)$$

$$2.05 < n25 + 0.007 \times v25 \qquad (10B)$$

where v25 denotes Abbe number of the positive lens disposed to the most image side in the second lens group at d-line ($\lambda$=587.6 nm), and n25 denotes refractive index of the positive lens disposed to the most image side in the second lens group at d-line (λ=587.6 nm).

By constructing the positive lens disposed to the most image side in the second lens group with an aspherical lens, spherical aberration can be preferably corrected without making the second lens group large. By satisfying conditional expressions (10A) and (10B), longitudinal chromatic aberration in the telephoto end state can be preferably corrected. In order to secure the effect of the present invention, it is preferable to set the lower limit of conditional expression (10A) to 80.

In the wide zoom lens system according to each example of the present invention, the following conditional expressions (11) and (12) are preferably satisfied:

$$28 < v23 < 42 \quad (11)$$

$$1.75 < n23 \quad (12)$$

where v23 denotes Abbe number of the negative lens in the second lens group at d-line (λ=587.6 nm), and n23 denotes refractive index of the negative lens in the second lens group at d-line (λ=587.6 nm).

Conditional expression (11) is for obtaining further preferable correction of longitudinal chromatic aberration. When the value v23 is equal to or exceeds the upper limit of conditional expression (11), it becomes difficult to correct 1st order longitudinal chromatic aberration. On the other hand, when the value v23 is equal to or falls below the lower limit of conditional expression (11), it becomes difficult to correct 2nd order longitudinal chromatic aberration, so that chromatic aberration increases instead. In order to secure the effect of the present invention, it is preferable to set the lower limit of conditional expression (11) to 30.

Conditional expression (12) is for obtaining further preferable correction of spherical aberration. When the value n23 is equal to or falls below the lower limit of conditional expression (12), it becomes unfavorable to correct spherical aberration.

[Embodiments]

Each example of the wide zoom lens system according to the present invention is explained with reference to accompanying drawings.

EXAMPLE 1

FIG. 1 is a diagram showing a lens configuration of a wide zoom lens system according to Example 1 of the present invention.

In FIG. 1, the wide zoom lens system according to Example 1 is composed of, in order from an object, a first lens group G1 having negative refractive power, a flare stopper FS, an aperture stop S, a second lens group G2 having positive refractive power, and a third lens group G4 having positive refractive power. The first lens group G1 is composed of, in order from the object, a negative meniscus lens L11 having convex surface facing to the object, a double concave negative lens L12, and a double convex positive lens L13. The second lens group G2 is composed of, in order from the object, a double convex positive lens L21, a cemented lens constructed by a double convex positive lens L22 cemented with a double concave negative lens L23, and a cemented lens constructed by a negative meniscus lens L24 having convex surface facing to the object cemented with a double convex positive lens L25. The third lens group G3 is composed of a cemented lens constructed by, in order from the object, a double convex positive lens L31 cemented with a double concave negative lens L32. The image side surface of the negative meniscus lens L11 of the first lens group G1, the object side surface of the positive lens L21 in the second lens group G2, and the object side surface of the positive lens L31 in the third lens group G3 are composed of respective aspherical surfaces. An optical low-pass filter LPF and a cover glass CG for an imaging device D disposed in the image plane I are arranged between the third lens group G3 and the image plane I. The aperture stop S is moved together with the second lens group G2 in a body.

When a state of lens group positions varies from a wide-angle end state W to a telephoto end state T, the third lens group G3 is fixed relative to the image plane I, and the first lens group G1 and the second lens group G2 are moved. Focusing from infinity to a close object is carried out by moving the third lens group G3 to the object side.

With this construction, a wide angle of view of 87 degrees or more in the wide-angle end state is accomplished with securing high optical performance.

Various values associated with the wide zoom lens system according to Example 1 are listed in Table 1. In [Specifications], f denotes the focal length, Bf denotes a back focal length, FNO denotes the f-number, 2A denotes an angle of view (unit: degree), and y denotes an image height. In [Lens Data], the left most column shows the lens surface number counted in order from the object side, the second column "r" shows a radius of curvature of the lens surface, the third column "d" shows a distance between adjacent lens surfaces, the fourth column "vd" shows Abbe number of the medium at d-line (λ=587.6 nm), the fifth column "nd" shows refractive index of the medium at d-line. By the way, refractive index of the air 1.000000 is omitted and a plane is denoted by r=∞.

In [Aspherical Data], each aspherical coefficient is shown as the aspherical surface is expressed by the following expression:

$$x = (h^2/R)/(1+(1-\kappa \times h^2/R^2)^{1/2}) + C4 \times h^4 + C6 \times h^6 + C8 \times h^8 + C10 \times h^{10}$$

where x denotes a depth of the surface in x-direction, h denotes a height from the optical axis perpendicular to the optical axis, R denotes a radius of curvature of a reference sphere (paraxial radius of curvature), κ denotes a conical coefficient, and Cn denote n-th order aspherical coefficient, respectively.

In [Aspherical Data], "E-n" denotes "$10^{-n}$". An aspherical surface is denoted by an asterisk (*) attached to the surface number. In [Variable Distances], R denotes a shooting distance (distance between an object and an image), f denotes the focal length, β denotes shooting magnification, D0 denotes a distance between an object and the most object side lens surface of the first lens group G1 (shooting distance), and Bf denotes a back focal length. In [Values for Conditional Expressions], values for respective conditional expressions are shown.

In the tables for various values, "mm" is generally used for the unit of length such as the focal length, the radius of curvature, and the distance between optical surfaces. However, since an optical system proportionally enlarged or reduced its dimension can be obtained similar optical performance, the unit is not necessary to be limited to "mm" and any other suitable unit can be used.

The explanation of reference symbols is the same in the other examples, so that duplicated explanations are omitted.

TABLE 1

[Specifications]

|  | W | T |
|---|---|---|
| f = | 6.28 | 21.00 |
| Bf = | 0.99 | |
| FNO = | 2.67 | 5.13 |
| 2A = | 87.28 | 30.34 |
| y = | 5.70 | |

[Lens Data]

| | r | d | νd | nd |
|---|---|---|---|---|
| 1) | 34.1403 | 2.0000 | 40.95 | 1.804700 |
| 2*) | 8.2723 | 6.0000 | | |
| 3) | −30.3610 | 1.3000 | 81.61 | 1.497000 |
| 4) | 16.4423 | 2.0000 | | |
| 5) | 22.2282 | 2.7000 | 32.35 | 1.850260 |
| 6) | −212.2667 | (D1) | | |
| 7) | ∞ | (D2) | Flare Stopper FS | |
| 8> | ∞ | 0.5000 | Aperture Stop S | |
| 9*) | 10.4486 | 2.6000 | 57.44 | 1.606020 |
| 10) | −95.3055 | 0.6000 | | |
| 11) | 11.7898 | 3.0000 | 50.88 | 1.658440 |
| 12) | −14.5069 | 0.9000 | 39.59 | 1.804400 |
| 13) | 8.0271 | 0.9000 | | |
| 14) | 30.7399 | 0.9000 | 37.95 | 1.723420 |
| 15) | 7.2443 | 2.6000 | 81.61 | 1.497000 |
| 16) | −18.3656 | (D3) | | |
| 17*) | 14.4548 | 3.6000 | 57.44 | 1.606020 |
| 18) | −53.0000 | 0.9000 | 23.78 | 1.846660 |
| 19) | 167.8106 | (D4) | | |
| 20) | ∞ | 2.7600 | 64.20 | 1.516800 |
| 21) | ∞ | 0.5000 | | |
| 22) | ∞ | 0.5000 | 64.20 | 1.516800 |
| 23) | ∞ | (Bf) | | |

[Aspherical Data]

Surface Number 2

$\kappa = 0.3055$
$C4 = 1.04910E-05$
$C6 = 2.01200E-07$
$C8 = -5.72700E-12$
$C10 = -4.78540E-12$ Surface Number 9

$\kappa = 0.4078$
$C4 = -4.74070E-07$
$C6 = 3.26430E-08$
$C8 = 1.15490E-08$
$C10 = -1.92510E-10$ Surface Number 17

$\kappa = 1.6047$
$C4 = -1.98410E-05$
$C6 = -4.01260E-07$
$C8 = 1.27770E-08$
$C10 = -1.25530E-10$

[Variable Distances]

| | W | M | T |
|---|---|---|---|
| <upon focusing on infinity> | | | |
| R = | ∞ | ∞ | ∞ |
| f = | 6.28000 | 11.50000 | 21.00000 |
| D0 = | ∞ | ∞ | ∞ |
| D1 = | 15.37846 | 0.30000 | 0.30000 |
| D2 = | 11.00000 | 10.52327 | 2.05746 |
| D3 = | 9.07667 | 17.55854 | 32.99488 |
| D4 = | 0.85672 | 0.85672 | 0.85672 |
| Bf = | 0.99000 | 0.99000 | 0.99000 |
| <upon focusing on a close object> | | | |
| R = | 500 | 500 | 500 |
| β = | −0.01425 | −0.02551 | −0.04566 |
| D0 = | 428.4381 | 435.5117 | 428.5409 |
| D1 = | 15.37846 | 0.30000 | 0.30000 |
| D2 = | 11.00000 | 10.52327 | 2.05746 |
| D3 = | 8.88237 | 16.93567 | 31.08750 |
| D4 = | 1.05103 | 1.47959 | 2.76410 |
| Bf = | 0.99000 | 0.99000 | 0.99000 |

[Values for Conditional Expressions]

| | |
|---|---|
| (1A): ν12 = | 81.610 |
| (1B): n12 + 0.007 × ν12 = | 2.068 |
| (2): n11 = | 1.805 |
| (3): n11 + 0.012 × ν11 = | 2.296 |
| (4): f2/f1 = | −1.199 |
| (5): f3/f2 = | 1.604 |
| (6): D23W/f2 = | 0.485 |
| (7): ν13 = | 32.350 |
| (8): n13 = | 1.850 |
| (9): f1/r12A = | 0.514 |
| (10A): ν25 = | 81.610 |
| (10B): n25 + 0.007 × ν25 = | 2.068 |
| (11): ν23 = | 39.590 |
| (12): n23 = | 1.804 |

Figure 3:
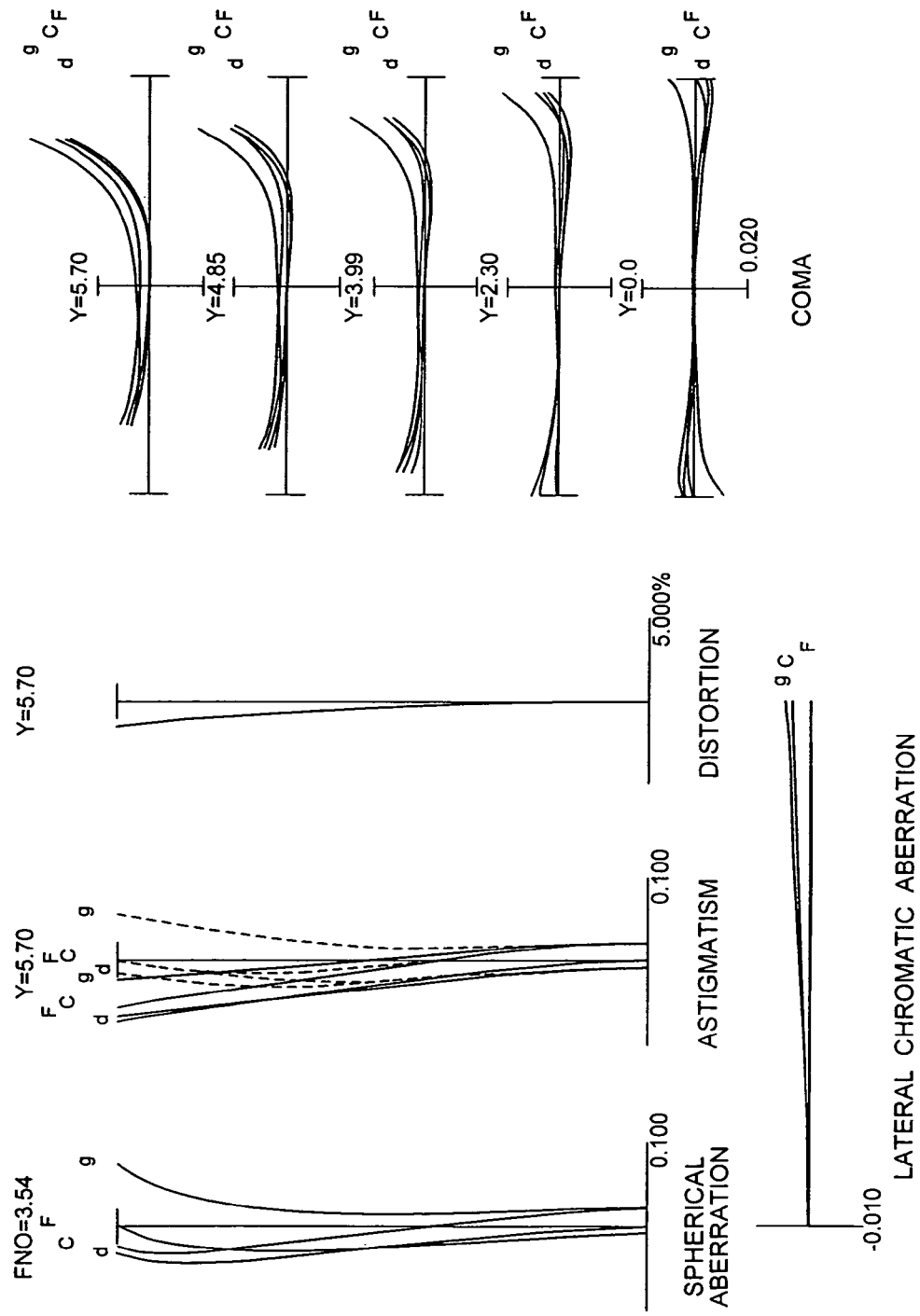
FIG. 3 is graphs showing various aberrations of the wide zoom lens system according to Example 1 of the present invention in the intermediate focal length state focusing on infinity.
Figure 4:
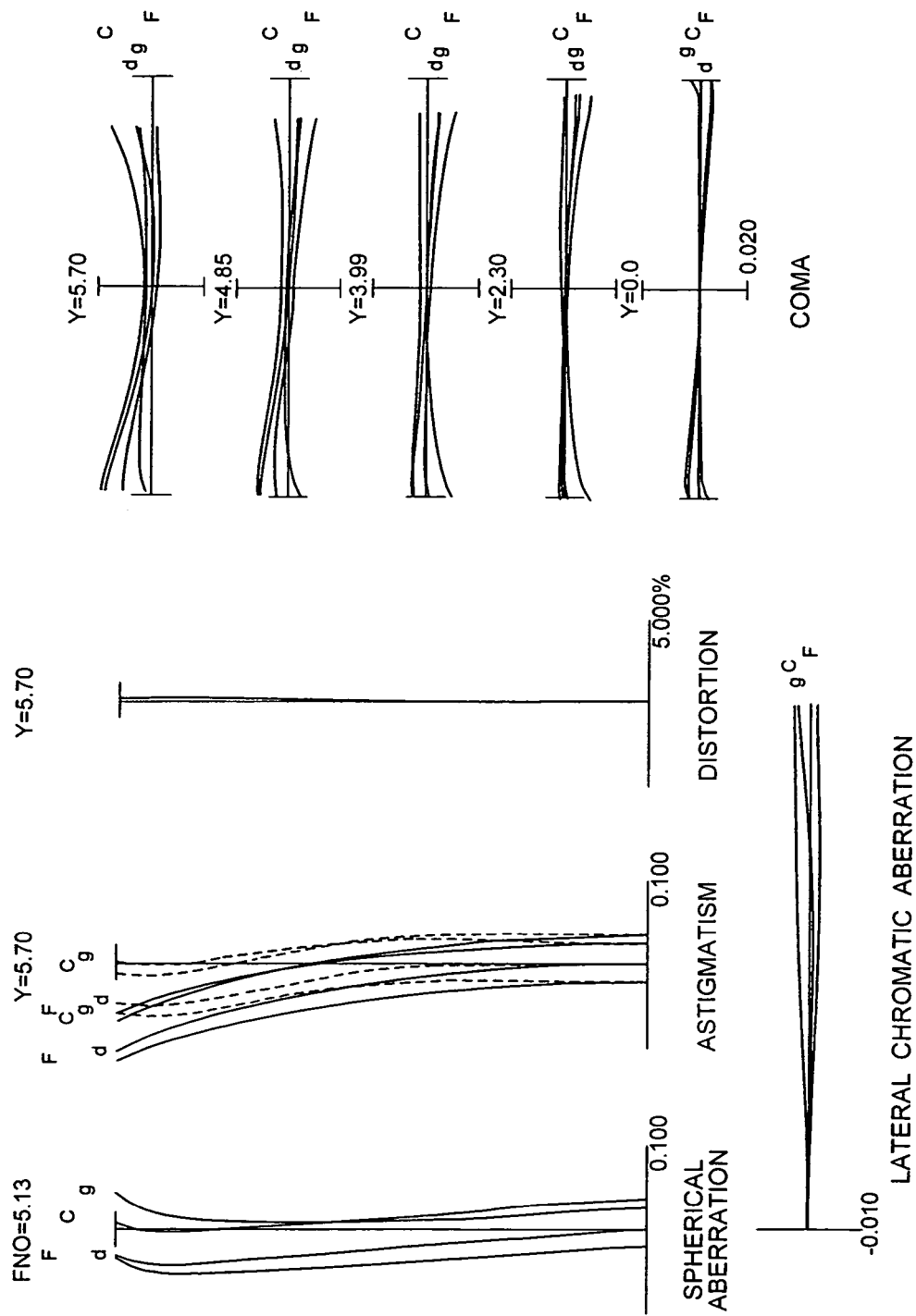
FIG. 4 is graphs showing various aberrations of the wide zoom lens system according to Example 1 of the present invention in the telephoto end state focusing on infinity.
Figure 6:
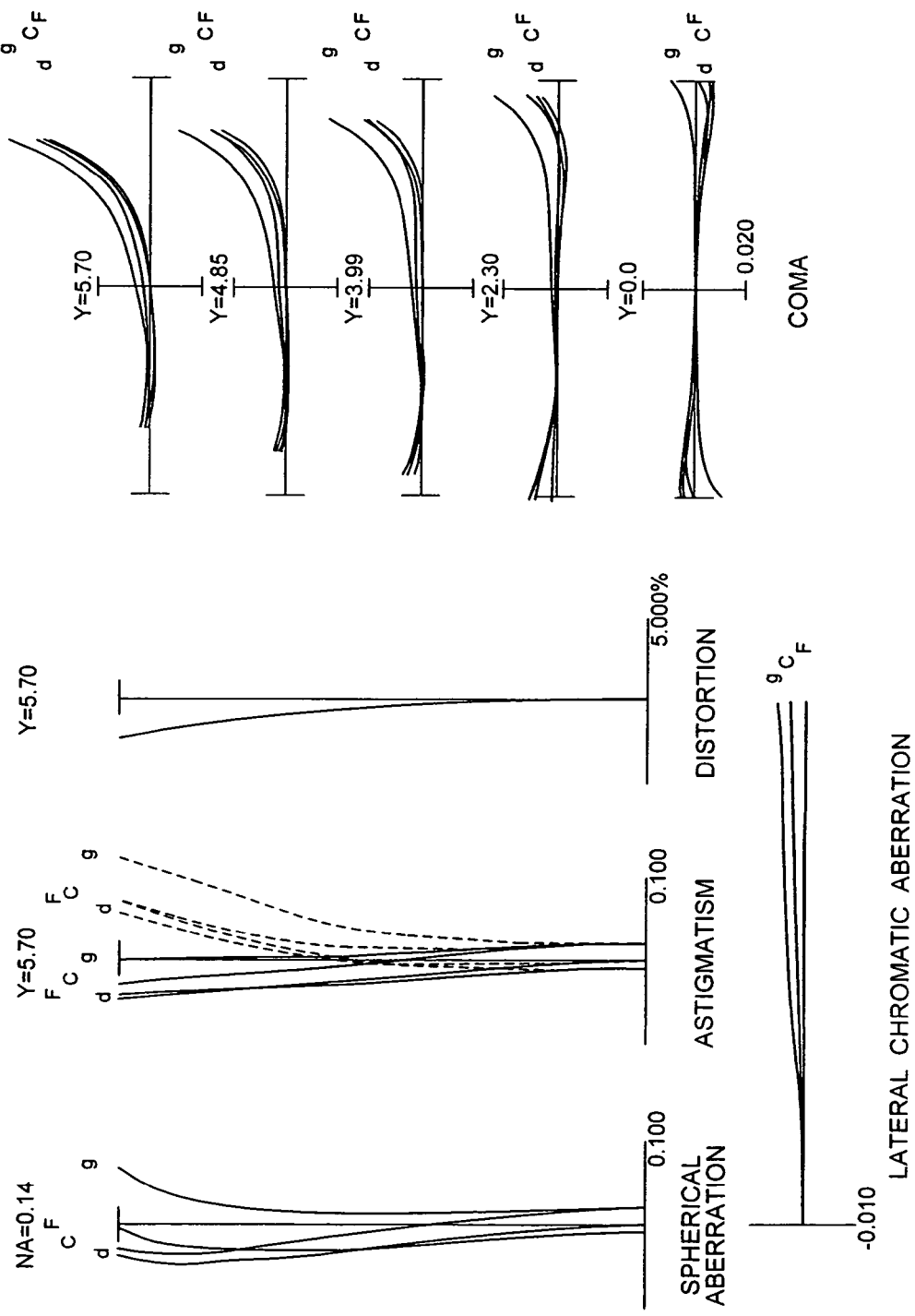
FIG. 6 is graphs showing various aberrations of the wide zoom lens system according to Example 1 of the present invention in the intermediate focal length state where the shooting distance R is 500 mm.
Figure 7:
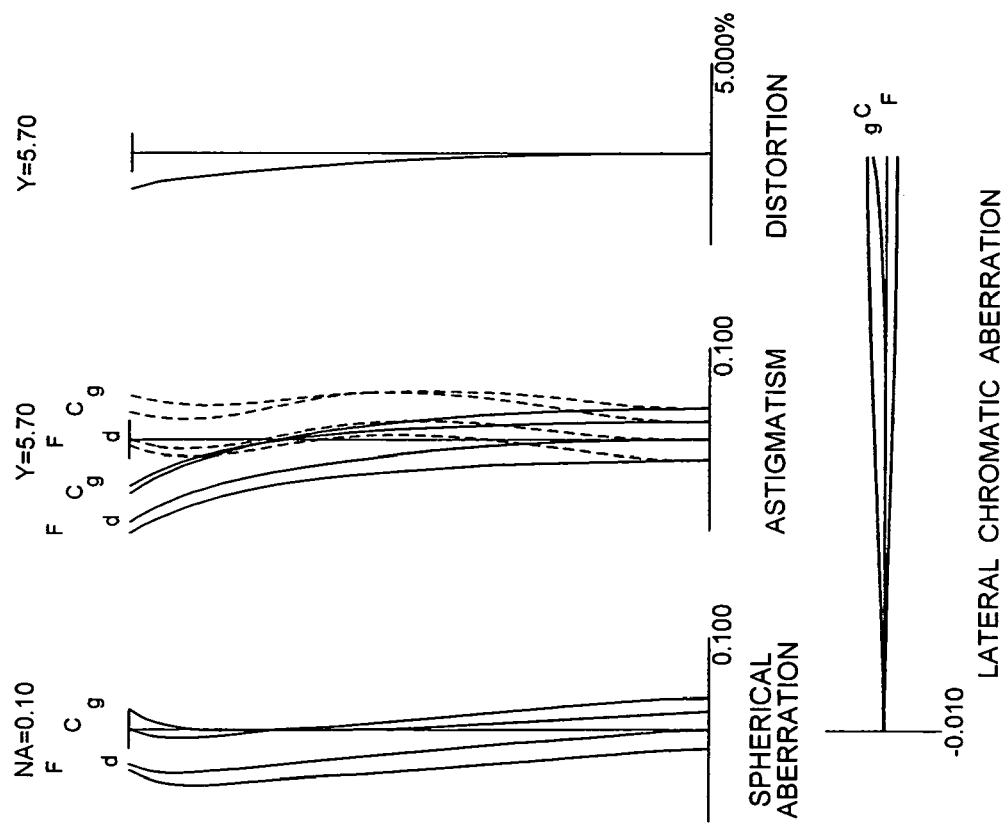
FIG. 7 is graphs showing various aberrations of the wide zoom lens system according to Example 1 of the present invention in the telephoto end state where the shooting distance R is 500 mm.

FIG. 2 is graphs showing various aberrations of the wide zoom lens system according to Example 1 of the present invention in the wide-angle end state focusing on infinity. FIG. 3 is graphs showing various aberrations of the wide zoom lens system according to Example 1 of the present invention in the intermediate focal length state focusing on infinity. FIG. 4 is graphs showing various aberrations of the wide zoom lens system according to Example 1 of the present invention in the telephoto end state focusing on infinity. FIG. 5 is graphs showing various aberrations of the wide zoom lens system according to Example 1 of the present invention in the wide-angle end state where the shooting distance R is 500 mm. FIG. 6 is graphs showing various aberrations of the wide zoom lens system according to Example 1 of the present invention in the intermediate focal length state where the shooting distance R is 500 mm. FIG. 7 is graphs showing various aberrations of the wide zoom lens system according to Example 1 of the present invention in the telephoto end state where the shooting distance R is 500 mm.

In respective graphs, FNO denotes an f-number, Y denotes an image height, NA denotes a numerical aperture, C denotes aberration curve at C-line (λ=656.3 nm), d denotes aberration curve at d-line (587.6 nm), F denotes aberration curve at F-line (λ=486.1 nm), and g denotes aberration curve at g-line (λ=435.8 nm). In the graph showing astigmatism, a solid line indicates a sagittal image plane and a broken line indicates a meridional plane. The above-described explanation regarding various aberration graphs is the same as the other examples.

As is apparent from the respective graphs, the wide zoom lens system according to Example 1 shows superb optical performance as a result of good corrections to various aberrations in each focal length state from the wide-angle end state to the telephoto end state.

EXAMPLE 2

Figure 8:
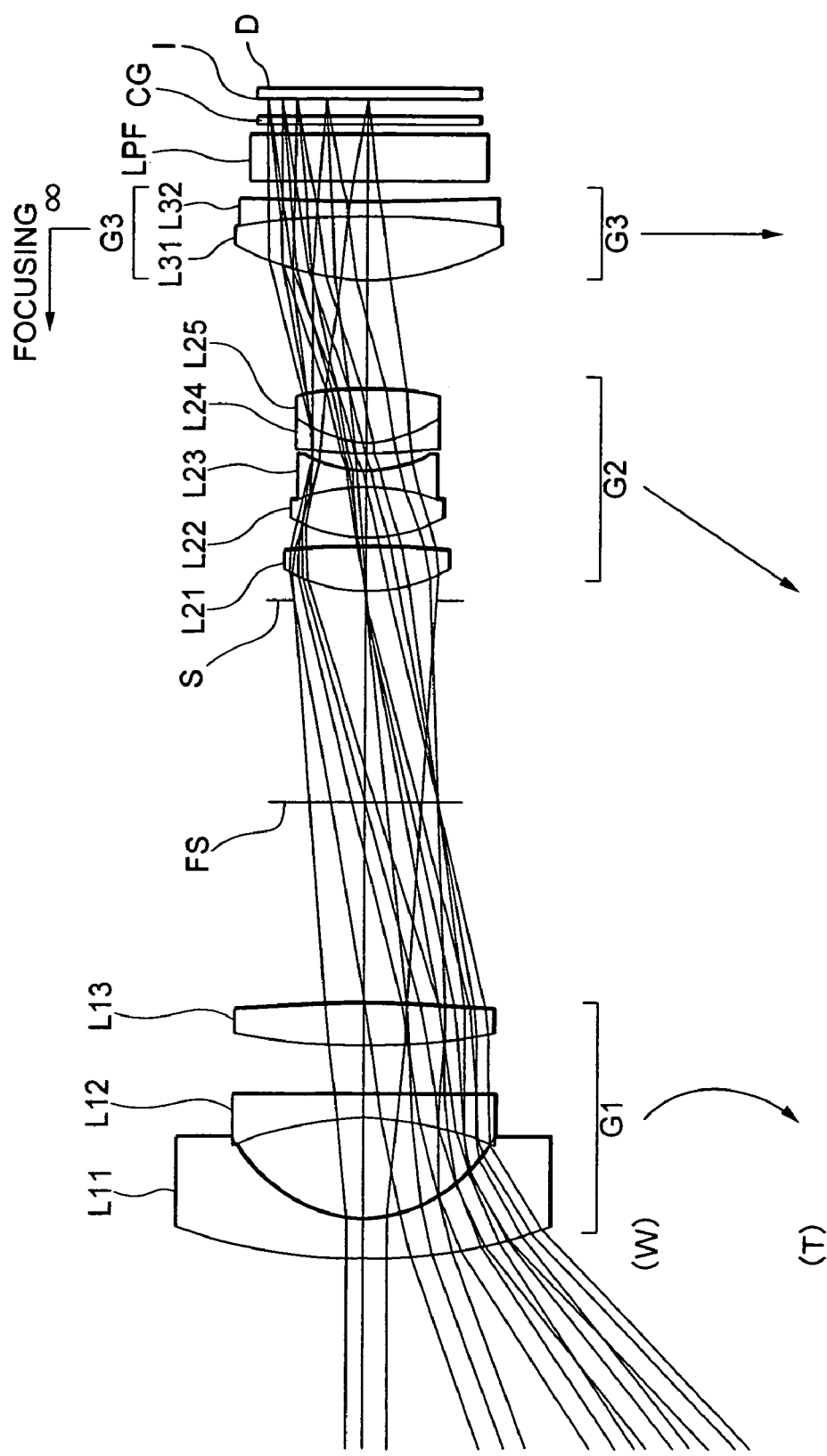
FIG. 8 is a diagram showing a lens configuration of a wide zoom lens system according to Example 2 of the present invention.

FIG. 8 is a diagram showing a lens configuration of a wide zoom lens system according to Example 2 of the present invention.

In FIG. 8, the wide zoom lens system according to Example 2 is composed of, in order from an object, a first lens group G1 having negative refractive power, a flare stopper FS, an aperture stop S, a second lens group G2 having positive refractive power, and a third lens group G3 having positive refractive power. The first lens group G1 is composed of, in order from the object, a negative meniscus lens L11 having convex surface facing to the object, a negative meniscus lens L12 having a concave surface facing to the object, and a double convex positive lens L13. The second lens group G2 is composed of, in order from the object, a double convex positive lens L21, a cemented lens constructed by a double convex positive lens L22 cemented with a double concave negative lens L23, and a cemented lens constructed by a negative meniscus lens L24 having convex surface facing to the object cemented with a double convex positive lens L25. The third lens group G3 is composed of a cemented lens constructed by, in order from the object, a double convex positive lens L31 cemented with a double concave negative lens L32. The image side surface of the negative meniscus lens L11 of the first lens group G1, the object side surface of the positive lens L21 in the second lens group G2, and the object side surface of the positive lens L31 in the third lens group G4 are composed of respective aspherical surfaces. An optical low-pass filter LPF and a cover glass CG for an imaging device D disposed in the image plane I are arranged between the third lens group G4 and the image plane I. The aperture stop S is moved together with the second lens group G2 in a body.

When a state of lens group positions varies from a wide-angle end state W to a telephoto end state T, the third lens group G4 is fixed relative to the image plane I, and the first lens group G1 and the second lens group G2 are moved. Focusing from infinity to a close object is carried out by moving the third lens group G4 to the object side.

With this construction, a wide angle of view of 87 degrees or more in the wide-angle end state is accomplished with securing high optical performance.

Various values associated with the wide zoom lens system according to Example 2 are listed in Table 2.

TABLE 2

[Specifications]

|   | W | T |
|---|---|---|
| f = | 6.28 | 21.00 |
| Bf = | 0.99 | |
| FNO = | 2.66 | 5.26 |
| 2A = | 87.27 | 30.37 |
| y = | 5.70 | |

[Lens Data]

|   | r | d | vd | nd |
|---|---|---|---|---|
| 1) | 33.1661 | 2.2000 | 45.10 | 1.792480 |
| 2*) | 7.3301 | 6.0000 | | |
| 3) | −19.1000 | 1.4000 | 81.61 | 1.497000 |
| 4) | −482.0106 | 2.8000 | | |
| 5) | 40.6647 | 2.4000 | 28.55 | 1.795040 |
| 6) | −98.6176 | (D1) | | |
| 7) | ∞ | (D2) | Flare Stopper FS | |
| 8> | ∞ | 0.5000 | Aperture Stop S | |
| 9*) | 9.2906 | 2.6000 | 59.10 | 1.583320 |
| 10) | −54.8308 | 0.6000 | | |
| 11) | 10.0228 | 3.0000 | 44.89 | 1.639300 |
| 12) | −11.5553 | 0.9000 | 37.17 | 1.834000 |
| 13) | 6.9627 | 1.0000 | | |
| 14) | 20.1915 | 0.8000 | 34.96 | 1.801000 |
| 15) | 6.7448 | 3.0000 | 81.61 | 1.497000 |
| 16) | −23.4554 | (D3) | | |
| 17*) | 15.7144 | 3.6000 | 57.44 | 1.606020 |

TABLE 2-continued

| 18) | −50.4093 | 0.9000 | 23.78 | 1.846660 |
|---|---|---|---|---|
| 19) | 872.6010 | (D4) | | |
| 20) | ∞ | 2.7600 | 64.20 | 1.516800 |
| 21) | ∞ | 0.5000 | | |
| 22) | ∞ | 0.5000 | 64.20 | 1.516800 |
| 23) | ∞ | (Bf) | | |

[Aspherical Data]

Surface Number 2

κ = 0.4651
C4 = −3.02030E−05
C6 = 9.05220E−08
C8 = −4.25100E−10
C10 = −2.19430E−11

Surface Number 9

κ = 0.5211
C4 = 0.00000E+00
C6 = 2.99090E−07
C8 = 1.12430E−08
C10 = −4.77380E−11

Surface Number 17

κ = 1.0404
C4 = −6.46170E−06
C6 = −9.35150E−08
C8 = 1.59690E−08
C10 = −1.66260E−10

[Variable Distances]

|   | W | M | T |
|---|---|---|---|
| <upon focusing on infinity> | | | |
| R = | ∞ | ∞ | ∞ |
| f = | 6.28000 | 11.50000 | 21.00000 |
| D0 = | ∞ | ∞ | ∞ |
| D1 = | 12.08055 | 0.30000 | 0.30000 |
| D2 = | 12.00000 | 8.80879 | 0.66050 |
| D3 = | 6.58002 | 14.74501 | 29.60466 |
| D4 = | 1.13716 | 1.13716 | 1.13716 |
| Bf = | 0.99000 | 0.99000 | 0.99000 |
| <upon focusing on a close object> | | | |
| R = | 500 | 500 | 500 |
| β = | −0.01417 | −0.02540 | −0.04547 |
| D0 = | 431.7522 | 438.5592 | 431.8477 |
| D1 = | 12.08055 | 0.30000 | 0.30000 |
| D2 = | 12.00000 | 8.80879 | 0.66050 |
| D3 = | 6.38684 | 14.12492 | 27.70457 |
| D4 = | 1.33034 | 1.75725 | 3.03725 |
| Bf = | 0.99000 | 0.99000 | 0.99000 |

[Values for Conditional Expressions]

| (1A): ν12 = | 81.610 |
|---|---|
| (1B): n12 + 0.007 × ν12 = | 2.068 |
| (2): n11 = | 1.792 |
| (3): n11 + 0.012 × ν11 = | 2.334 |
| (4): f2/f1 = | −1.154 |
| (5): f3/f2 = | 1.667 |
| (6): D23W/f2 = | 0.366 |
| (7): ν13 = | 28.550 |
| (8): n13 = | 1.795 |
| (9): f1/r12A = | 0.817 |
| (10A): ν25 = | 81.610 |
| (10B): n25 + 0.007 × ν25 = | 2.068 |
| (11): ν23 = | 37.170 |
| (12): n23 = | 1.834 |

Figure 9:
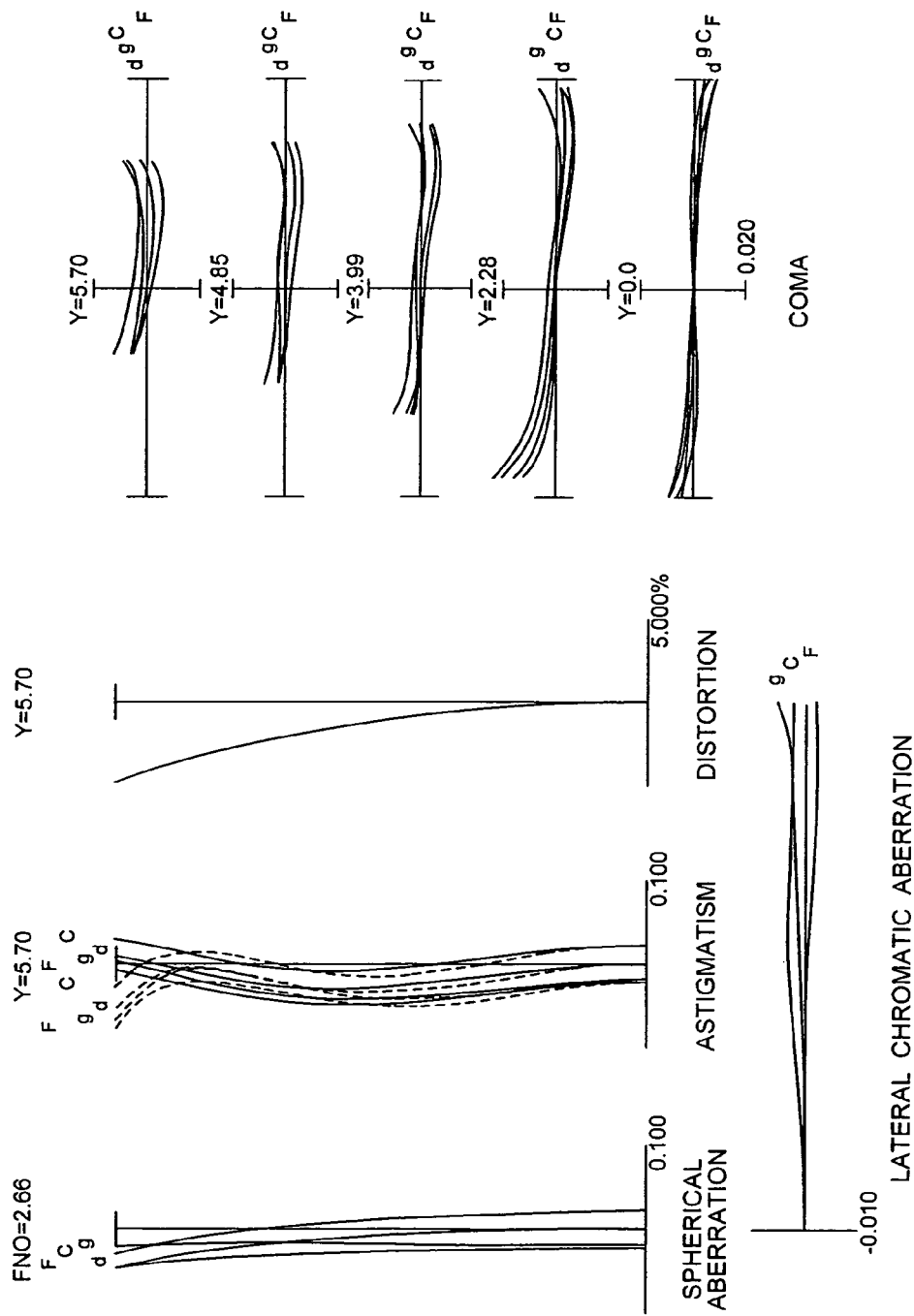
FIG. 9 is graphs showing various aberrations of the wide zoom lens system according to Example 2 of the present invention in the wide-angle end state focusing on infinity.
Figure 10:
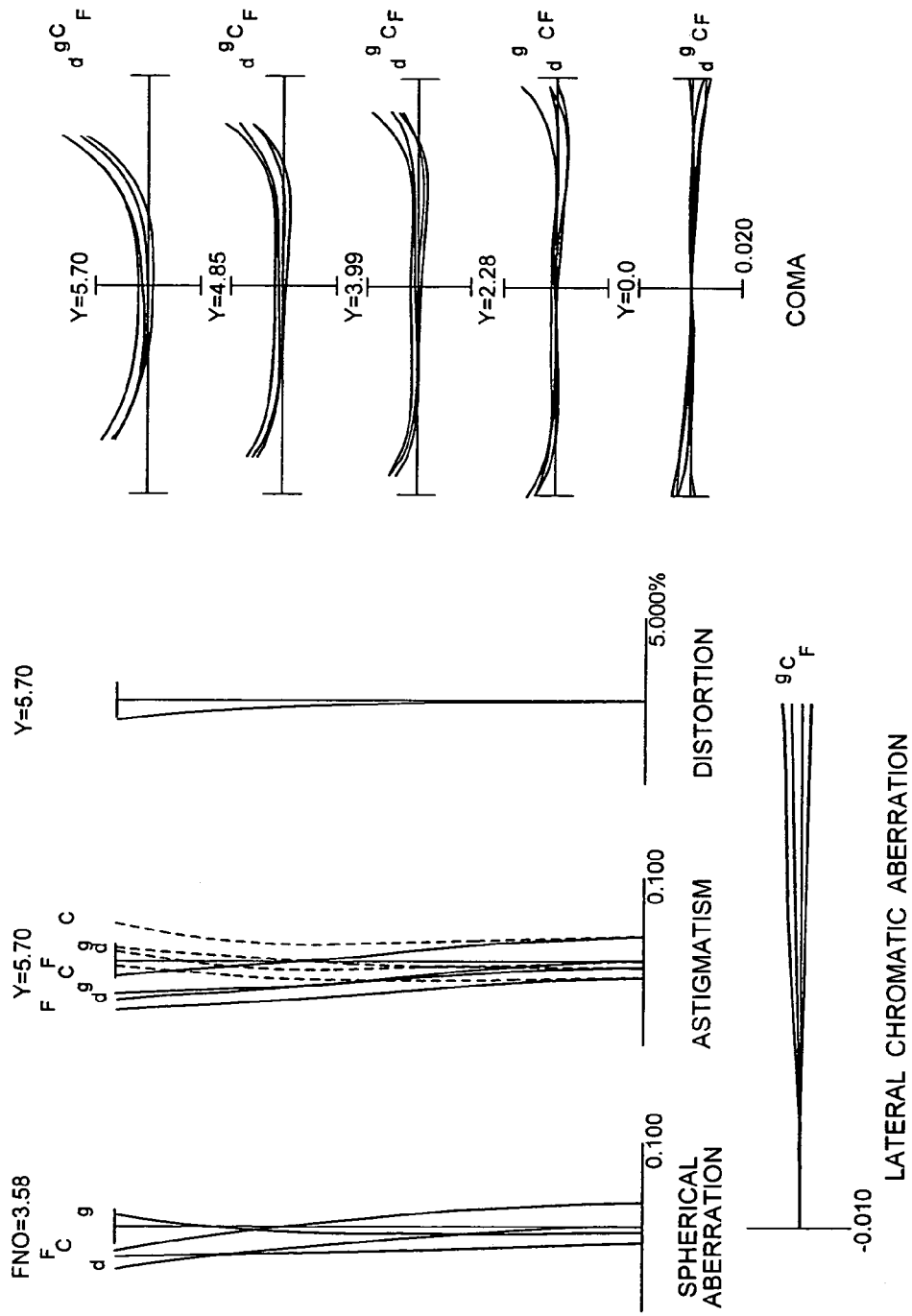
FIG. 10 is graphs showing various aberrations of the wide zoom lens system according to Example 2 of the present invention in the intermediate focal length state focusing on infinity.
Figure 11:
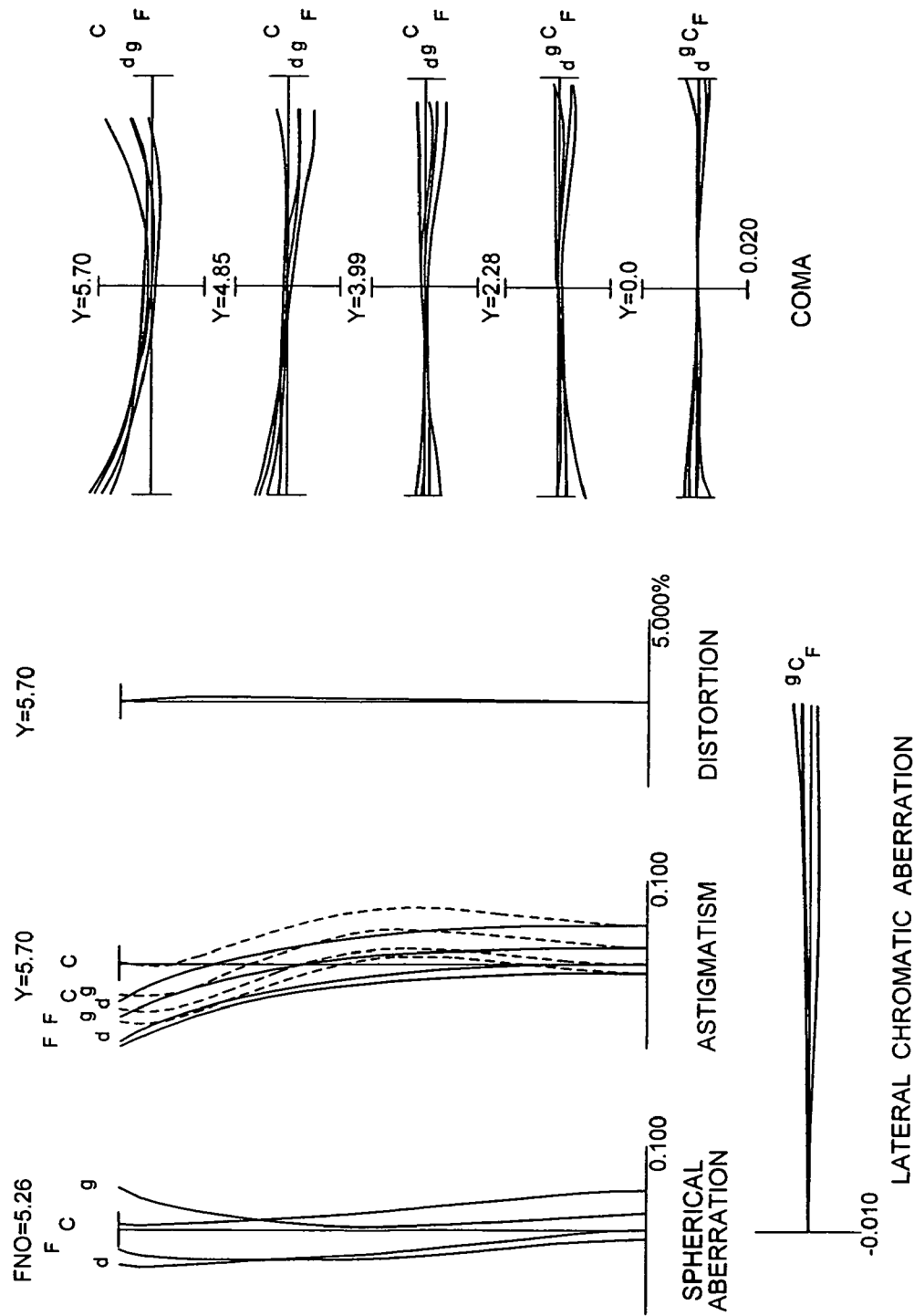
FIG. 11 is graphs showing various aberrations of the wide zoom lens system according to Example 2 of the present invention in the telephoto end state focusing on infinity.
Figure 12:
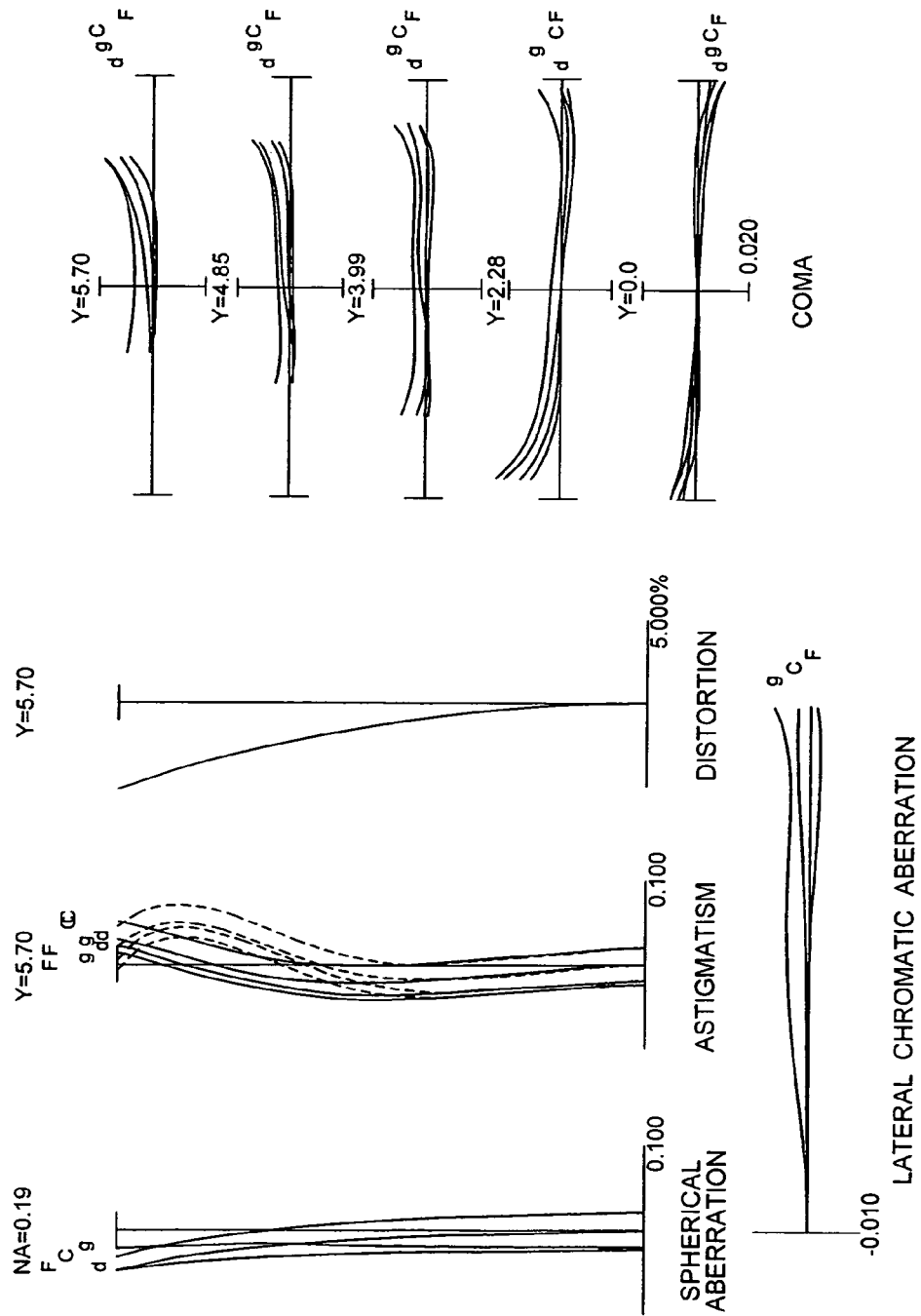
FIG. 12 is graphs showing various aberrations of the wide zoom lens system according to Example 2 of the present invention in the wide-angle end state where the shooting distance R is 500 mm.
Figure 13:
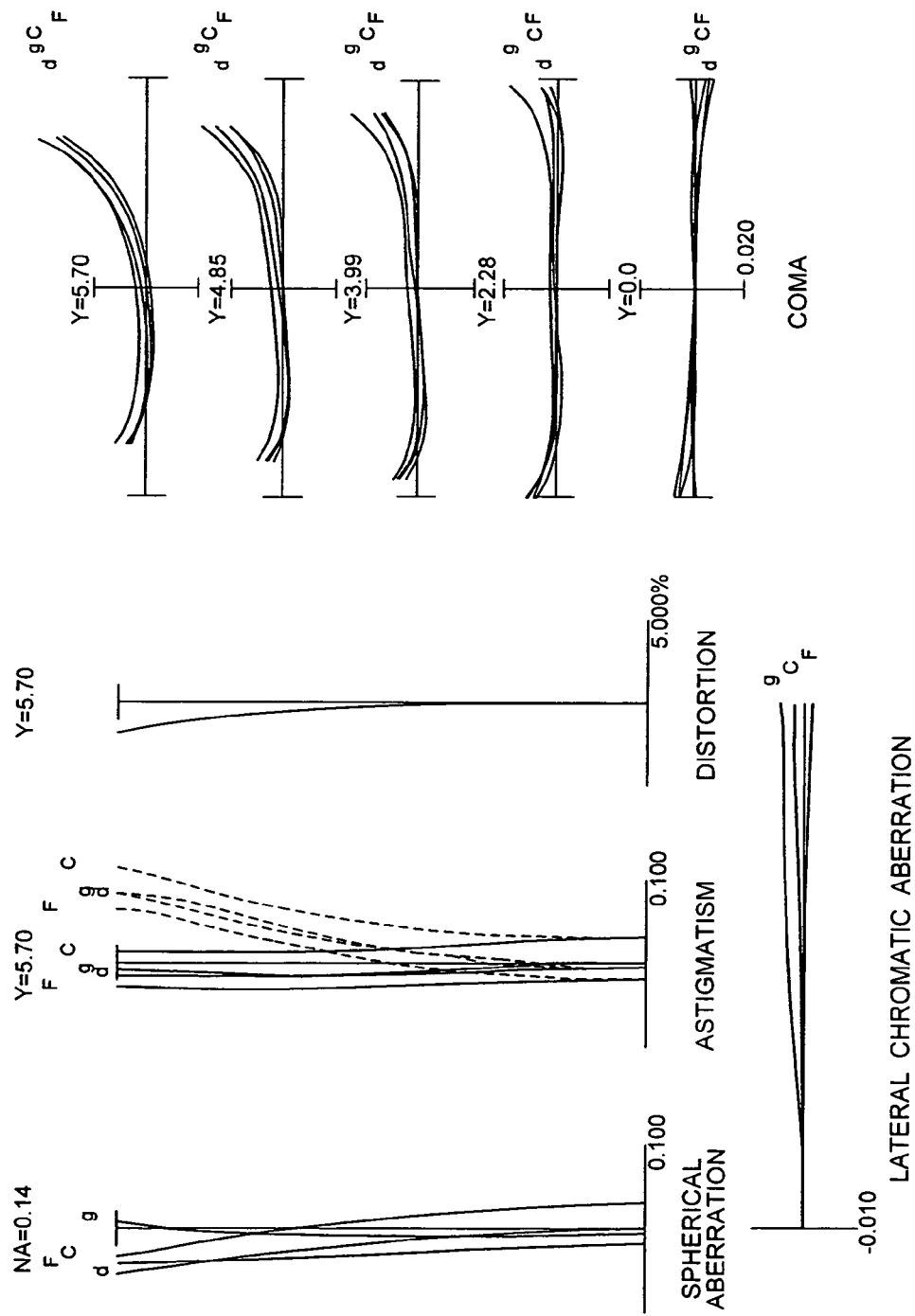
FIG. 13 is graphs showing various aberrations of the wide zoom lens system according to Example 2 of the present invention in the intermediate focal length state where the shooting distance R is 500 mm.
Figure 14:
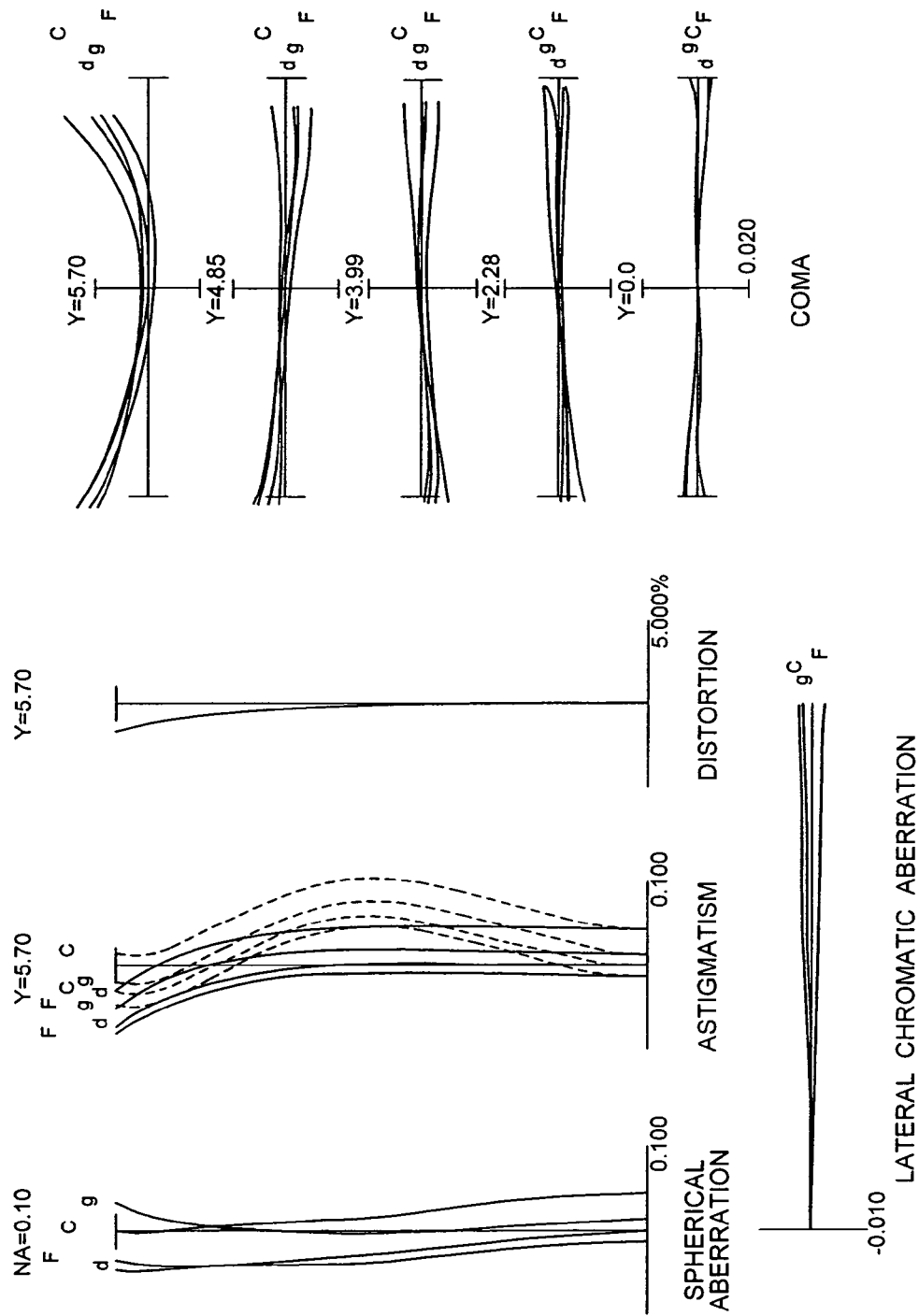
FIG. 14 is graphs showing various aberrations of the wide zoom lens system according to Example 2 of the present invention in the telephoto end state where the shooting distance R is 500 mm.

FIG. 9 is graphs showing various aberrations of the wide zoom lens system according to Example 2 of the present invention in the wide-angle end state focusing on infinity. FIG. 10 is graphs showing various aberrations of the wide zoom lens system according to Example 2 of the present invention in the intermediate focal length state focusing on infinity. FIG. 11 is graphs showing various aberrations of the wide zoom lens system according to Example 2 of the present invention in the telephoto end state focusing on infinity. FIG. 12 is graphs showing various aberrations of the wide zoom lens system according to Example 2 of the present invention in the wide-angle end state where the shooting distance R is 500 mm. FIG. 13 is graphs showing various aberrations of the wide zoom lens system according to Example 2 of the present invention in the intermediate focal length state where the shooting distance R is 500 mm. FIG. 14 is graphs showing various aberrations of the wide zoom lens system according to Example 2 of the present invention in the telephoto end state where the shooting distance R is 500 mm.

As is apparent from the respective graphs, the wide zoom lens system according to Example 2 shows superb optical performance as a result of good corrections to various aberrations in each focal length state from the wide-angle end state to the telephoto end state.

EXAMPLE 3

Figure 15:
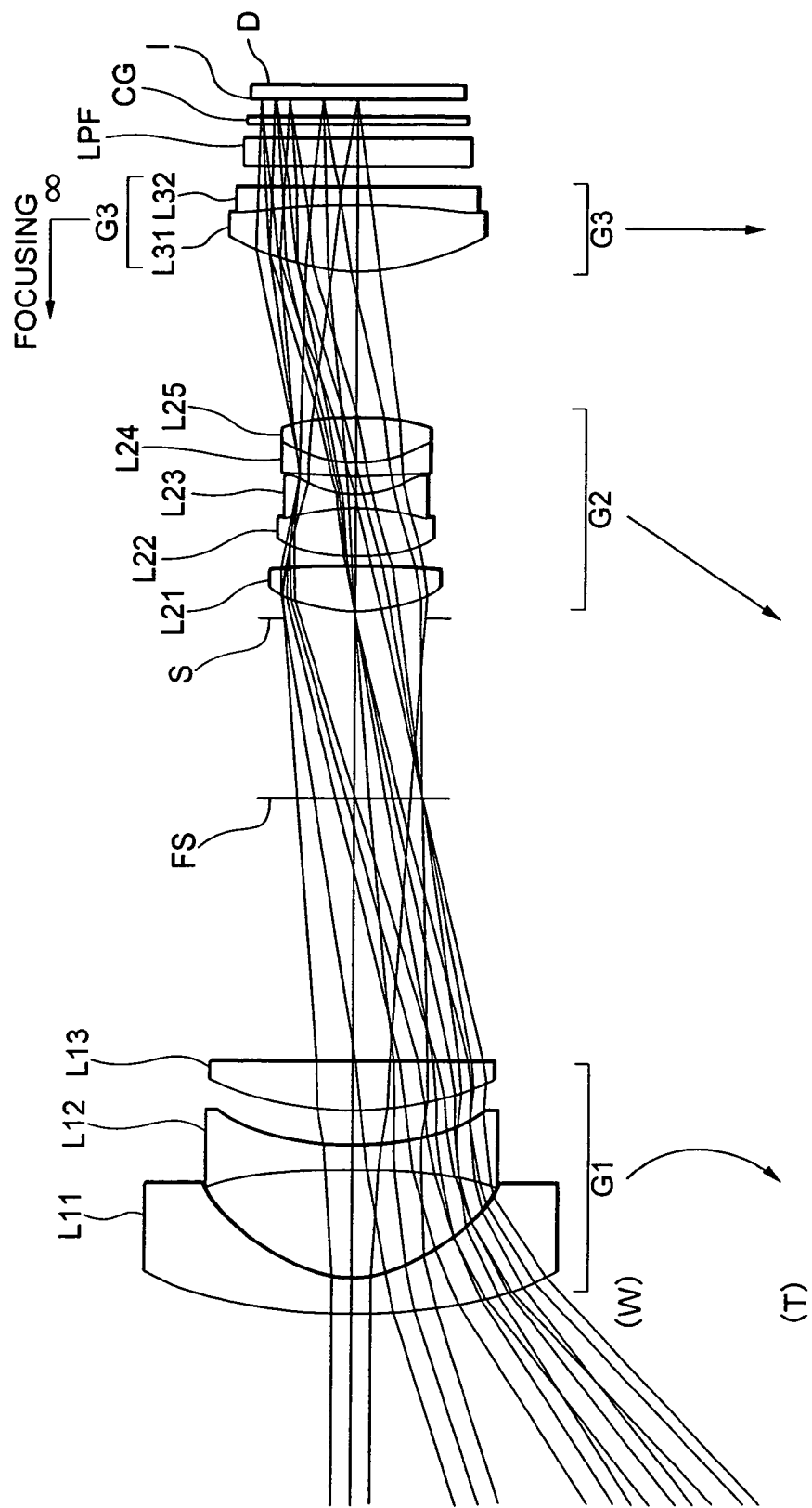
FIG. 15 is a diagram showing a lens configuration of a wide zoom lens system according to Example 3 of the present invention.

FIG. 15 is a diagram showing a lens configuration of a wide zoom lens system according to Example 3 of the present invention.

In FIG. 15, the wide zoom lens system according to Example 3 is composed of, in order from an object, a first lens group G1 having negative refractive power, a flare stopper FS, an aperture stop S, a second lens group G2 having positive refractive power, and a third lens group G4 having positive refractive power. The first lens group G1 is composed of, in order from the object, a negative meniscus lens L11 having convex surface facing to the object, a double concave negative lens L12, and a positive meniscus lens L13 having a convex surface facing to the object. The second lens group G2 is composed of, in order from the object, a double convex positive lens L21, a cemented lens constructed by a double convex positive lens L22 cemented with a double concave negative lens L23, and a cemented lens constructed by a negative meniscus lens L24 having convex surface facing to the object cemented with a double convex positive lens L25. The third lens group G4 is composed of a cemented lens constructed by, in order from the object, a double convex positive lens L31 cemented with a double concave negative lens L32. The image side surface of the negative meniscus lens L11 of the first lens group G1, the object side surface of the positive lens L21 in the second lens group G2, and the object side surface of the positive lens L31 in the third lens group G4 are composed of respective aspherical surfaces. An optical low-pass filter LPF and a cover glass CG for an imaging device D disposed in the image plane I are arranged between the third lens group G4 and the image plane I. The aperture stop S is moved together with the second lens group G2 in a body.

When a state of lens group positions varies from a wide-angle end state W to a telephoto end state T, the third lens group G4 is fixed relative to the image plane I, and the first lens group G1 and the second lens group G2 are moved. Focusing from infinity to a close object is carried out by moving the third lens group G4 to the object side.

With this construction, a wide angle of view of 87 degrees or more in the wide-angle end state is accomplished with securing high optical performance.

Various values associated with the wide zoom lens system according to Example 3 are listed in Table 3.

TABLE 3

[Specifications]

|  | W | T |
|---|---|---|
| f = | 6.28 | 21.00 |
| Bf = | 0.99 |  |
| FNO = | 2.68 | 5.14 |
| 2A = | 87.29 | 30.34 |
| y = | 5.70 |  |

[Lens Data]

|  | r | d | vd | nd |
|---|---|---|---|---|
| 1) | 33.2600 | 2.2000 | 45.53 | 1.754000 |
| 2*) | 8.2752 | 6.4000 |  |  |
| 3) | −36.5301 | 1.3000 | 81.61 | 1.497000 |
| 4) | 16.3217 | 2.2000 |  |  |
| 5) | 21.4070 | 2.7000 | 32.35 | 1.850260 |
| 6) | 372.1116 | (D1) |  |  |
| 7) | ∞ | (D2) | Flare Stopper FS | |
| 8> | ∞ | 0.5000 | Aperture stop S | |
| 9*) | 10.2651 | 2.6000 | 59.10 | 1.583320 |
| 10) | −74.0767 | 0.6000 |  |  |
| 11) | 11.2830 | 3.0000 | 50.88 | 1.658440 |
| 12) | −13.8170 | 0.9000 | 39.59 | 1.804400 |
| 13) | 7.5054 | 0.9000 |  |  |
| 14) | 30.6648 | 0.9000 | 37.95 | 1.723420 |
| 15) | 8.3512 | 2.6000 | 81.61 | 1.497000 |
| 16) | −19.1954 | (D3) |  |  |
| 17*) | 15.4428 | 3.9000 | 57.44 | 1.606020 |
| 18) | −51.2130 | 1.0000 | 23.78 | 1.846660 |
| 19) | 452.1588 | (D4) |  |  |
| 20) | ∞ | 1.7200 | 64.20 | 1.516800 |
| 21) | ∞ | 0.7640 |  |  |
| 22) | ∞ | 0.5000 | 64.20 | 1.516800 |
| 23) | ∞ | (Bf) |  |  |

[Aspherical Data]

Surface Number 2

$\kappa = 0.3333$
$C4 = 1.41260E−05$
$C6 = 2.17950E−07$
$C8 = 5.15730E−11$
$C10 = 1.61800E−12$ Surface Number 9

$\kappa = 0.3833$
$C4 = 1.69550E−06$
$C6 = 1.45000E−07$
$C8 = 5.86320E−09$
$C10 = −4.19770E−11$ Surface Number 17

$\kappa = 1.2219$
$C4 = −4.70030E−06$
$C6 = −1.53280E−07$
$C8 = 1.02090E−08$
$C10 = −9.81410E−11$

[Variable Distances]

|  | W | M | T |
|---|---|---|---|
| <upon focusing on infinity> | | | |
| R = | ∞ | ∞ | ∞ |
| f = | 6.28000 | 11.50000 | 21.00000 |
| D0 = | ∞ | ∞ | ∞ |
| D1 = | 15.89963 | 0.34444 | 0.30000 |
| D2 = | 11.00000 | 11.00000 | 2.57862 |
| D3 = | 8.79701 | 17.27888 | 32.71522 |
| D4 = | 1.22320 | 1.22320 | 1.22320 |
| Bf = | 0.99000 | 0.99000 | 0.99000 |

TABLE 3-continued

<upon focusing on a close object>

| R = | 500 | 500 | 500 |
|---|---|---|---|
| β = | −0.01426 | −0.02553 | −0.04569 |
| D0 = | 427.4061 | 434.4797 | 427.5089 |
| D1 = | 15.89963 | 0.34444 | 0.30000 |
| D2 = | 11.00000 | 11.00000 | 2.57862 |
| D3 = | 8.60257 | 16.65557 | 30.80660 |
| D4 = | 1.41764 | 1.84650 | 3.13182 |
| Bf = | 0.99000 | 0.99000 | 0.99000 |

[Values for Conditional Expressions]

| (1A): ν12 = | 81.610 |
|---|---|
| (1B): n12 + 0.007 × ν12 = | 2.068 |
| (2): n11 = | 1.754 |
| (3): n11 + 0.012 × ν11 = | 2.300 |
| (4): f2/f1 = | −1.199 |
| (5): f3/f2 = | 1.604 |
| (6): D23W/f2 = | 0.470 |
| (7): ν13 = | 32.350 |
| (8): n13 = | 1.850 |
| (9): f1/r12A = | 0.427 |
| (10A): ν25 = | 81.610 |
| (10B): n25 + 0.007 × ν25 = | 2.068 |
| (11): ν23 = | 39.590 |
| (12): n23 = | 1.804 |

Figure 16:
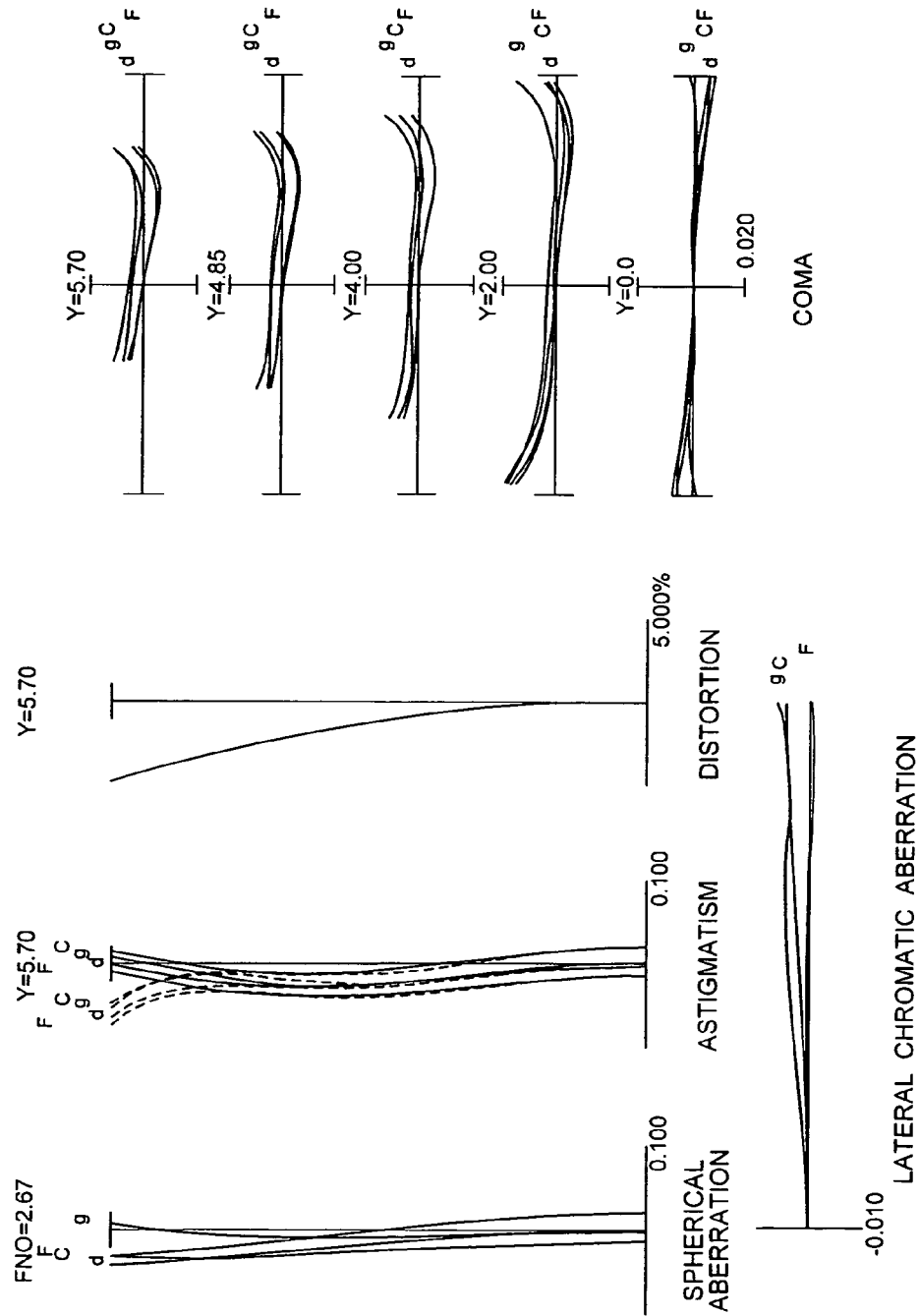
FIG. 16 is graphs showing various aberrations of the wide zoom lens system according to Example 3 of the present invention in the wide-angle end state focusing on infinity.
Figure 17:
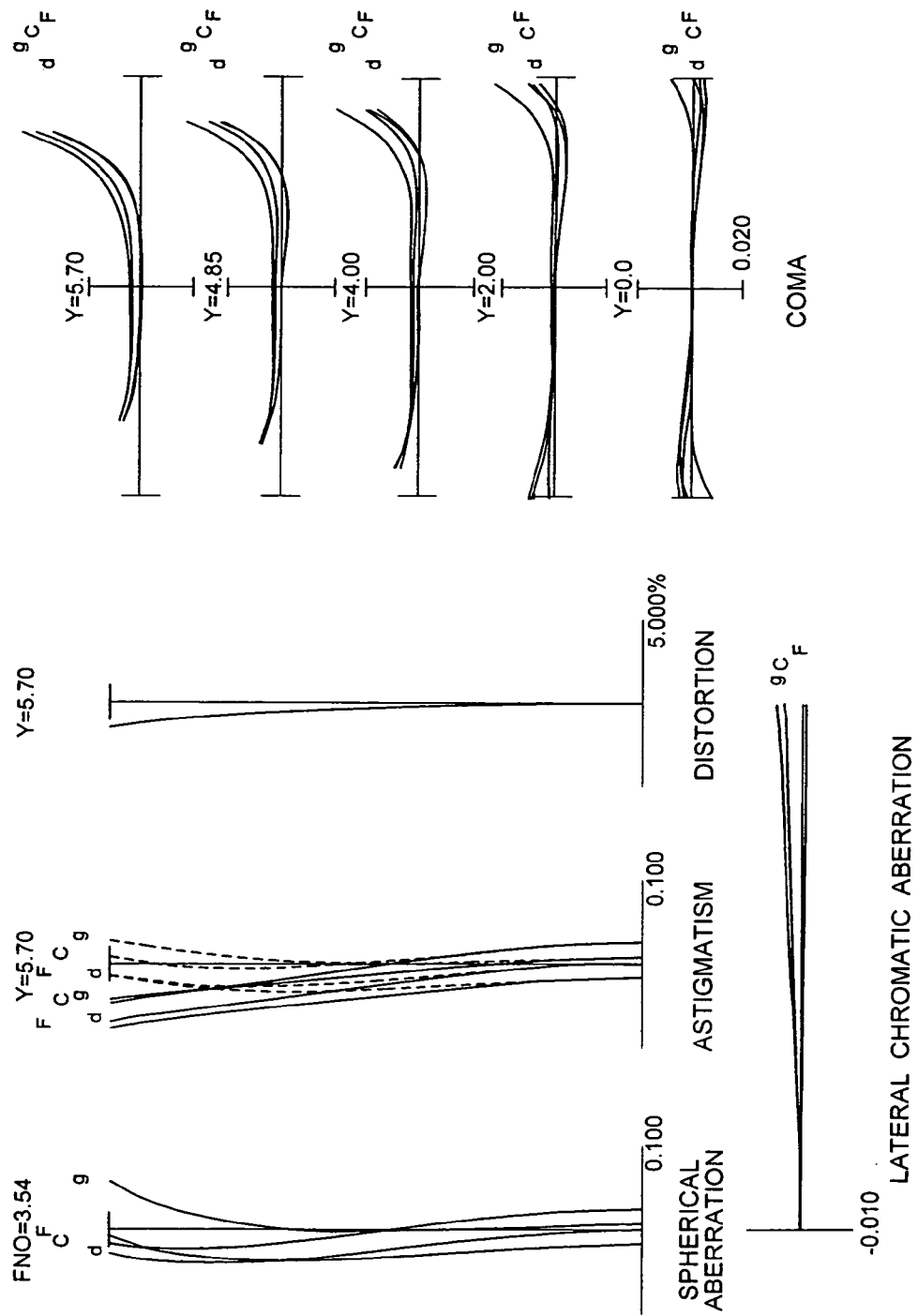
FIG. 17 is graphs showing various aberrations of the wide zoom lens system according to Example 3 of the present invention in the intermediate focal length state focusing on infinity.
Figure 18:
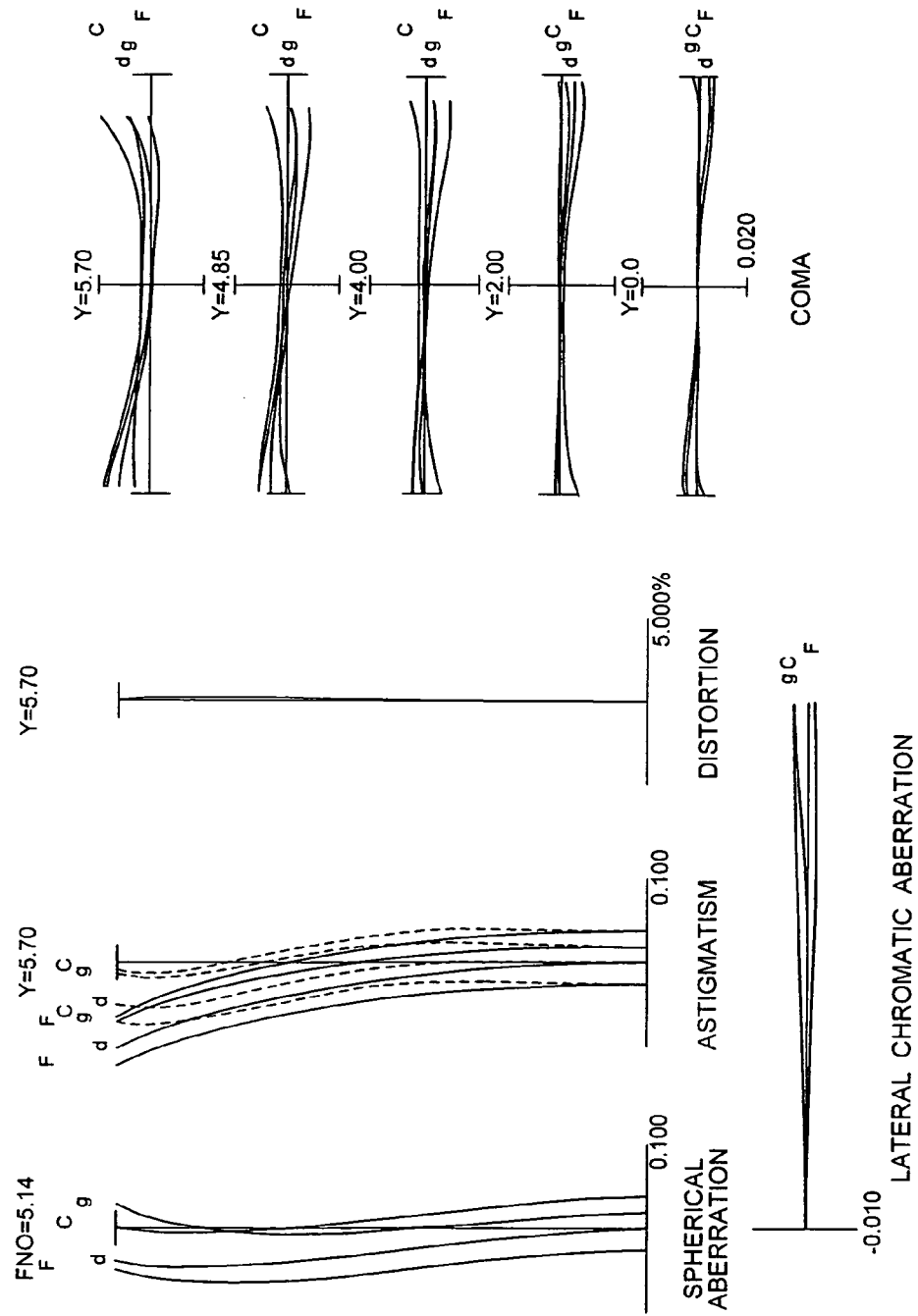
FIG. 18 is graphs showing various aberrations of the wide zoom lens system according to Example 3 of the present invention in the telephoto end state focusing on infinity.
Figure 19:
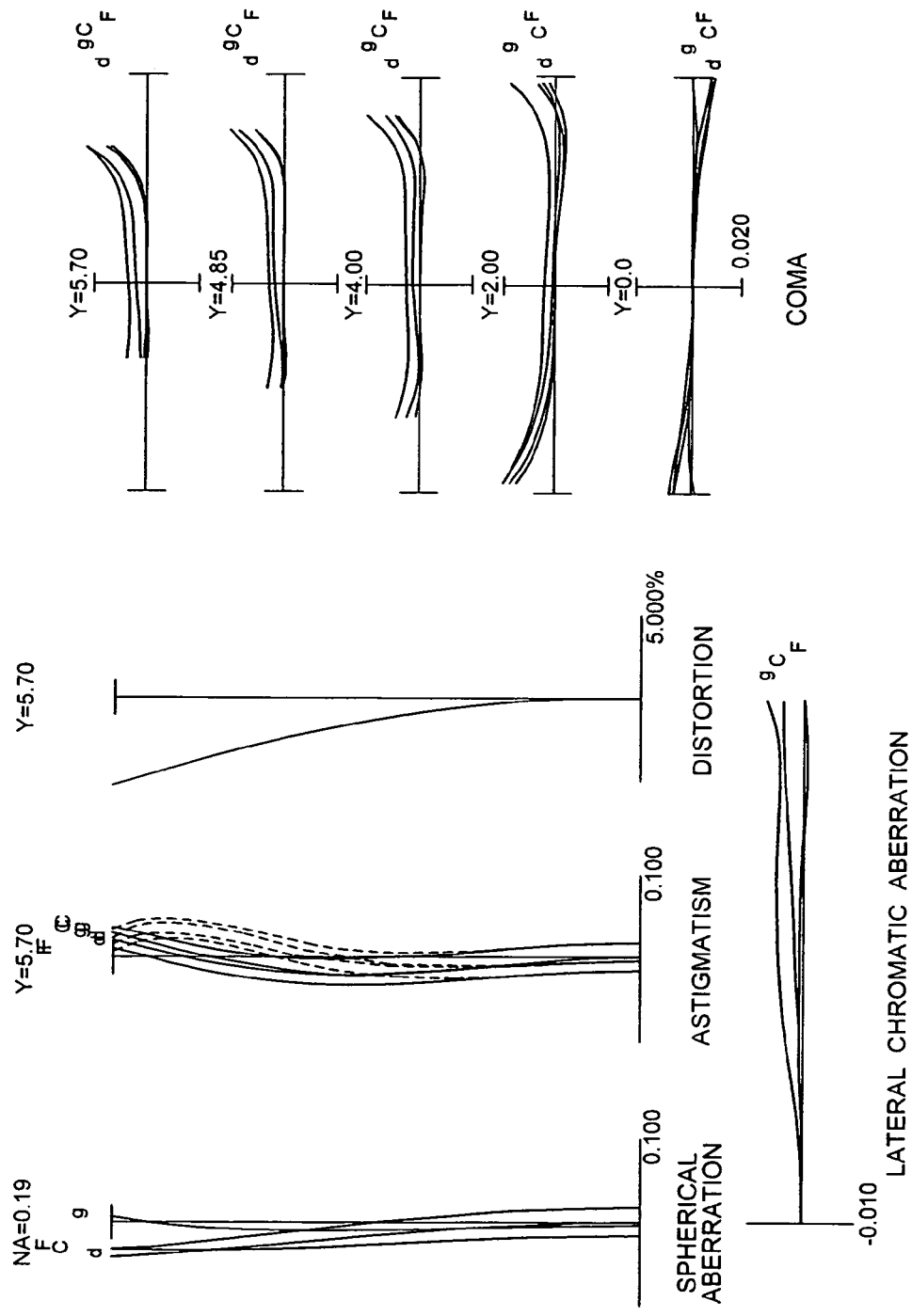
FIG. 19 is graphs showing various aberrations of the wide zoom lens system according to Example 3 of the present invention in the wide-angle end state where the shooting distance R is 500 mm.
Figure 21:
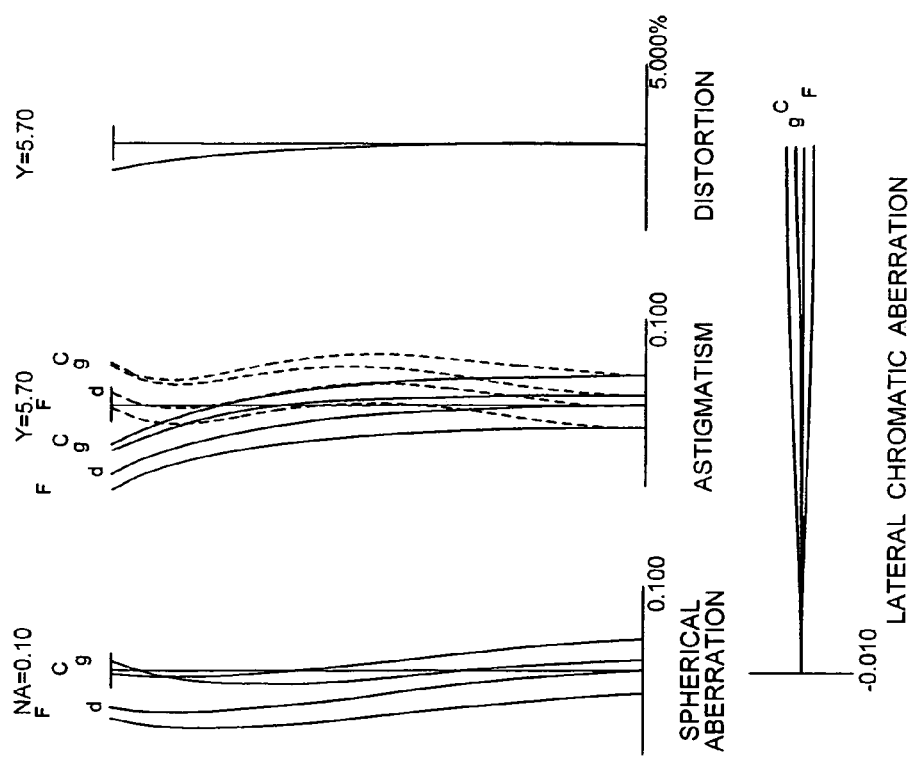
FIG. 21 is graphs showing various aberrations of the wide zoom lens system according to Example 3 of the present invention in the telephoto end state where the shooting distance R is 500 mm.

FIG. 16 is graphs showing various aberrations of the wide zoom lens system according to Example 3 of the present invention in the wide-angle end state focusing on infinity. FIG. 17 is graphs showing various aberrations of the wide zoom lens system according to Example 3 of the present invention in the intermediate focal length state focusing on infinity. FIG. 18 is graphs showing various aberrations of the wide zoom lens system according to Example 3 of the present invention in the telephoto end state focusing on infinity. FIG. 19 is graphs showing various aberrations of the wide zoom lens system according to Example 3 of the present invention in the wide-angle end state where the shooting distance R is 500 mm. FIG. 20 is graphs showing various aberrations of the wide zoom lens system according to Example 3 of the present invention in the intermediate focal length state where the shooting distance R is 500 mm. FIG. 21 is graphs showing various aberrations of the wide zoom lens system according to Example 3 of the present invention in the telephoto end state where the shooting distance R is 500 mm.

As is apparent from the respective graphs, the wide zoom lens system according to Example 3 shows superb optical performance as a result of good corrections to various aberrations in each focal length state from the wide-angle end state to the telephoto end state.

EXAMPLE 4

Figure 22:
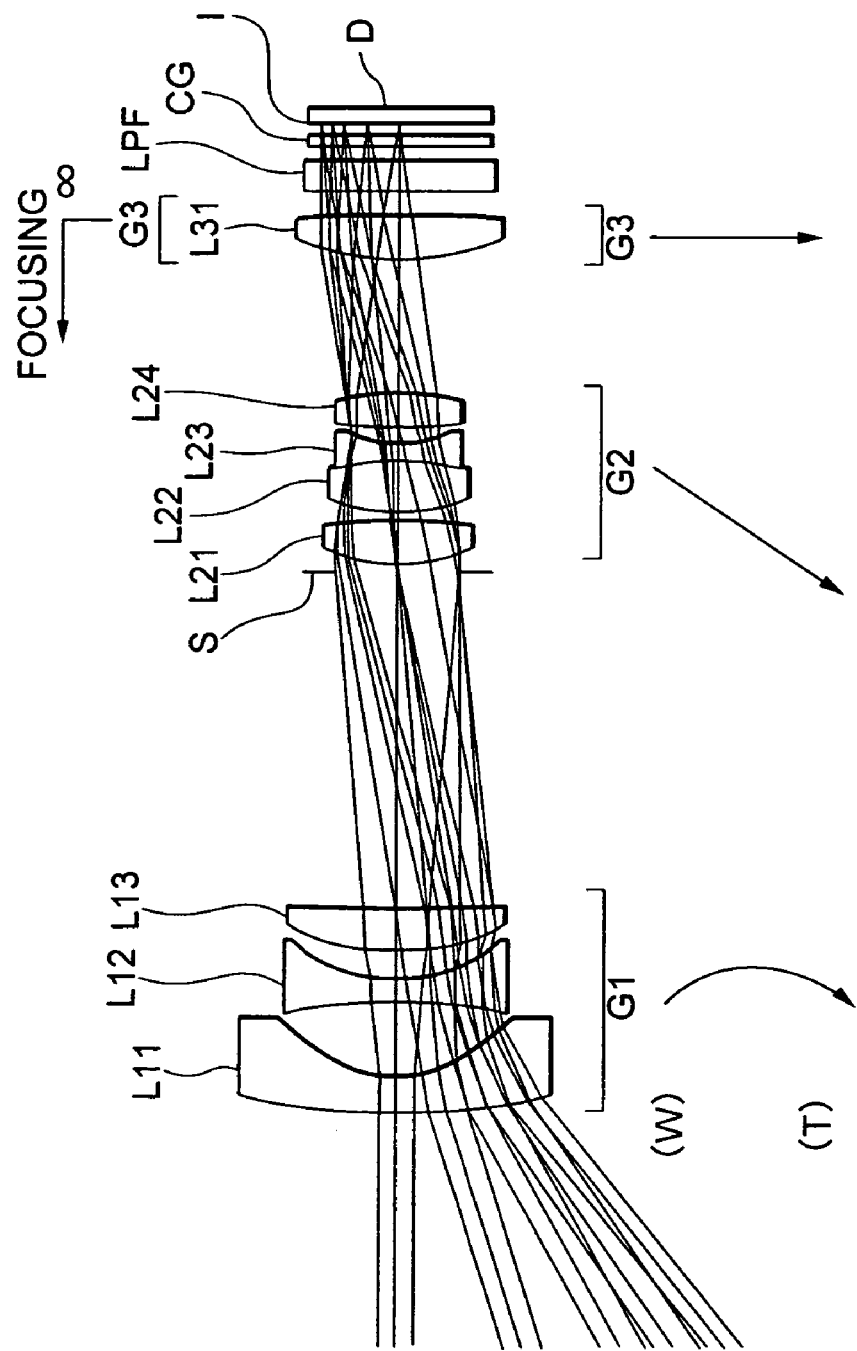
FIG. 22 is a diagram showing a lens configuration of a wide zoom lens system according to Example 4 of the present invention.

FIG. 22 is a diagram showing a lens configuration of a wide zoom lens system according to Example 4 of the present invention.

In FIG. 22, the wide zoom lens system according to Example 4 is composed of, in order from an object, a first lens group G1 having negative refractive power, an aperture stop S, a second lens group G2 having positive refractive power, and a third lens group G4 having positive refractive power. The first lens group G1 is composed of, in order from the object, a negative meniscus lens L11 having convex surface facing to the object, a double concave negative lens L12, and a positive meniscus lens L13 having a convex surface facing to the object. The second lens group G2 is composed of, in order from the object, a double convex positive lens L21, a cemented lens constructed by a double convex positive lens L22 cemented with a double concave negative lens L23, and a double convex positive lens L24. The third lens group G3 is composed of a double convex positive lens L31. The image side surface of the negative meniscus lens L11 of the first lens group G1, and the object side surface of the positive lens L21 in the second lens group G2 are composed of respective aspherical surfaces. An optical low-pass filter LPF and a cover glass CG for an imaging device D disposed in the image plane I are arranged between the third lens group G3 and the image plane I. The aperture stop S is moved together with the second lens group G2 in a body.

When a state of lens group positions varies from a wide-angle end state W to a telephoto end state T, the third lens group G3 is fixed relative to the image plane I, and the first lens group G1 and the second lens group G2 are moved. Focusing from infinity to a close object is carried out by moving the third lens group G3 to the object side.

With this construction, a wide angle of view of 78 degrees or more in the wide-angle end state is accomplished with securing high optical performance.

Various values associated with the wide zoom lens system according to Example 4 are listed in Table 4.

TABLE 4

[Specifications]

|  | W | T |
|---|---|---|
| f = | 4.82 | 13.80 |
| Bf = | 0.59 |  |
| FNO = | 2.68 | 4.68 |
| 2A = | 78.54 | 30.42 |
| y = | 3.75 |  |

[Lens Data]

|  | r | d | νd | nd |
|---|---|---|---|---|
| 1) | 29.4589 | 1.7000 | 45.45 | 1.750390 |
| 2*) | 6.1061 | 3.6000 |  |  |
| 3) | −29.9473 | 1.1000 | 81.61 | 1.497000 |
| 4) | 8.1590 | 1.3445 |  |  |
| 5) | 11.6574 | 2.0000 | 32.35 | 1.850260 |
| 6) | 95.5803 | (D1) |  |  |
| 7> | ∞ | 0.4000 | Aperture Stop S | |
| 8*) | 7.4179 | 2.1000 | 59.10 | 1.583320 |
| 9) | −47.5145 | 0.5000 |  |  |
| 10) | 9.5928 | 2.5000 | 50.88 | 1.658440 |
| 11) | −11.8535 | 0.8000 | 32.35 | 1.850260 |
| 12) | 5.4880 | 0.8000 |  |  |
| 13) | 24.5360 | 1.7000 | 81.61 | 1.497000 |
| 14) | −12.1430 | (D2) |  |  |
| 15) | 12.0000 | 2.1000 | 70.24 | 1.487490 |
| 16) | −161.0078 | (D3) |  |  |
| 17) | ∞ | 1.5200 | 64.20 | 1.516800 |
| 18) | ∞ | 0.7000 |  |  |
| 19) | ∞ | 0.5000 | 64.20 | 1.516800 |
| 20) | ∞ | (Bf) |  |  |

[Aspherical Data]

Surface Number 2

κ = 0.2060
C4 = 5.00720E−05
C6 = 4.05050E−07
C8 = −1.61780E−08
C10 = −8.34980E−10

TABLE 4-continued

Surface Number 8

κ = 0.4471
C4 = −5.92060E−05
C6 = −1.01470E−06
C8 = 1.27110E−07
C10 = −4.36460E−09

[Variable Distances]

| | W | M | T |
|---|---|---|---|
| <upon focusing on infinity> | | | |
| R = | ∞ | ∞ | ∞ |
| f = | 4.82000 | 8.20000 | 13.80000 |
| D0 = | ∞ | ∞ | ∞ |
| D1 = | 16.38732 | 7.59421 | 2.50581 |
| D2 = | 6.53918 | 11.75799 | 20.40453 |
| D3 = | 1.18380 | 1.18380 | 1.18380 |
| Bf = | 0.59000 | 0.59000 | 0.59000 |
| <upon focusing on a close object> | | | |
| R = | 300 | 300 | 300 |
| β = | −0.01846 | −0.03073 | −0.05073 |
| D0 = | 251.9350 | 255.5096 | 251.9514 |
| D1 = | 16.38732 | 7.59421 | 2.50581 |
| D2 = | 6.31863 | 11.15293 | 18.84424 |
| D3 = | 1.40435 | 1.78885 | 2.74409 |
| Bf = | 0.59000 | 0.59000 | 0.59000 |

[Values for Conditional Expressions]

| (1A): ν12 = | 81.610 |
|---|---|
| (1B): n12 + 0.007 × ν12 = | 2.068 |
| (2): n11 = | 1.750 |
| (3): n11 + 0.012 × ν11 = | 2.296 |
| (4): f2/f1 = | −1.200 |
| (5): f3/f2 = | 1.825 |
| (6): D23W/f2 = | 0.519 |
| (7): ν13 = | 32.350 |
| (8): n13 = | 1.850 |
| (9): f1/r12A = | 0.351 |
| (10A): ν25 = | 81.610 |
| (10B): n25 + 0.007 × ν25 = | 2.068 |
| (11): ν23 = | 32.350 |
| (12): n23 = | 1.850 |

Figure 23:
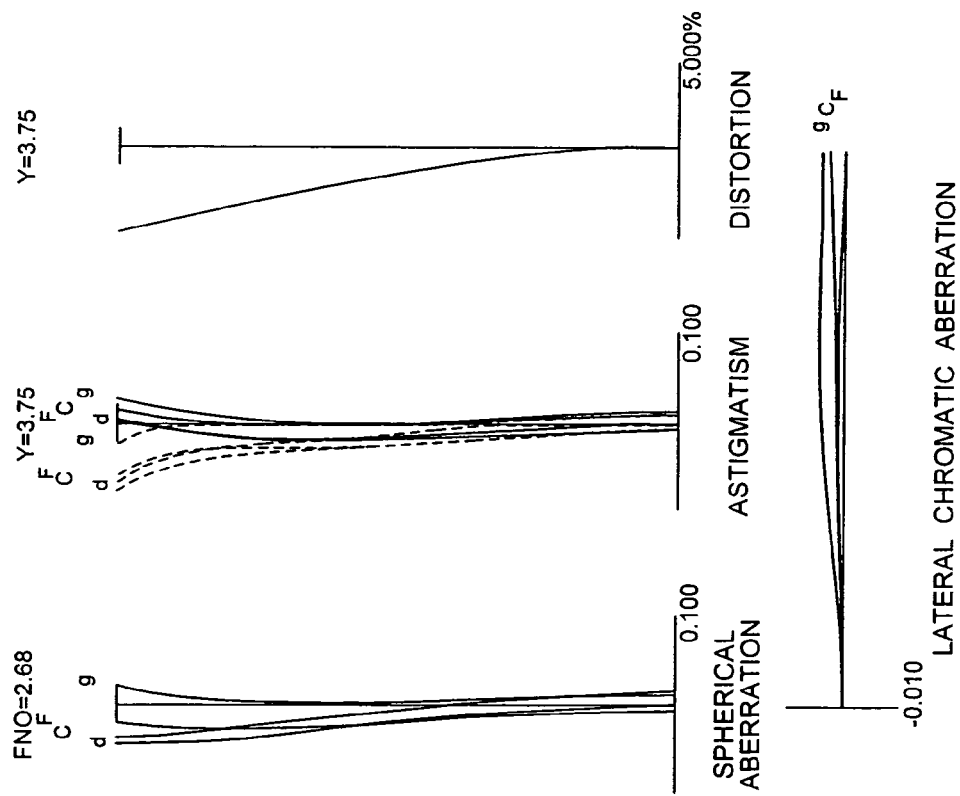
FIG. 23 is graphs showing various aberrations of the wide zoom lens system according to Example 4 of the present invention in the wide-angle end state focusing on infinity.
Figure 24:
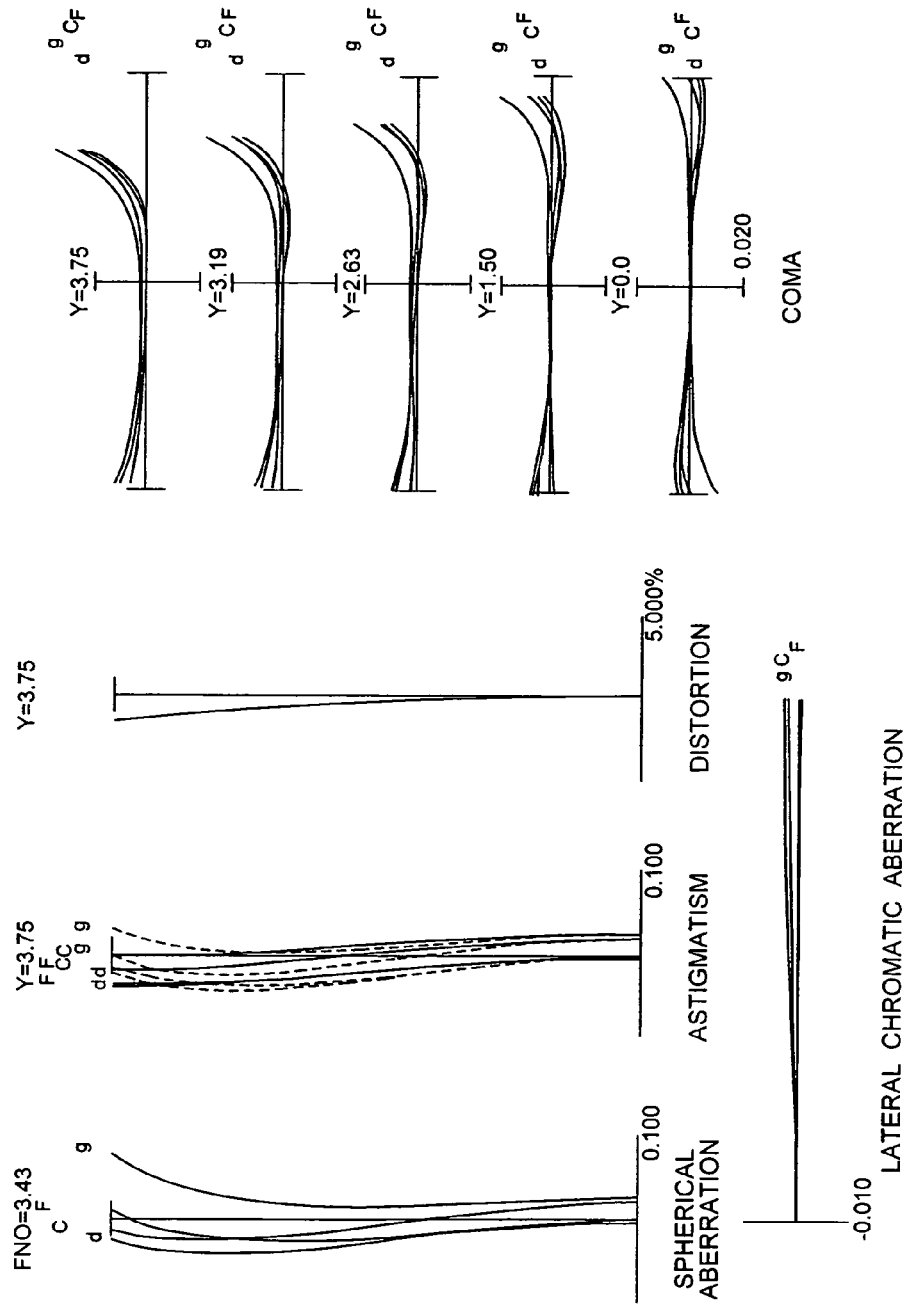
FIG. 24 is graphs showing various aberrations of the wide zoom lens system according to Example 4 of the present invention in the intermediate focal length state focusing on infinity.
Figure 25:
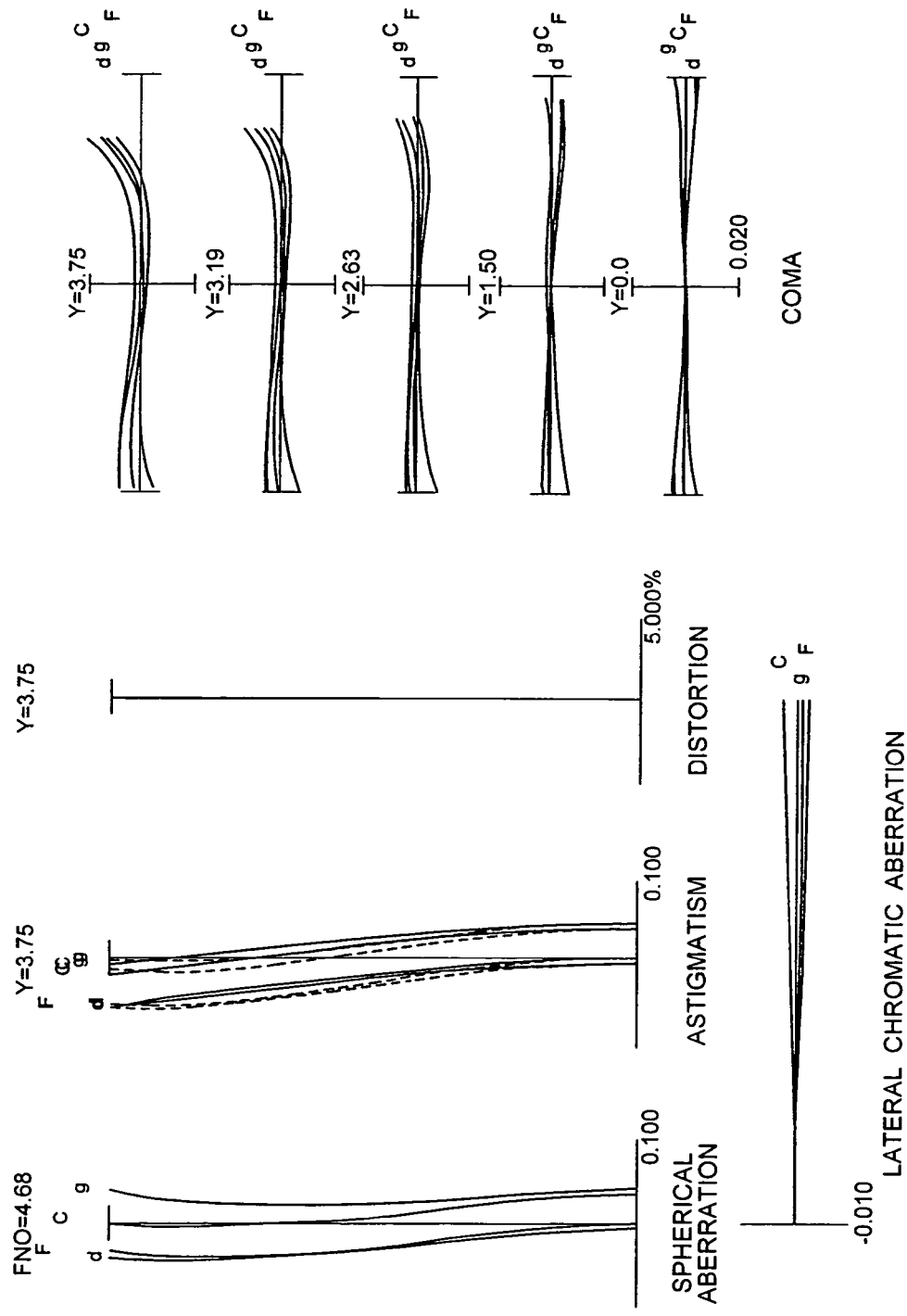
FIG. 25 is graphs showing various aberrations of the wide zoom lens system according to Example 4 of the present invention in the telephoto end state focusing on infinity.
Figure 26:
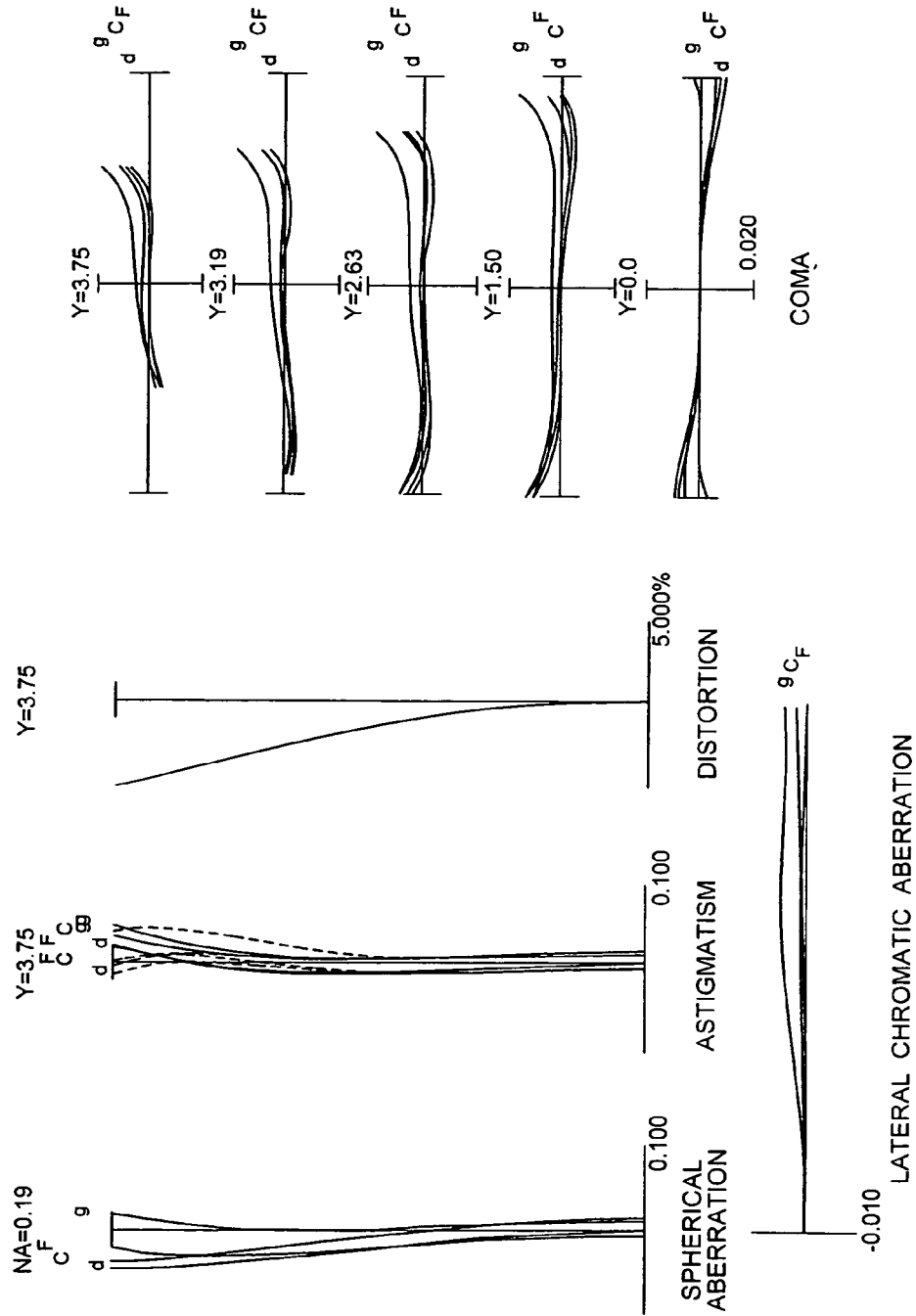
FIG. 26 is graphs showing various aberrations of the wide zoom lens system according to Example 4 of the present invention in the wide-angle end state where the shooting distance R is 300 mm.
Figure 27:
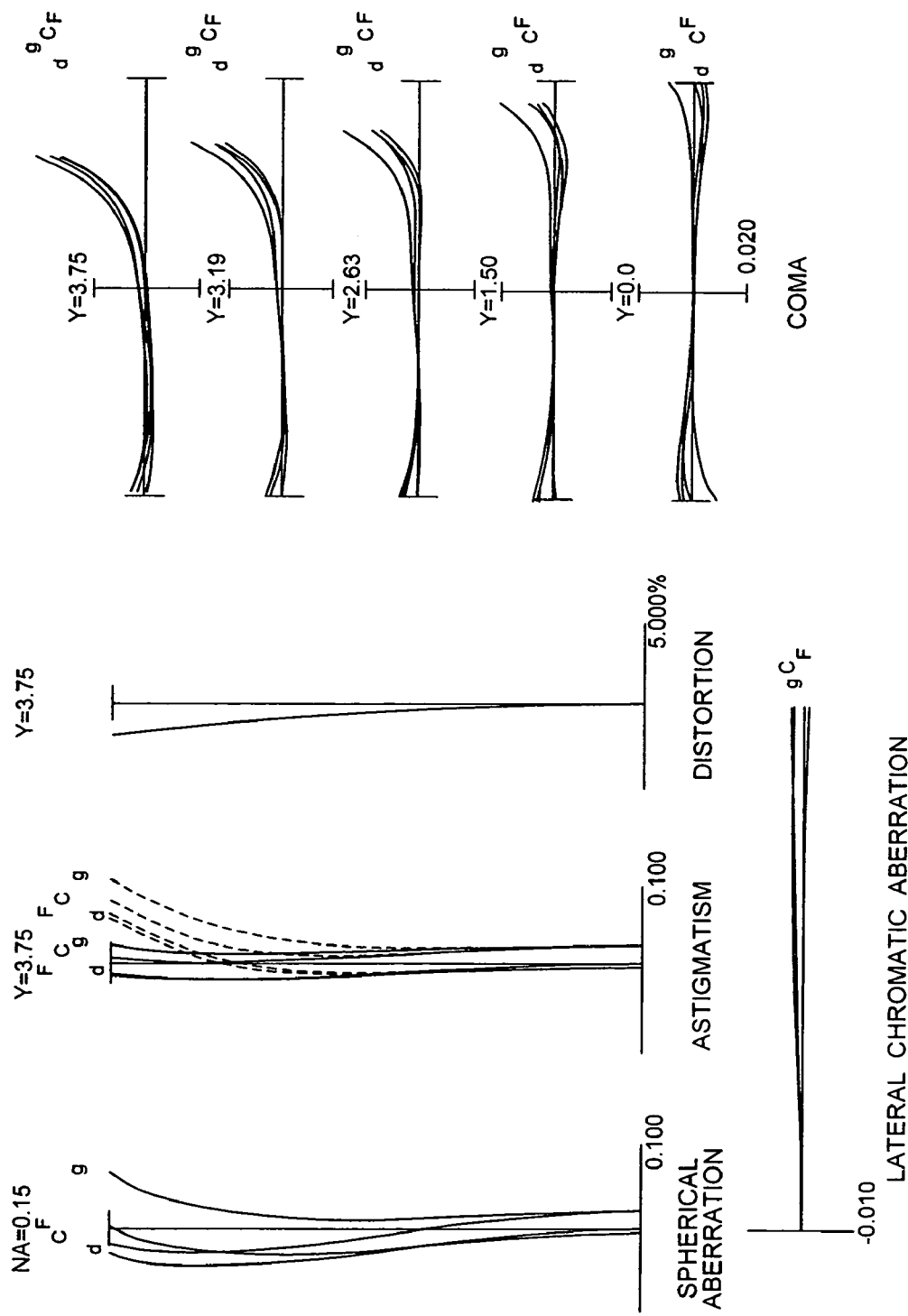
FIG. 27 is graphs showing various aberrations of the wide zoom lens system according to Example 4 of the present invention in the intermediate focal length state where the shooting distance R is 300 mm.
Figure 28:
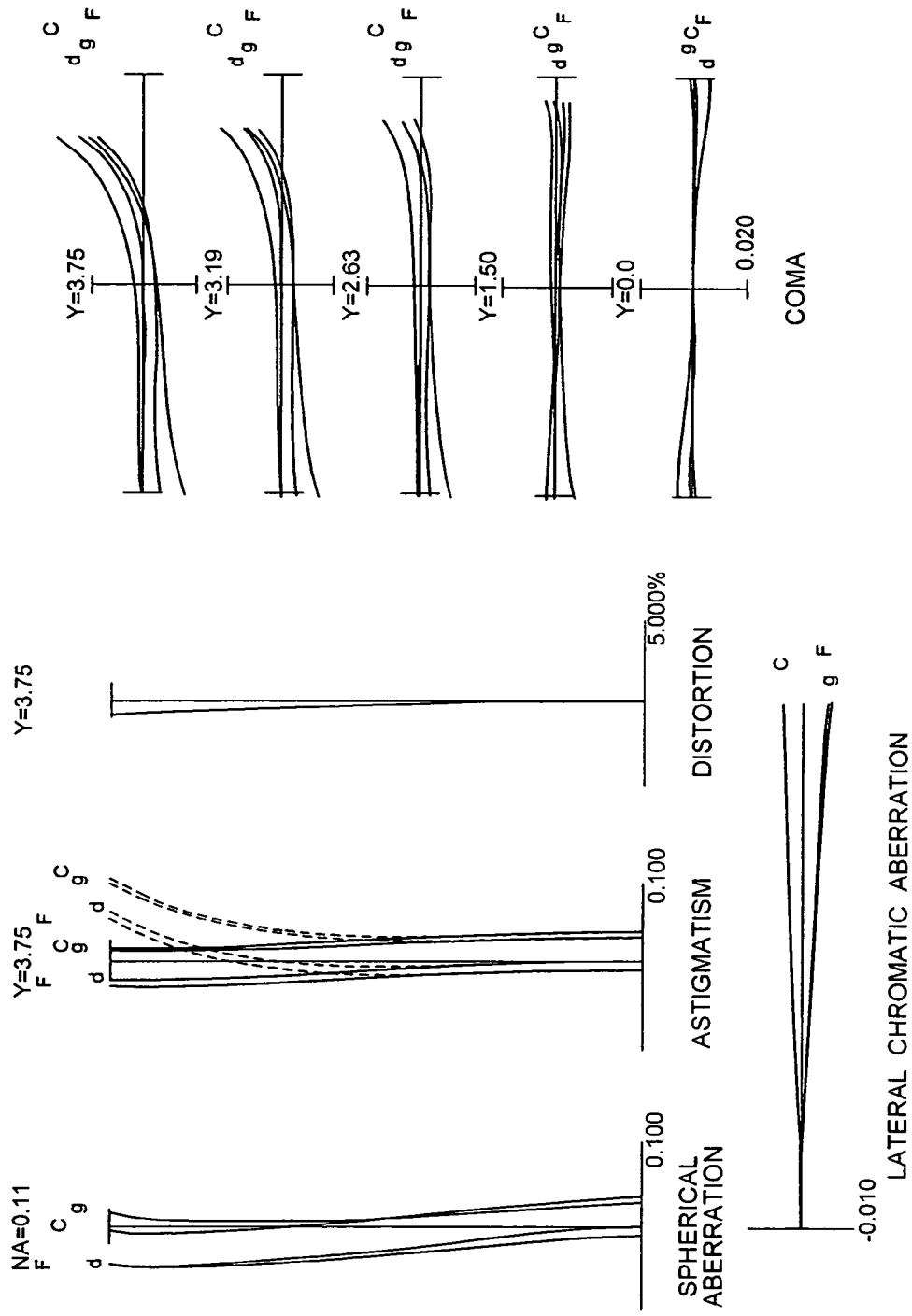
FIG. 28 is graphs showing various aberrations of the wide zoom lens system according to Example 4 of the present invention in the telephoto end state where the shooting distance R is 300 mm.

FIG. 23 is graphs showing various aberrations of the wide zoom lens system according to Example 4 of the present invention in the wide-angle end state focusing on infinity. FIG. 24 is graphs showing various aberrations of the wide zoom lens system according to Example 4 of the present invention in the intermediate focal length state focusing on infinity. FIG. 25 is graphs showing various aberrations of the wide zoom lens system according to Example 4 of the present invention in the telephoto end state focusing on infinity. FIG. 26 is graphs showing various aberrations of the wide zoom lens system according to Example 4 of the present invention in the wide-angle end state where the shooting distance R is 300 mm. FIG. 27 is graphs showing various aberrations of the wide zoom lens system according to Example 4 of the present invention in the intermediate focal length state where the shooting distance R is 300 mm. FIG. 28 is graphs showing various aberrations of the wide zoom lens system according to Example 4 of the present invention in the telephoto end state where the shooting distance R is 300 mm.

As is apparent from the respective graphs, the wide zoom lens system according to Example 4 shows superb optical performance as a result of good corrections to various aberrations in each focal length state from the wide-angle end state to the telephoto end state.

EXAMPLE 5

Figure 29:
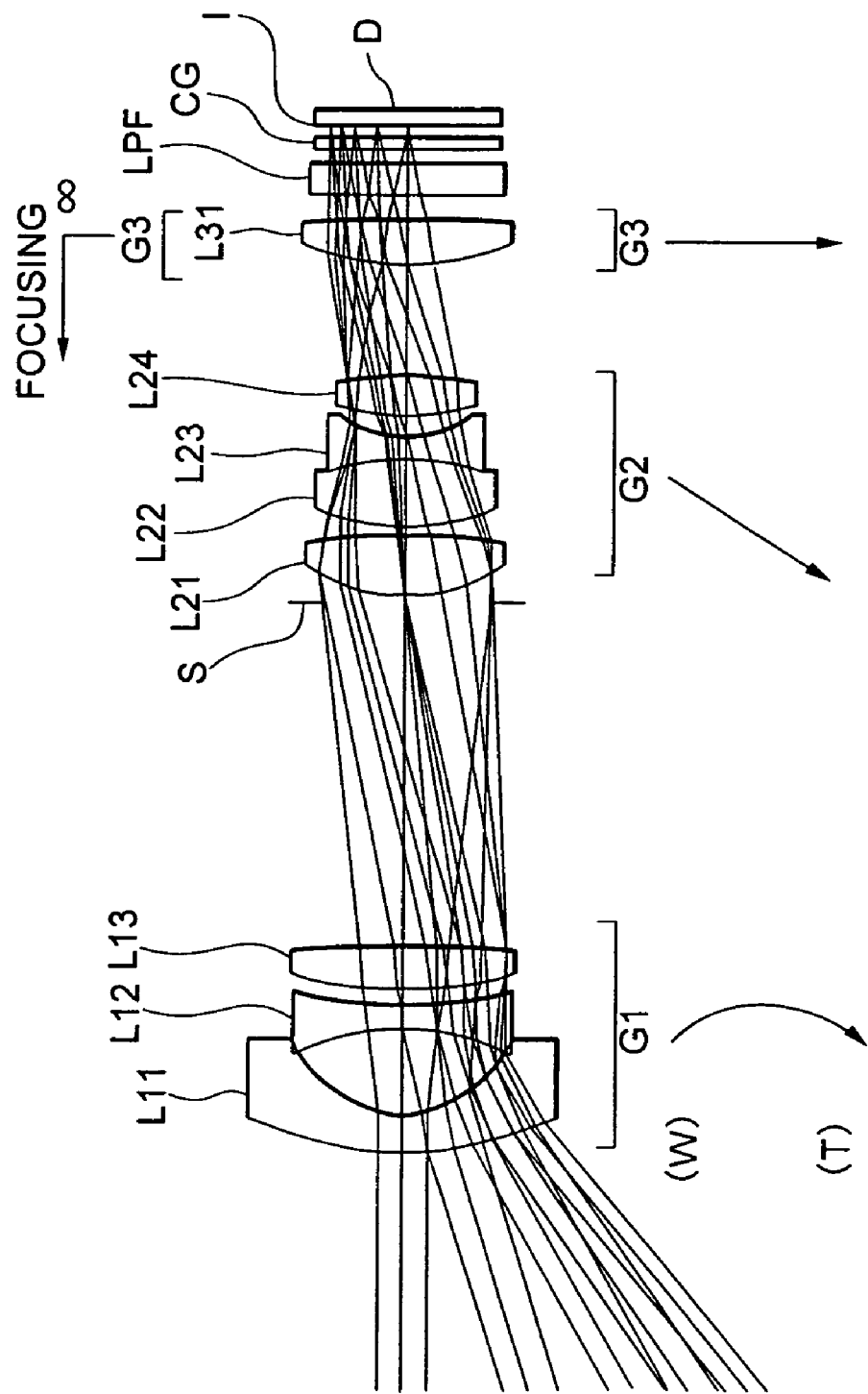
FIG. 29 is a diagram showing a lens configuration of a wide zoom lens system according to Example 5 of the present invention.

FIG. 29 is a diagram showing a lens configuration of a wide zoom lens system according to Example 5 of the present invention.

In FIG. 29, the wide zoom lens system according to Example 5 is composed of, in order from an object, a first lens group G1 having negative refractive power, an aperture stop S, a second lens group G2 having positive refractive power, and a third lens group G4 having positive refractive power. The first lens group G1 is composed of, in order from the object, a negative meniscus lens L11 having convex surface facing to the object, a double concave negative lens L12, and a double convex positive lens L13. The second lens group G2 is composed of, in order from the object, a double convex positive lens L21, a cemented lens constructed by a double convex positive lens L22 cemented with a double concave negative lens L23, and a double convex positive lens L24. The third lens group G4 is composed of a double convex positive lens L31. The image side surface of the negative meniscus lens L11 of the first lens group G1, and the both surfaces of the positive lens L21 in the second lens group G2 are composed of respective aspherical surfaces. An optical low-pass filter LPF and a cover glass CG for an imaging device D disposed in the image plane I are arranged between the third lens group G3 and the image plane I. The aperture stop S is moved together with the second lens group G2 in a body.

When a state of lens group positions varies from a wide-angle end state W to a telephoto end state T, the third lens group G3 is fixed relative to the image plane I, and the first lens group G1 and the second lens group G2 are moved. Focusing from infinity to a close object is carried out by moving the third lens group G3 to the object side.

With this construction, a wide angle of view of 78 degrees or more in the wide-angle end state and a high speed f-number of 2 are both accomplished with securing high optical performance.

Various values associated with the wide zoom lens system according to Example 5 are listed in Table 5.

TABLE 5

[Specifications]

| | W | T |
|---|---|---|
| f = | 4.82 | 13.80 |
| Bf = | 0.59 | |
| FNO = | 2.02 | 3.56 |
| 2A = | 78.84 | 30.39 |
| y = | 3.75 | |

[Lens Data]

| | r | d | νd | nd |
|---|---|---|---|---|
| 1) | 18.1823 | 1.7000 | 45.45 | 1.750390 |
| 2*) | 4.9852 | 4.0000 | | |
| 3) | −12.7107 | 1.1000 | 81.61 | 1.497000 |
| 4) | 22.0104 | 0.8000 | | |
| 5) | 18.1723 | 2.0000 | 32.35 | 1.850260 |
| 6) | −81.0308 | (D1) | | |
| 7> | ∞ | 0.4000 | Aperture Stop S | |
| 8*) | 7.9332 | 2.8000 | 59.10 | 1.583320 |
| 9*) | −36.7576 | 0.5000 | | |
| 10) | 11.2765 | 3.2000 | 50.88 | 1.658440 |
| 11) | −12.1518 | 1.0000 | 32.35 | 1.850260 |
| 12) | 5.5478 | 1.0000 | | |
| 13) | 11.4290 | 2.0000 | 81.61 | 1.497000 |
| 14) | −18.6754 | (D2) | | |
| 15) | 12.0000 | 2.1000 | 70.24 | 1.487490 |

TABLE 5-continued

| | | | | |
|---|---|---|---|---|
| 16) | −161.0078 | (D3) | | |
| 17) | ∞ | 1.5600 | 64.20 | 1.516800 |
| 18) | ∞ | 0.6736 | | |
| 19) | ∞ | 0.5000 | 64.20 | 1.516800 |
| 20) | ∞ | (Bf) | | |

[Aspherical Data]

Surface Number 2

κ = 0.5729
C4 = −5.24110E−05
C6 = −3.08460E−06
C8 = 2.03650E−07
C10 = −4.95560E−09

Surface Number 8

κ = 0.1420
C4 = −1.76750E−06
C6 = 2.48050E−07
C8 = −1.58470E−08
C10 = −1.85000E−09

Surface Number 9

κ = −0.8063
C4 = 0.00000E+00
C6 = 0.00000E+00
C8 = −8.18330E−08
C10 = 0.00000E+00

[Variable Distances]

| | W | M | T |
|---|---|---|---|
| <upon focusing on infinity> | | | |
| R = | ∞ | ∞ | ∞ |
| f = | 4.82000 | 8.20000 | 13.80000 |
| D0 = | ∞ | ∞ | ∞ |
| D1 = | 16.37216 | 7.57905 | 2.49065 |
| D2 = | 5.18651 | 10.40532 | 19.05186 |
| D3 = | 1.18380 | 1.18380 | 1.18380 |
| Bf = | 0.59000 | 0.59000 | 0.59000 |
| <upon focusing on a close object> | | | |
| R = | 300 | 300 | 300 |
| β = | −0.01851 | −0.03080 | −0.05086 |
| D0 = | 251.3337 | 254.9083 | 251.3501 |
| D1 = | 16.37216 | 7.57905 | 2.49065 |
| D2 = | 4.96541 | 9.79884 | 17.48815 |
| D3 = | 1.40490 | 1.79028 | 2.74751 |
| Bf = | 0.59000 | 0.59000 | 0.59000 |

[Values for Conditional Expressions]

| | |
|---|---|
| (1A): ν12 = | 81.610 |
| (1B): n12 + 0.007 × ν12 = | 2.068 |
| (2): n11 = | 1.750 |
| (3): n11 + 0.012 × ν11 = | 2.296 |
| (4): f2/f1 = | −1.200 |
| (5): f3/f2 = | 1.825 |
| (6): D23W/f2 = | 0.417 |
| (7): ν13 = | 32.350 |
| (8): n13 = | 1.850 |
| (9): f1/r12A = | 0.826 |
| (10A): ν25 = | 81.610 |
| (10B): n25 + 0.007 × ν25 = | 2.068 |
| (11): ν23 = | 32.350 |
| (12): n23 = | 1.850 |

Figure 30:
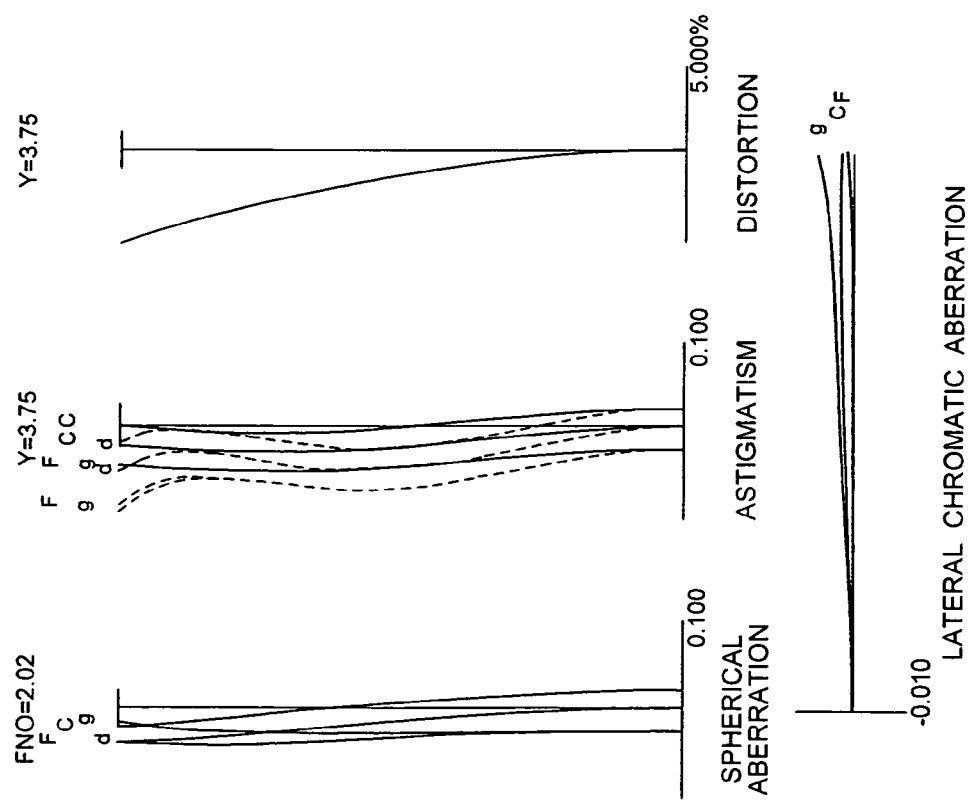
FIG. 30 is graphs showing various aberrations of the wide zoom lens system according to Example 5 of the present invention in the wide-angle end state focusing on infinity.
Figure 31:
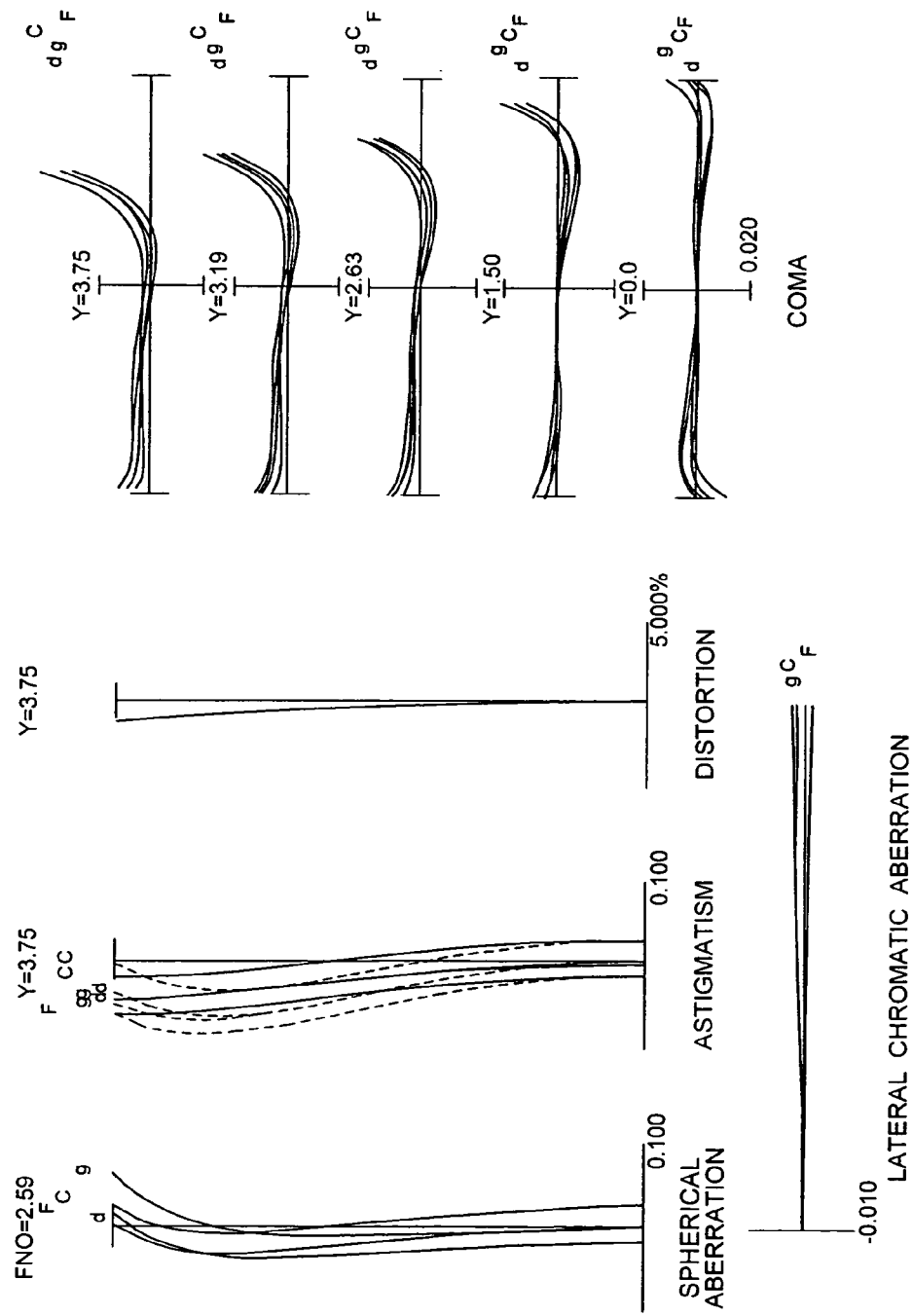
FIG. 31 is graphs showing various aberrations of the wide zoom lens system according to Example 5 of the present invention in the intermediate focal length state focusing on infinity.
Figure 32:
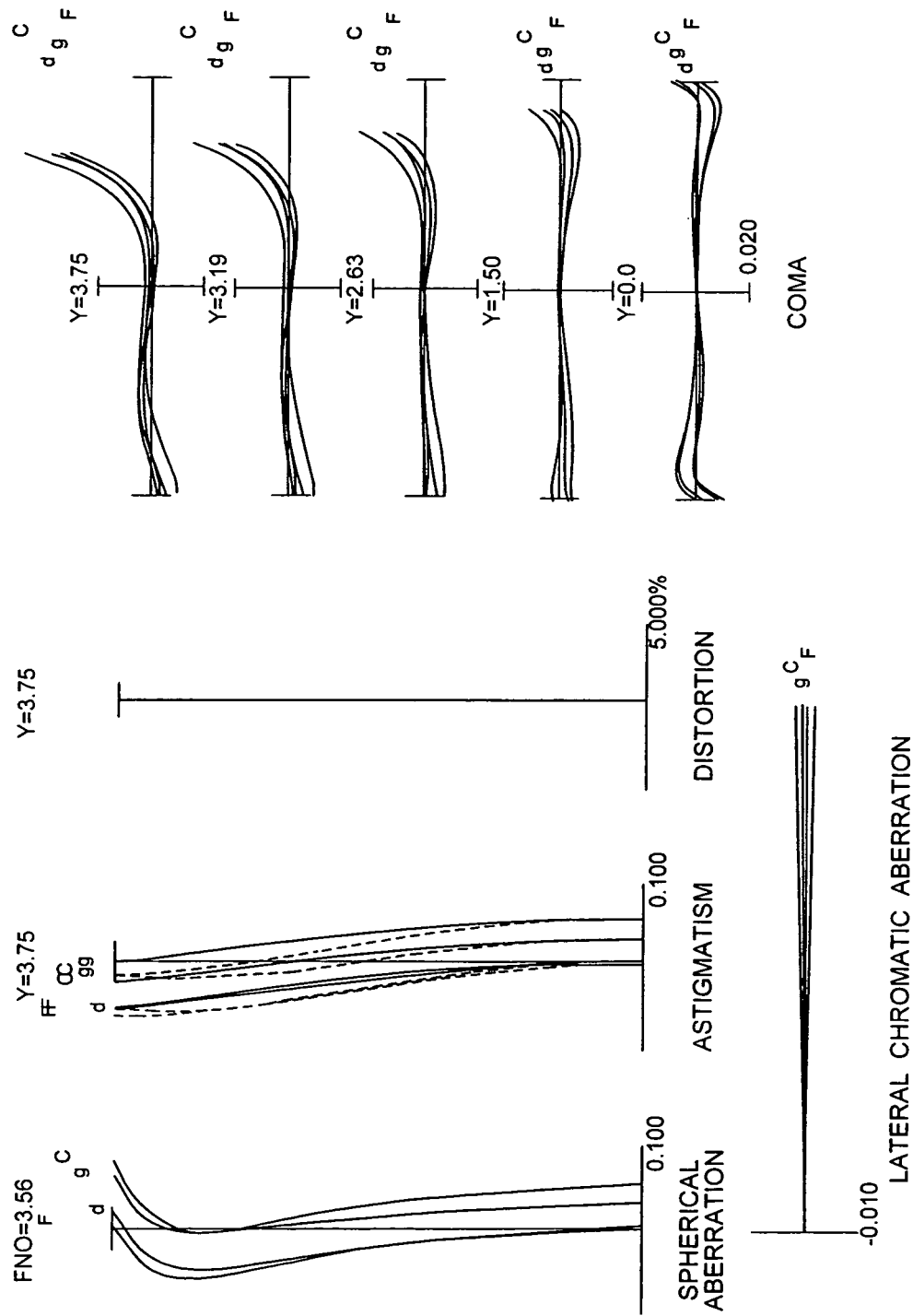
FIG. 32 is graphs showing various aberrations of the wide zoom lens system according to Example 5 of the present invention in the telephoto end state focusing on infinity.
Figure 33:
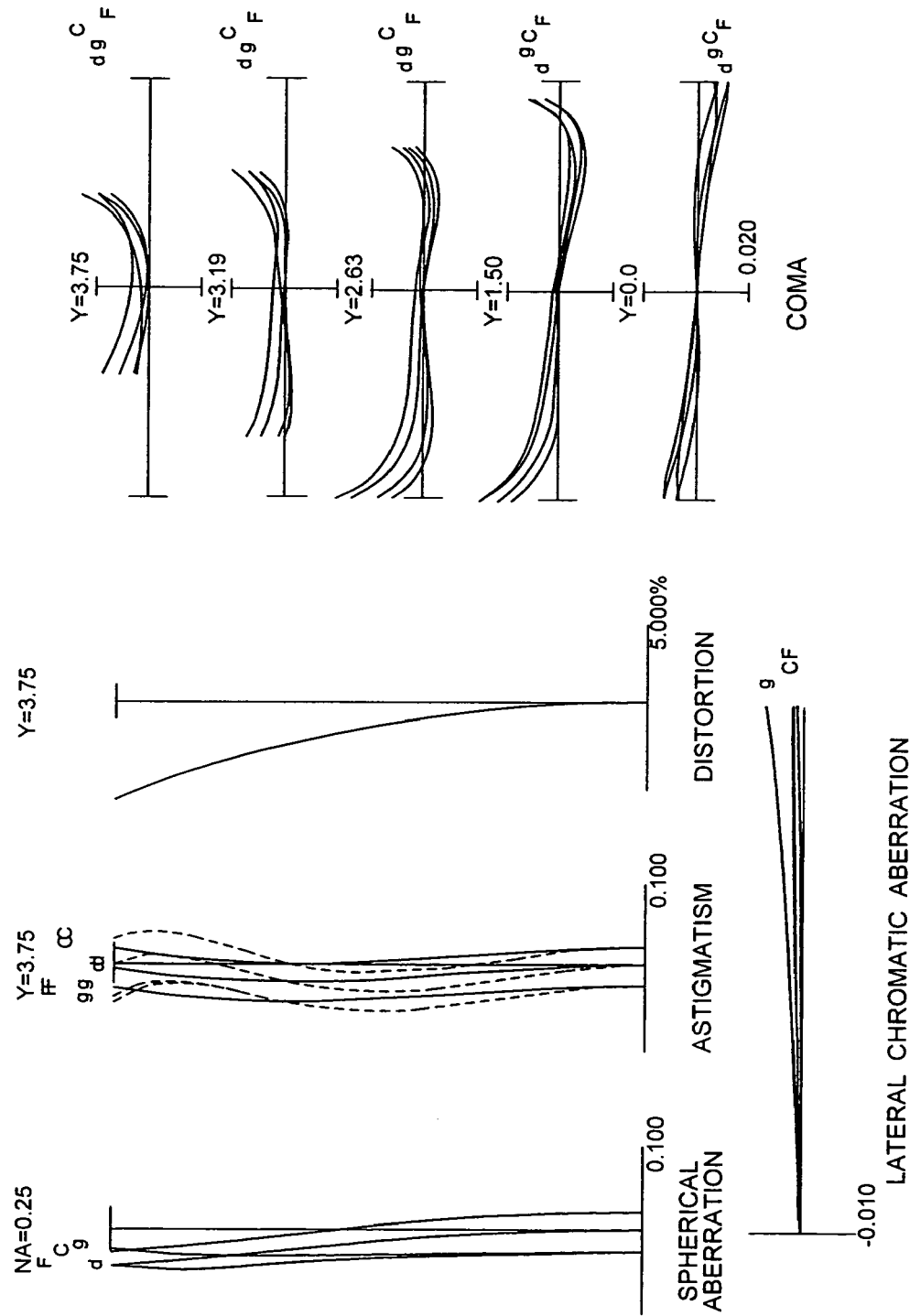
FIG. 33 is graphs showing various aberrations of the wide zoom lens system according to Example 5 of the present invention in the wide-angle end state where the shooting distance R is 300 mm.
Figure 34:
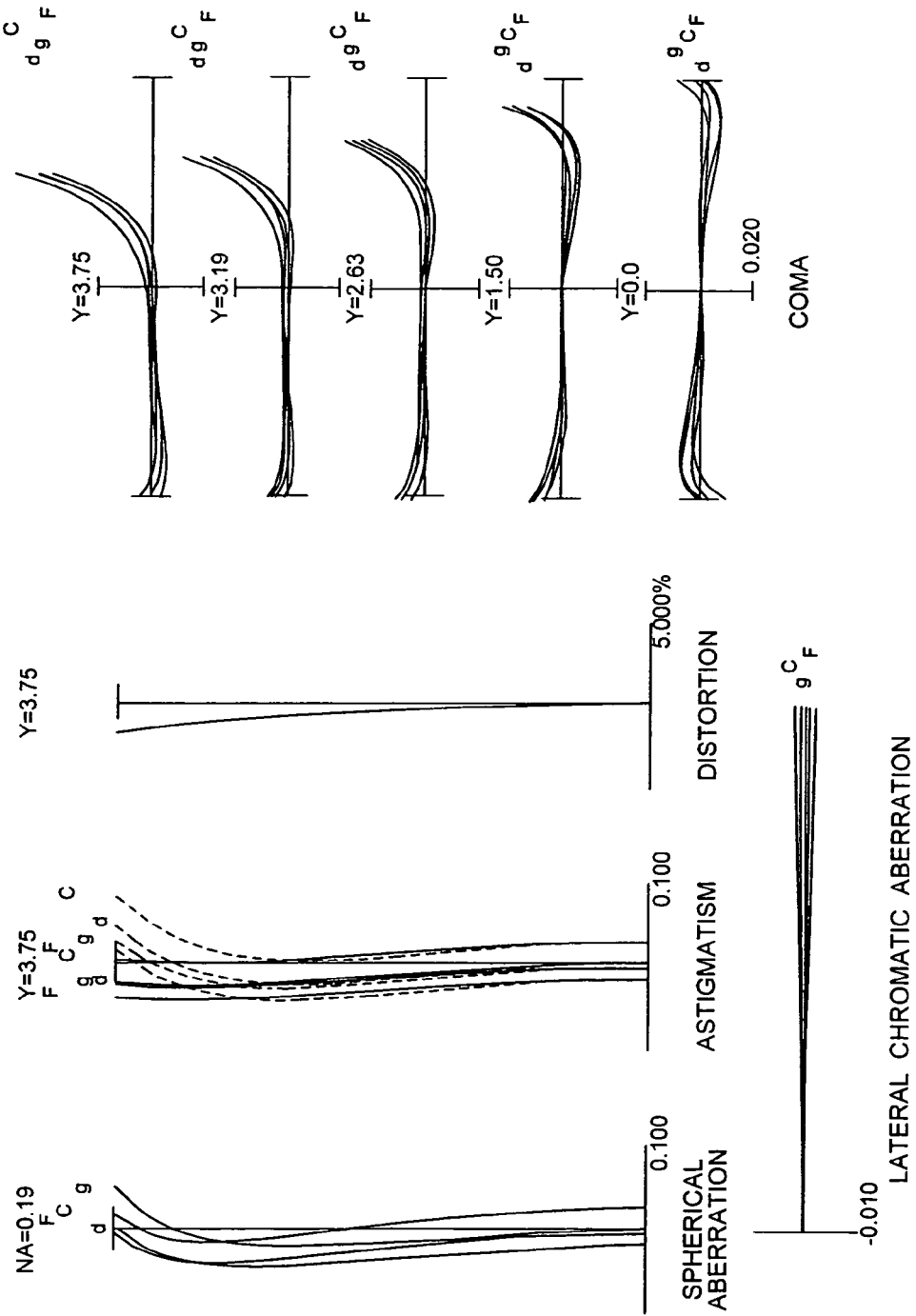
FIG. 34 is graphs showing various aberrations of the wide zoom lens system according to Example 5 of the present invention in the intermediate focal length state where the shooting distance R is 300 mm.
Figure 35:
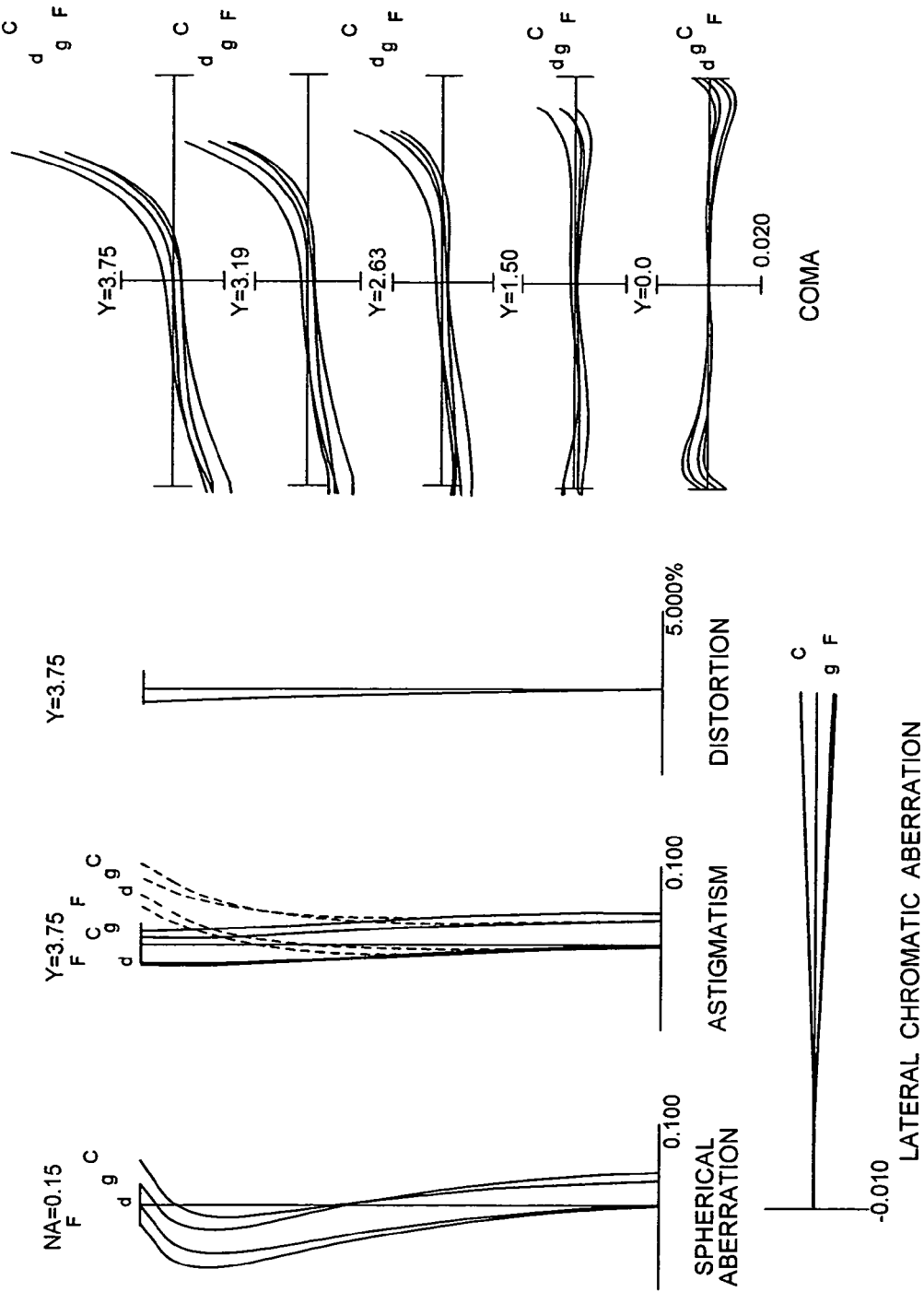
FIG. 35 is graphs showing various aberrations of the wide zoom lens system according to Example 5 of the present invention in the telephoto end state where the shooting distance R is 300 mm.

FIG. 30 is graphs showing various aberrations of the wide zoom lens system according to Example 5 of the present invention in the wide-angle end state focusing on infinity. FIG. 31 is graphs showing various aberrations of the wide zoom lens system according to Example 5 of the present invention in the intermediate focal length state focusing on infinity. FIG. 32 is graphs showing various aberrations of the wide zoom lens system according to Example 5 of the present invention in the telephoto end state focusing on infinity. FIG. 33 is graphs showing various aberrations of the wide zoom lens system according to Example 5 of the present invention in the wide-angle end state where the shooting distance R is 300 mm. FIG. 34 is graphs showing various aberrations of the wide zoom lens system according to Example 5 of the present invention in the intermediate focal length state where the shooting distance R is 300 mm. FIG. 35 is graphs showing various aberrations of the wide zoom lens system according to Example 5 of the present invention in the telephoto end state where the shooting distance R is 300 mm.

As is apparent from the respective graphs, the wide zoom lens system according to Example 5 shows superb optical performance as a result of good corrections to various aberrations in each focal length state from the wide-angle end state to the telephoto end state.

EXAMPLE 6

Figure 36:
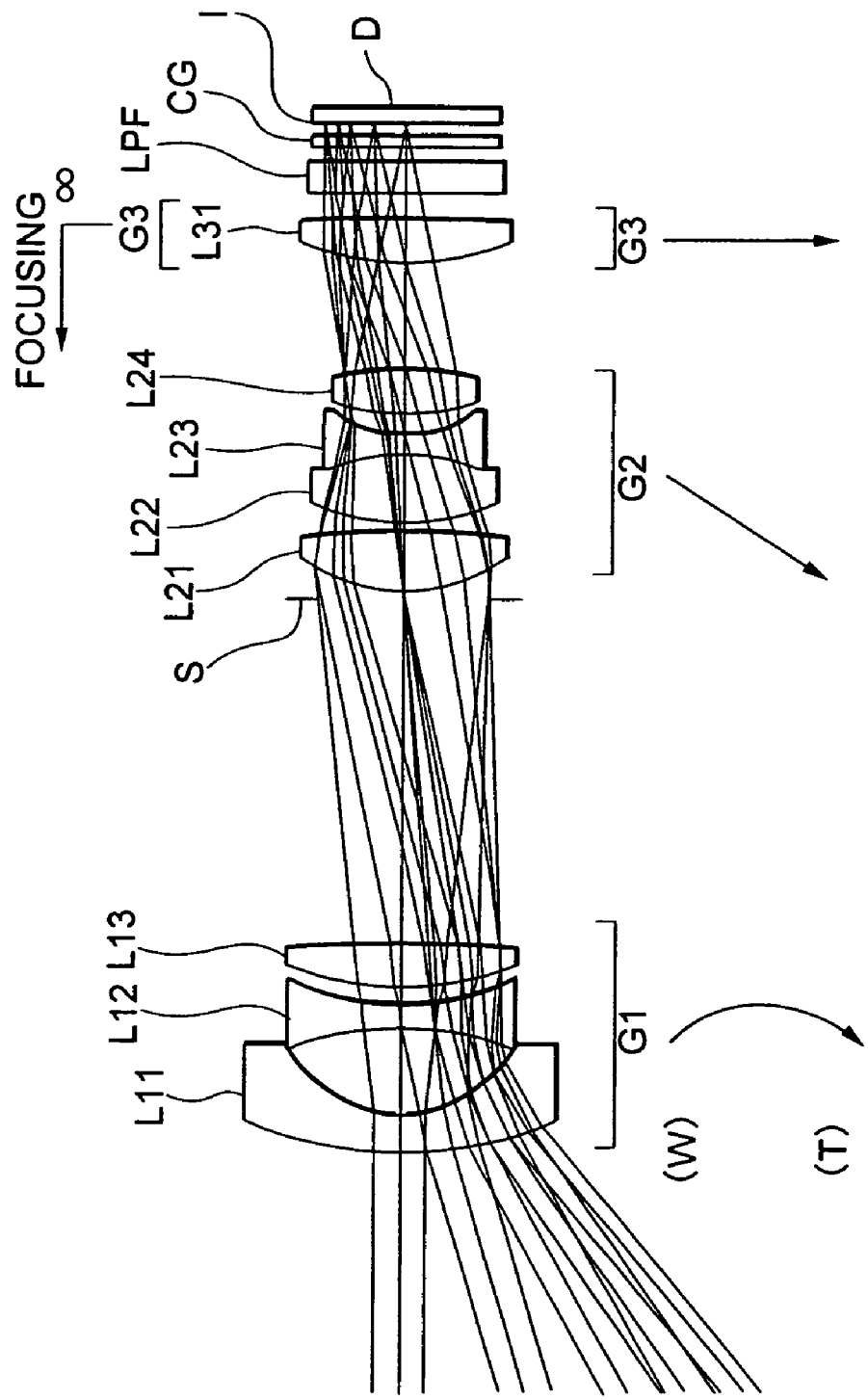
FIG. 36 is a diagram showing a lens configuration of a wide zoom lens system according to Example 6 of the present invention.

FIG. 36 is a diagram showing a lens configuration of a wide zoom lens system according to Example 6 of the present invention.

In FIG. 36, the wide zoom lens system according to Example 6 is composed of, in order from an object, a first lens group G1 having negative refractive power, an aperture stop S, a second lens group G2 having positive refractive power, and a third lens group G4 having positive refractive power. The first lens group G1 is composed of, in order from the object, a negative meniscus lens L11 having convex surface facing to the object, a double concave negative lens L12, and a double convex positive lens L13. The second lens group G2 is composed of, in order from the object, a double convex positive lens L21, a cemented lens constructed by a double convex positive lens L22 cemented with a double concave negative lens L23, and a double convex positive lens L24. The third lens group G3 is composed of a double convex positive lens L31. The image side surface of the negative meniscus lens L11 of the first lens group G1, and the both surfaces of the positive lens L21 in the second lens group G2 are composed of respective aspherical surfaces. An optical low-pass filter LPF and a cover glass CG for an imaging device D disposed in the image plane I are arranged between the third lens group G3 and the image plane I. The aperture stop S is moved together with the second lens group G2 in a body.

When a state of lens group positions varies from a wide-angle end state W to a telephoto end state T, the third lens group G3 is fixed relative to the image plane I, and the first lens group G1 and the second lens group G2 are moved. Focusing from infinity to a close object is carried out by moving the third lens group G3 to the object side.

With this construction, a wide angle of view of 78 degrees or more in the wide-angle end state and a high speed f-number of 2 are both accomplished with securing high optical performance.

Various values associated with the wide zoom lens system according to Example 6 are listed in Table 6.

TABLE 6

[Specifications]

| | W | T |
|---|---|---|
| f = | 4.82 | 13.80 |
| Bf = | 0.59 | |

TABLE 6-continued

| | | |
|---|---|---|
| FNO = | 2.03 | 3.58 |
| 2A = | 78.77 | 30.40 |
| y = | 3.75 | |

[Lens Data]

| | r | d | vd | nd |
|---|---|---|---|---|
| 1) | 19.0104 | 1.7000 | 40.71 | 1.806100 |
| 2*) | 5.4059 | 4.0000 | | |
| 3) | −14.7423 | 1.1000 | 81.61 | 1.497000 |
| 4) | 12.4554 | 0.8740 | | |
| 5) | 14.8187 | 2.0000 | 32.35 | 1.850260 |
| 6) | −97.2782 | (D1) | | |
| 7> | ∞ | 0.4000 | Aperture Stop S | |
| 8*) | 7.8398 | 2.8000 | 59.10 | 1.583320 |
| 9*) | −41.2748 | 0.5000 | | |
| 10) | 10.7039 | 3.2000 | 50.88 | 1.658440 |
| 11) | −10.3436 | 1.0000 | 32.35 | 1.850260 |
| 12) | 5.4652 | 1.0000 | | |
| 13) | 11.5063 | 2.0000 | 81.61 | 1.497000 |
| 14) | −17.7898 | (D2) | | |
| 15) | 12.0000 | 2.1000 | 70.24 | 1.487490 |
| 16) | −161.0078 | (D3) | | |
| 17) | ∞ | 1.5600 | 64.20 | 1.516800 |
| 18) | ∞ | 0.6736 | | |
| 19) | ∞ | 0.5000 | 64.20 | 1.516800 |
| 20) | ∞ | (Bf) | | |

[Aspherical Data]

Surface Number 2

κ = 0.5736
C4 = −5.62290E−05
C6 = −2.46600E−06
C8 = 1.50360E−07
C10 = −3.98820E−09

Surface Number 8

κ = 0.2149
C4 = 4.41340E−06
C6 = 3.92900E−07
C8 = 6.89060E−09
C10 = −1.48210E−09

Surface Number 9

κ = 0.5484
C4 = 0.00000E+00
C6 = 0.00000E+00
C8 = −4.79320E−08
C10 = 0.00000E+00

[Variable Distances]

| | W | M | T |
|---|---|---|---|
| <upon focusing on infinity> | | | |
| R = | ∞ | ∞ | ∞ |
| f = | 4.82000 | 8.20000 | 13.80000 |
| D0 = | ∞ | ∞ | ∞ |
| D1 = | 16.37898 | 7.58587 | 2.49747 |
| D2 = | 5.12924 | 10.34805 | 18.99459 |
| D3 = | 1.18380 | 1.18380 | 1.18380 |
| Bf = | 0.59000 | 0.59000 | 0.59000 |
| <upon focusing on a close object> | | | |
| R = | 300 | 300 | 300 |
| β = | −0.01851 | −0.03081 | −0.05086 |
| D0 = | 251.3101 | 254.8848 | 251.3265 |
| D1 = | 16.37898 | 7.58587 | 2.49747 |
| D2 = | 4.90812 | 9.74152 | 17.43077 |
| D3 = | 1.40492 | 1.79033 | 2.74762 |
| Bf = | 0.59000 | 0.59000 | 0.59000 |

[Values for Conditional Expressions]

| | |
|---|---|
| (1A): ν12 = | 81.610 |
| (1B): n12 + 0.007 × ν12 = | 2.068 |
| (2): n11 = | 1.806 |
| (3): n11 + 0.012 × ν11 = | 2.295 |
| (4): f2/f1 = | −1.200 |
| (5): f3/f2 = | 1.825 |
| (6): D23W/f2 = | 0.407 |
| (7): ν13 = | 32.350 |
| (8): n13 = | 1.850 |
| (9): f1/r12A = | 0.712 |
| (10A): ν25 = | 81.610 |
| (10B): n25 + 0.007 × ν25 = | 2.068 |
| (11): ν23 = | 32.350 |
| (12): n23 = | 1.850 |

Figure 38:
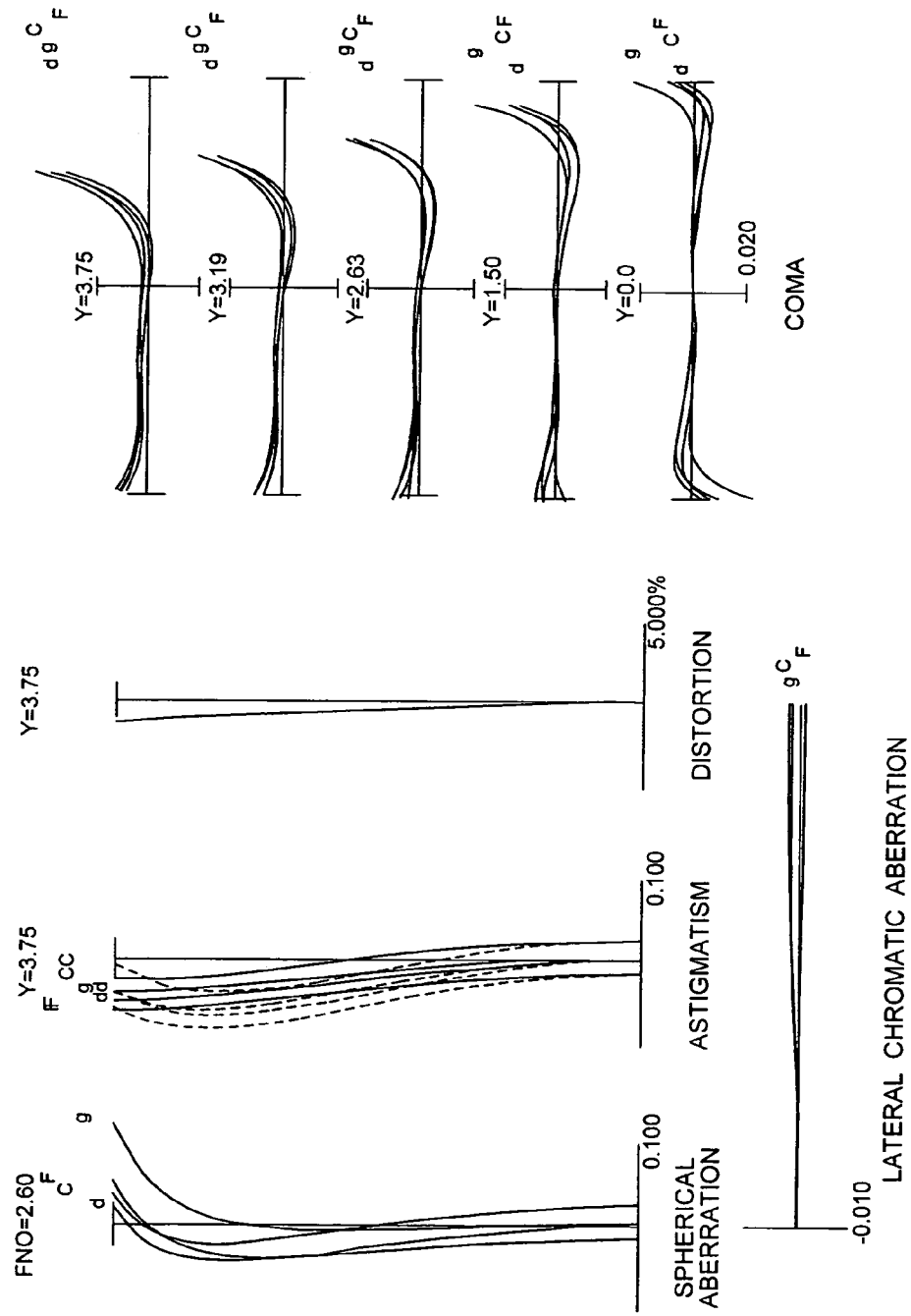
FIG. 38 is graphs showing various aberrations of the wide zoom lens system according to Example 6 of the present invention in the intermediate focal length state focusing on infinity.
Figure 39:
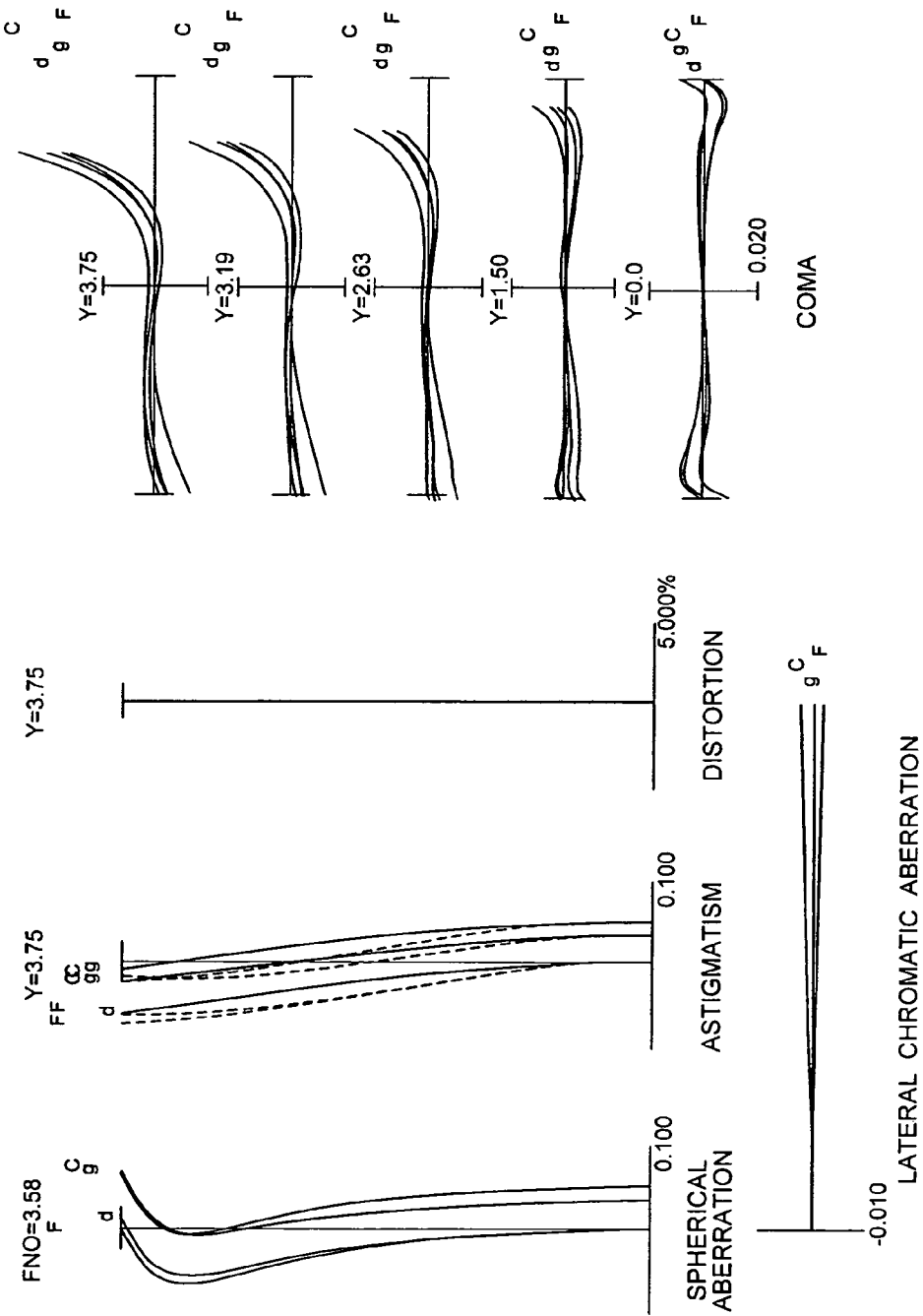
FIG. 39 is graphs showing various aberrations of the wide zoom lens system according to Example 6 of the present invention in the telephoto end state focusing on infinity.
Figure 40:
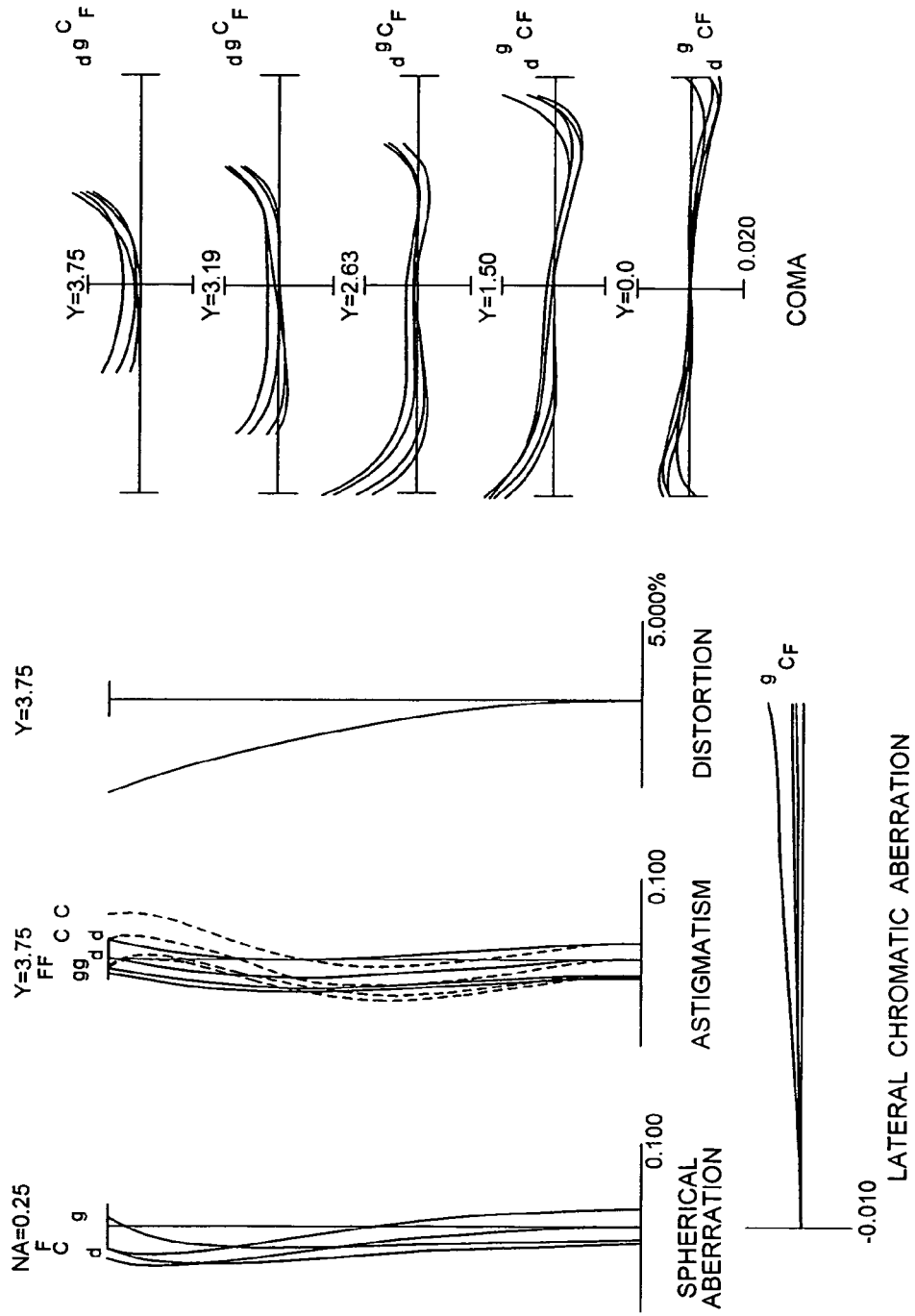
FIG. 40 is graphs showing various aberrations of the wide zoom lens system according to Example 6 of the present invention in the wide-angle end state where the shooting distance R is 300 mm.
Figure 41:
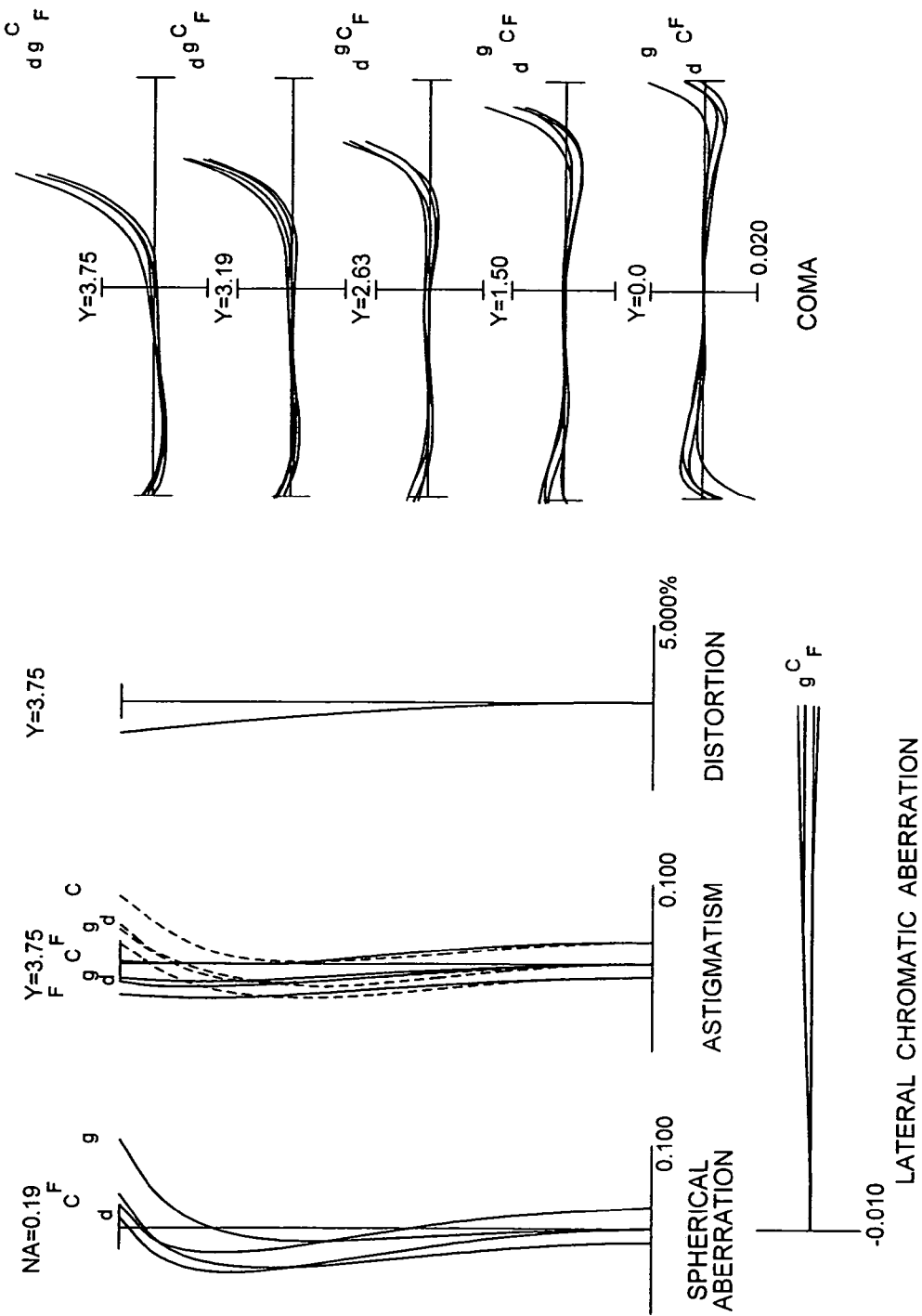
FIG. 41 is graphs showing various aberrations of the wide zoom lens system according to Example 6 of the present invention in the intermediate focal length state where the shooting distance R is 300 mm.

FIG. 37 is graphs showing various aberrations of the wide zoom lens system according to Example 6 of the present invention in the wide-angle end state focusing on infinity. FIG. 38 is graphs showing various aberrations of the wide zoom lens system according to Example 6 of the present invention in the intermediate focal length state focusing on infinity. FIG. 39 is graphs showing various aberrations of the wide zoom lens system according to Example 6 of the present invention in the telephoto end state focusing on infinity. FIG. 40 is graphs showing various aberrations of the wide zoom lens system according to Example 6 of the present invention in the wide-angle end state where the shooting distance R is 300 mm. FIG. 41 is graphs showing various aberrations of the wide zoom lens system according to Example 6 of the present invention in the intermediate focal length state where the shooting distance R is 300 mm. FIG. 42 is graphs showing various aberrations of the wide zoom lens system according to Example 6 of the present invention in the telephoto end state where the shooting distance R is 300 mm.

As is apparent from the respective graphs, the wide zoom lens system according to Example 6 shows superb optical performance as a result of good corrections to various aberrations in each focal length state from the wide-angle end state to the telephoto end state.

EXAMPLE 7

Figure 43:
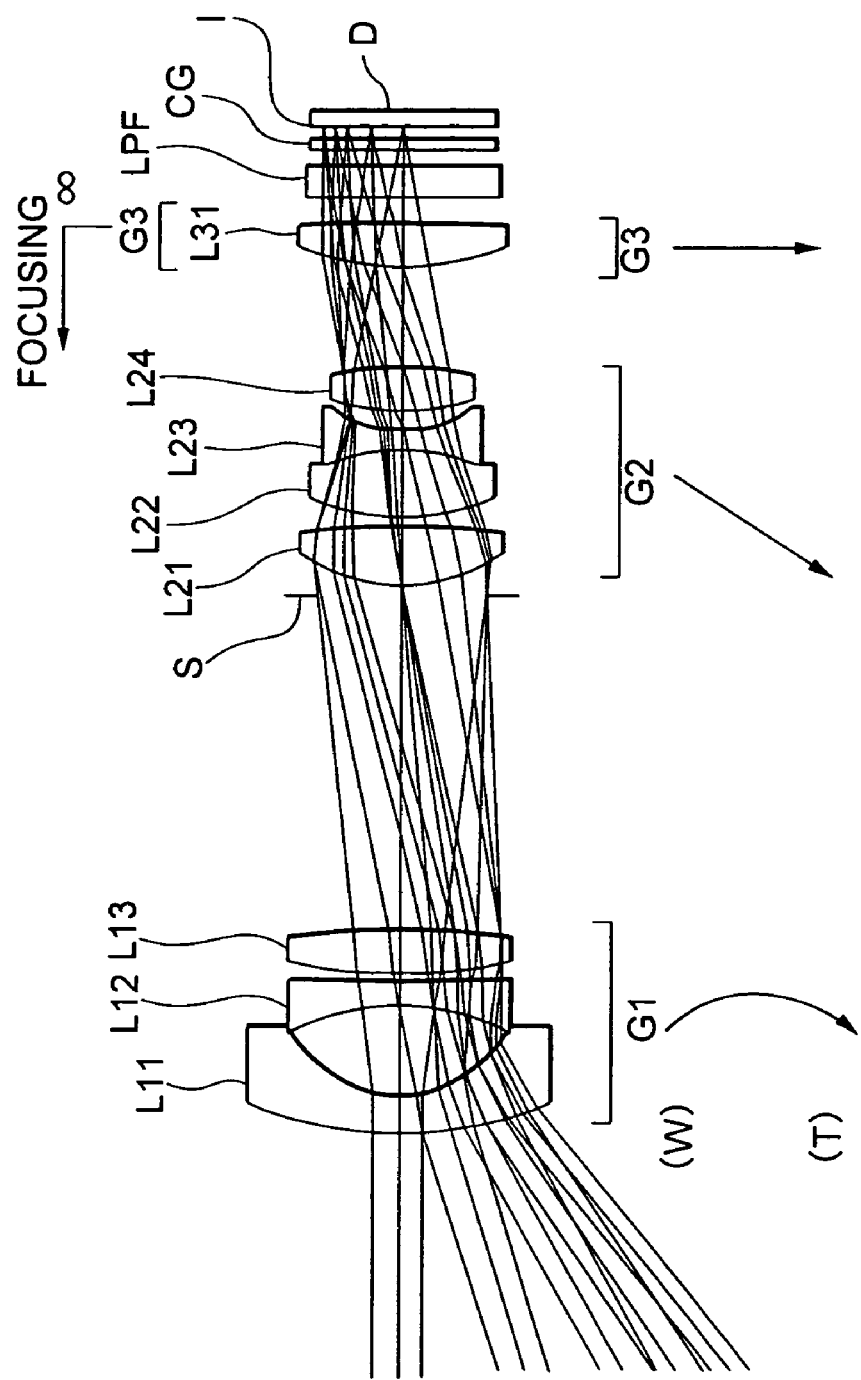
FIG. 43 is a diagram showing a lens configuration of a wide zoom lens system according to Example 7 of the present invention.

FIG. 43 is a diagram showing a lens configuration of a wide zoom lens system according to Example 7 of the present invention.

In FIG. 43, the wide zoom lens system according to Example 7 is composed of, in order from an object, a first lens group G1 having negative refractive power, an aperture stop S, a second lens group G2 having positive refractive power, and a third lens group G3 having positive refractive power. The first lens group G1 is composed of, in order from the object, a negative meniscus lens L11 having convex surface facing to the object, a double concave negative lens L12, and a double convex positive lens L13. The second lens group G2 is composed of, in order from the object, a double convex positive lens L21, a cemented lens constructed by a double convex positive lens L22 cemented with a double concave negative lens L23, and a double convex positive lens L24. The third lens group G4 is composed of a double convex positive lens L31. The image side surface of the negative meniscus lens L11 of the first lens group G1, and the both surfaces of the positive lens L21 in the second lens group G2 are composed of respective aspherical surfaces. An optical low-pass filter LPF and a cover glass CG for an imaging device D disposed in the image plane I are arranged between the third lens group G3 and the image plane I. The aperture stop S is moved together with the second lens group G2 in a body.

When a state of lens group positions varies from a wide-angle end state W to a telephoto end state T, the third lens group G3 is fixed relative to the image plane I, and the first lens group G1 and the second lens group G2 are moved. Focusing from infinity to a close object is carried out by moving the third lens group G3 to the object side.

With this construction, a wide angle of view of 78 degrees or more in the wide-angle end state and a high speed f-number of 2 are both accomplished with securing high optical performance.

Various values associated with the wide zoom lens system according to Example 7 are listed in Table 7.

TABLE 7

[Specifications]

|   | W | T |
|---|---|---|
| f = | 4.82 | 13.80 |
| Bf = | 0.59 | |
| FNO = | 2.06 | 3.67 |
| 2A = | 78.46 | 30.38 |
| y = | 3.75 | |

[Lens Data]

|  | r | d | νd | nd |
|---|---|---|---|---|
| 1) | 19.6939 | 1.7000 | 40.71 | 1.806100 |
| 2*) | 4.9596 | 4.4000 | | |
| 3) | −11.1711 | 1.1000 | 81.61 | 1.497000 |
| 4) | 85.2333 | 0.4000 | | |
| 5) | 22.5694 | 2.0000 | 28.55 | 1.795040 |
| 6) | −40.6177 | (D1) | | |
| 7> | ∞ | 0.4000 | Aperture Stop S | |
| 8*) | 7.3329 | 2.8000 | 59.10 | 1.583320 |
| 9*) | −30.8245 | 0.5000 | | |
| 10) | 12.5402 | 3.2000 | 50.88 | 1.658440 |
| 11) | −9.7058 | 1.0000 | 32.35 | 1.850260 |
| 12) | 5.2879 | 1.0000 | | |
| 13) | 10.2204 | 2.0000 | 81.61 | 1.497000 |
| 14) | −21.6971 | (D2) | | |
| 15) | 12.0000 | 2.1000 | 70.24 | 1.487490 |
| 16) | −161.0078 | (D3) | | |
| 17) | ∞ | 1.5600 | 64.20 | 1.516800 |
| 18) | ∞ | 0.6736 | | |
| 19) | ∞ | 0.5000 | 64.20 | 1.516800 |
| 20) | ∞ | (Bf) | | |

[Aspherical Data]

Surface Number 2

κ = 0.5938
C4 = −1.53120E−04
C6 = −2.21640E−06
C8 = 1.12180E−07
C10 = −6.37070E−09

Surface Number 8

κ = 0.1952
C4 = −7.25910E−07
C6 = 3.13990E−07
C8 = −1.43530E−08
C10 = −2.73140E−09

Surface Number 9

κ = −5.4842
C4 = 0.00000E+00
C6 = 0.00000E+00

TABLE 7-continued

C8 = −1.14450E−07
C10 = 0.00000E+00

[Variable Distances]

|  | W | M | T |
|---|---|---|---|
| \<upon focusing on infinity\> | | | |
| R = | ∞ | ∞ | ∞ |
| f = | 4.82000 | 8.20000 | 13.80000 |
| D0 = | ∞ | ∞ | ∞ |
| D1 = | 16.39079 | 7.59768 | 2.50928 |
| D2 = | 4.88456 | 10.10337 | 18.74991 |
| D3 = | 1.18380 | 1.18380 | 1.18380 |
| Bf = | 0.59000 | 0.59000 | 0.59000 |
| \<upon focusing on a close object\> | | | |
| R = | 300 | 300 | 300 |
| β = | −0.01851 | −0.03081 | −0.05088 |
| D0 = | 251.6170 | 255.1917 | 251.6334 |
| D1 = | 16.39079 | 7.59768 | 2.50928 |
| D2 = | 4.66338 | 9.49667 | 17.18567 |
| D3 = | 1.40498 | 1.79050 | 2.74804 |
| Bf = | 0.59000 | 0.59000 | 0.59000 |

[Values for Conditional Expressions]

| (1A): ν12 = | 81.610 |
|---|---|
| (1B): n12 + 0.007 × ν12 = | 2.068 |
| (2): n11 = | 1.806 |
| (3): n11 + 0.012 × ν11 = | 2.295 |
| (4): f2/f1 = | −1.200 |
| (5): f3/f2 = | 1.825 |
| (6): D23W/f2 = | 0.388 |
| (7): ν13 = | 28.550 |
| (8): n13 = | 1.795 |
| (9): f1/r12A = | 0.940 |
| (10A): ν25 = | 81.610 |
| (10B): n25 + 0.007 × ν25 = | 2.068 |
| (11): ν23 = | 32.350 |
| (12): n23 = | 1.850 |

Figure 44:
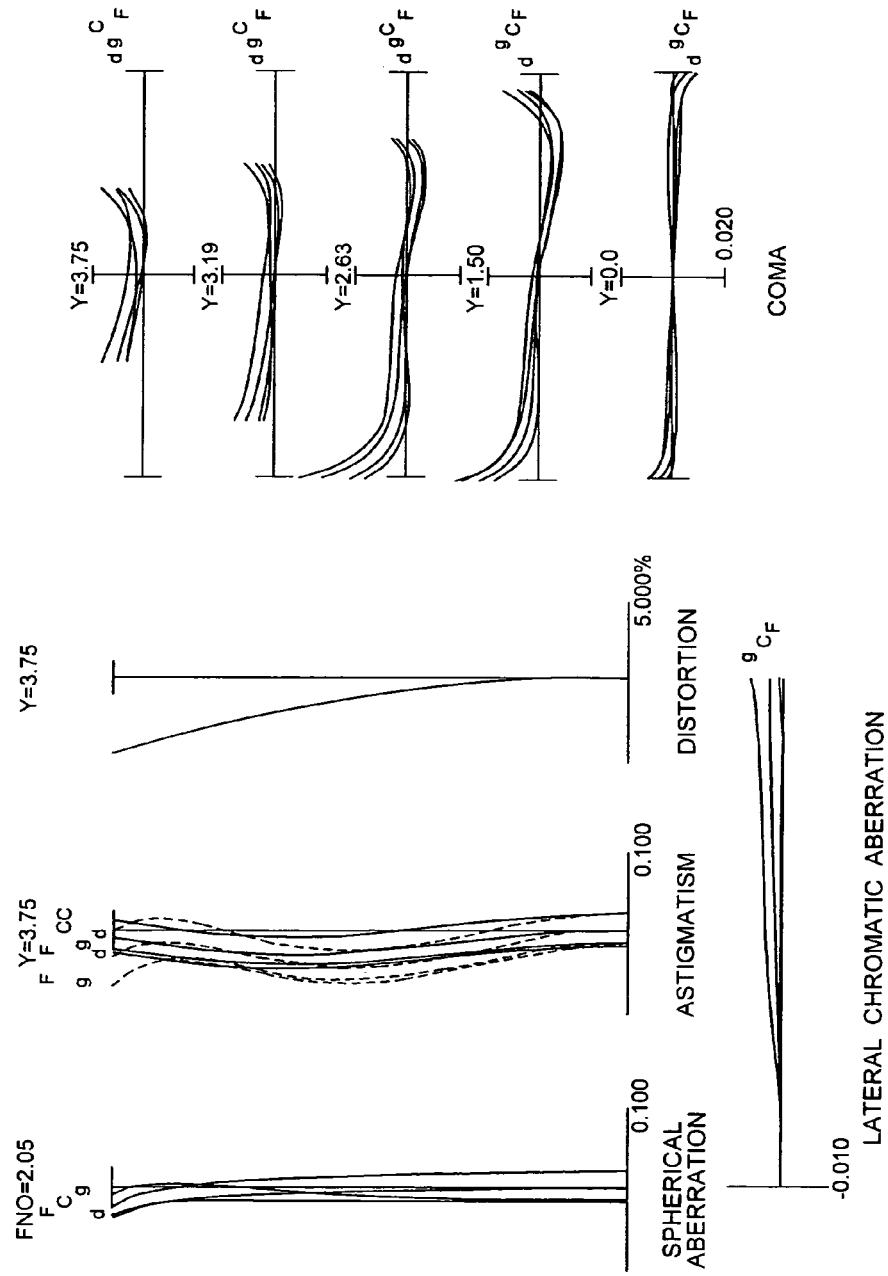
FIG. 44 is graphs showing various aberrations of the wide zoom lens system according to Example 7 of the present invention in the wide-angle end state focusing on infinity.
Figure 45:
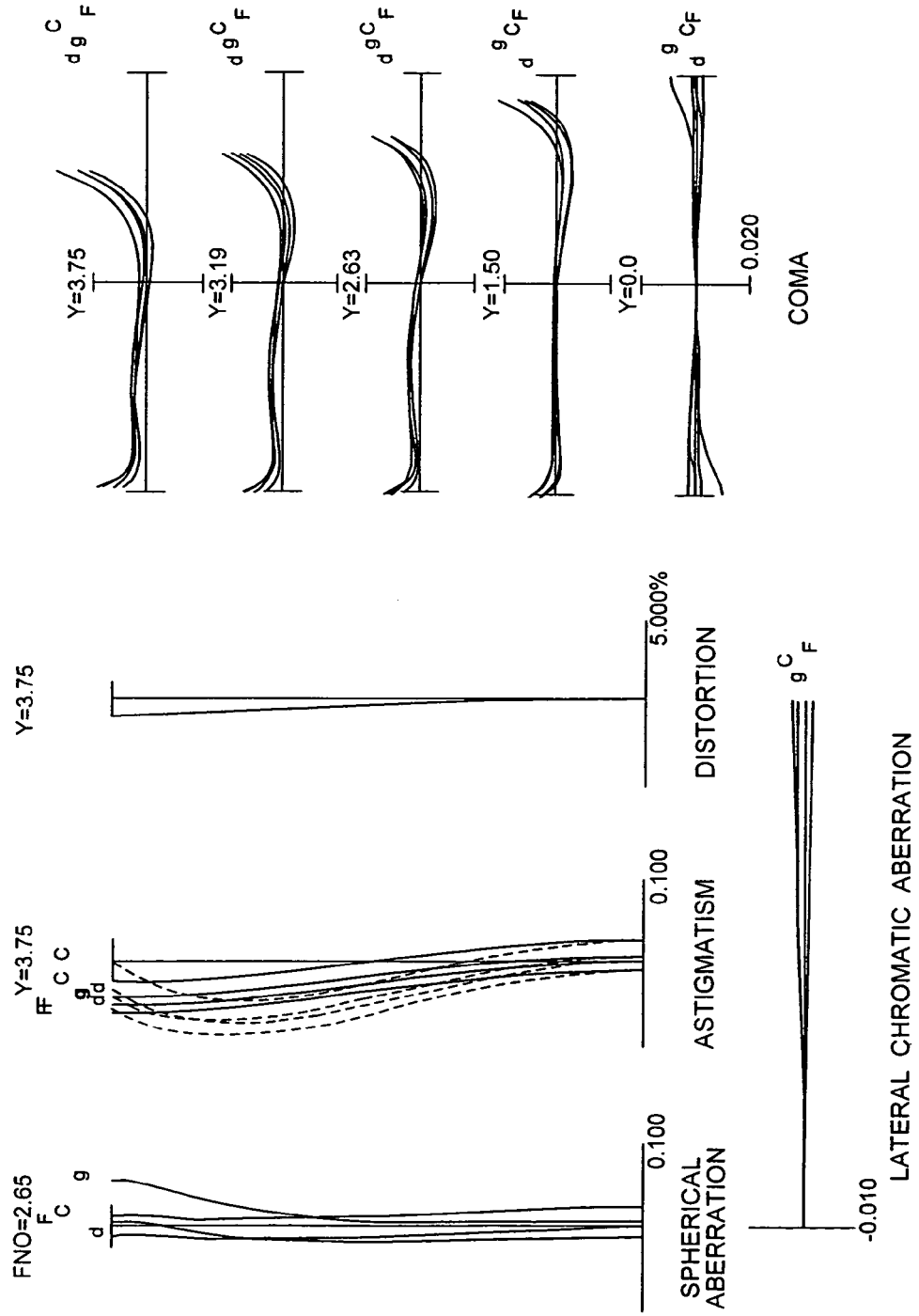
FIG. 45 is graphs showing various aberrations of the wide zoom lens system according to Example 7 of the present invention in the intermediate focal length state focusing on infinity.
Figure 46:
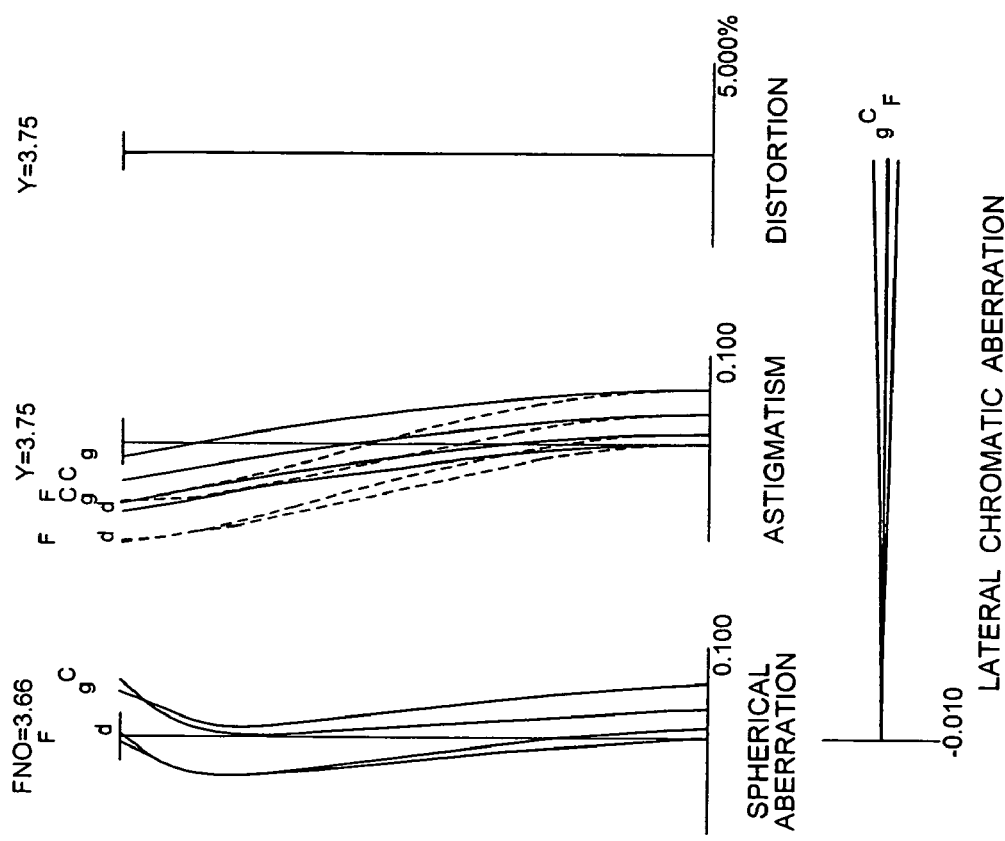
FIG. 46 is graphs showing various aberrations of the wide zoom lens system according to Example 7 of the present invention in the telephoto end state focusing on infinity.
Figure 47:
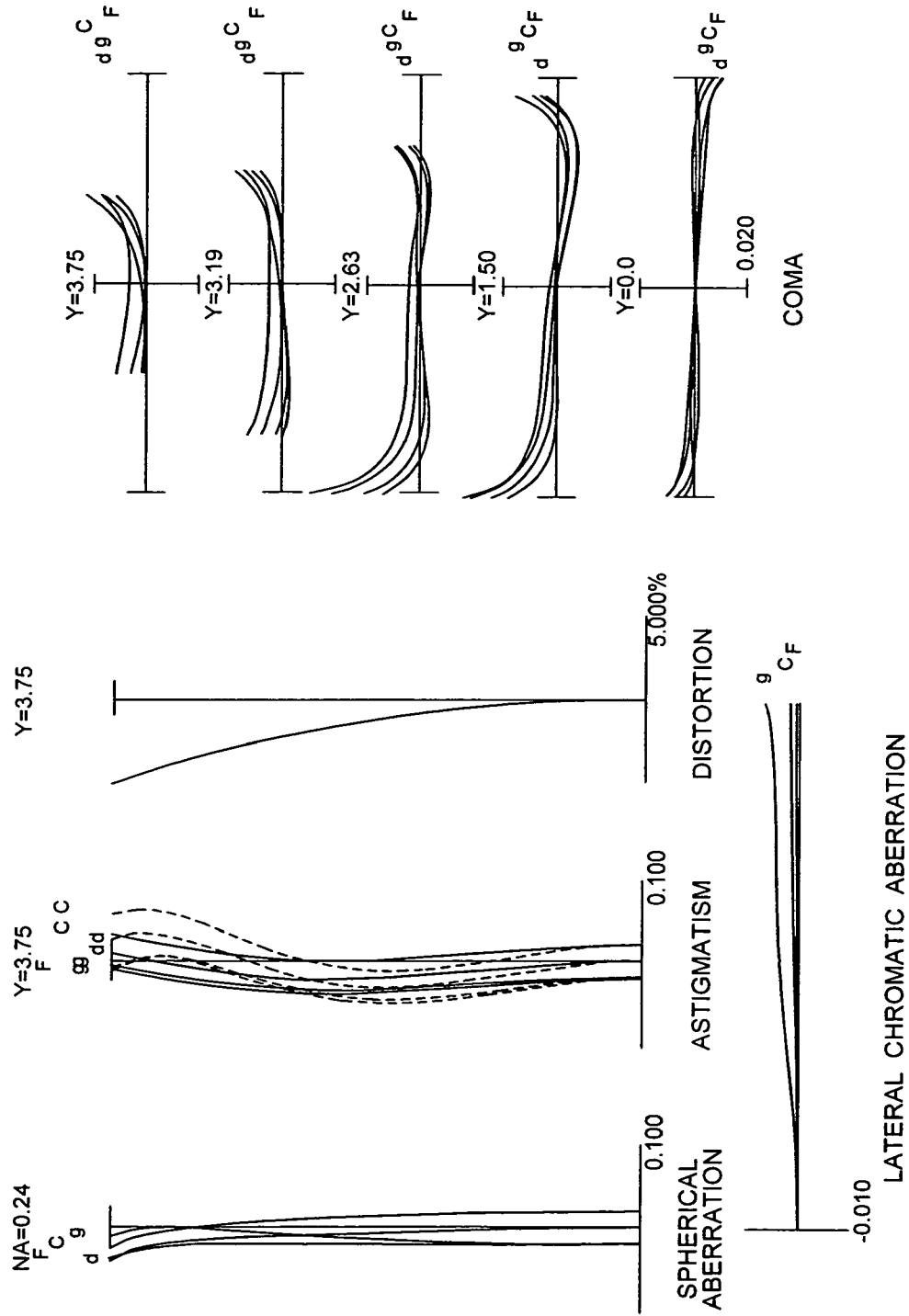
FIG. 47 is graphs showing various aberrations of the wide zoom lens system according to Example 7 of the present invention in the wide-angle end state where the shooting distance R is 300 mm.
Figure 48:
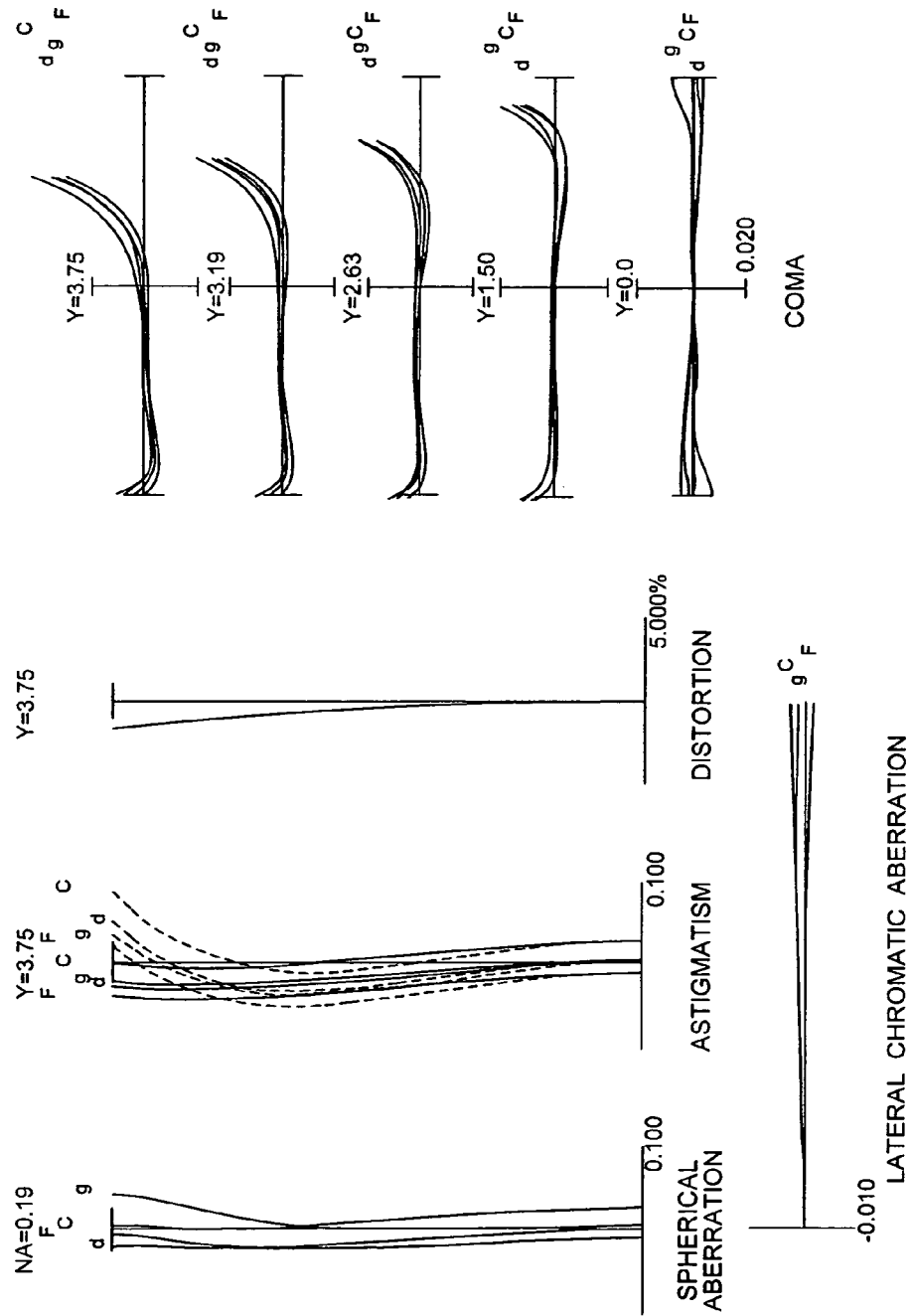
FIG. 48 is graphs showing various aberrations of the wide zoom lens system according to Example 7 of the present invention in the intermediate focal length state where the shooting distance R is 300 mm.
Figure 49:
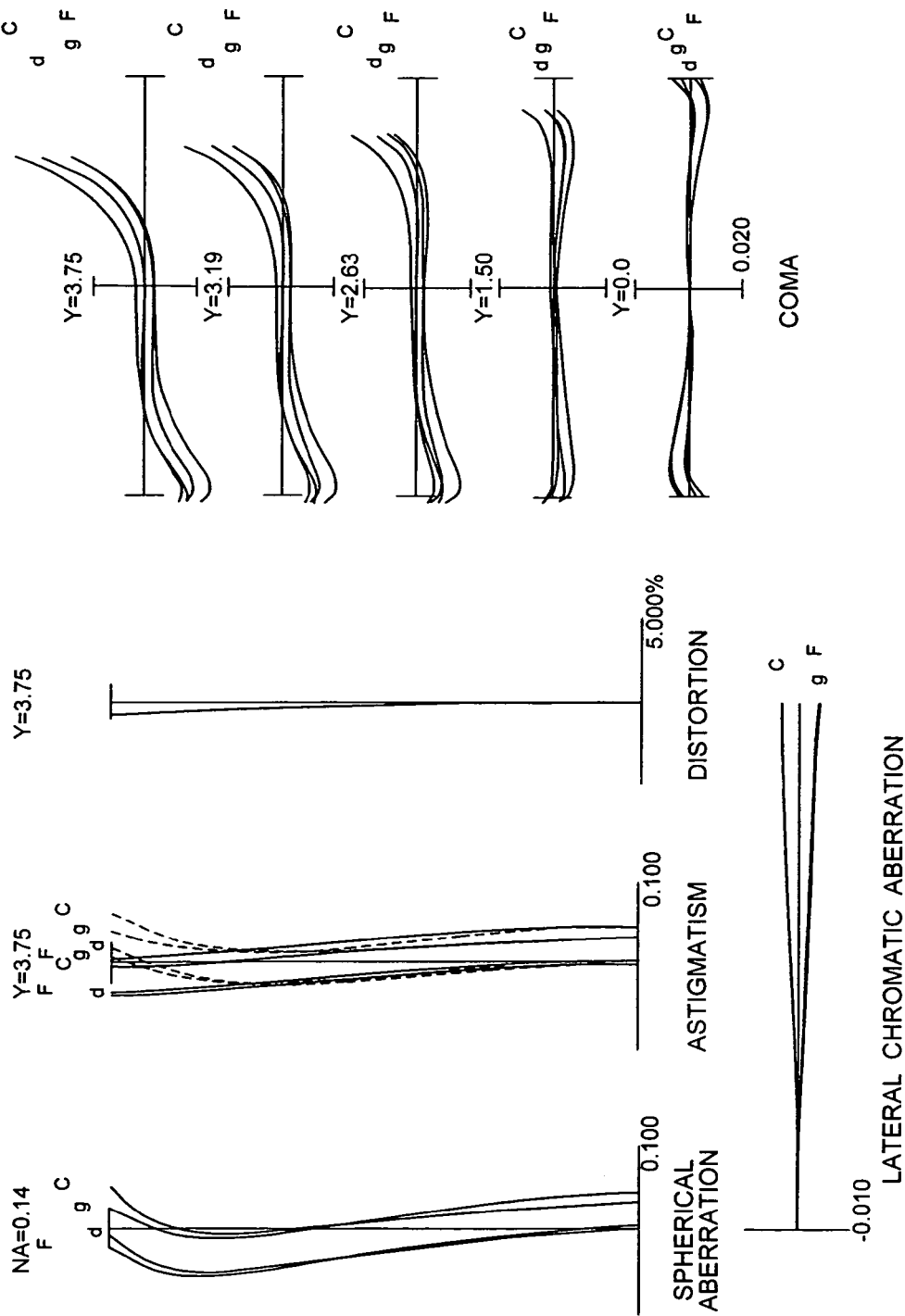
FIG. 49 is graphs showing various aberrations of the wide zoom lens system according to Example 7 of the present invention in the telephoto end state where the shooting distance R is 300 mm.

FIG. 44 is graphs showing various aberrations of the wide zoom lens system according to Example 7 of the present invention in the wide-angle end state focusing on infinity. FIG. 45 is graphs showing various aberrations of the wide zoom lens system according to Example 7 of the present invention in the intermediate focal length state focusing on infinity. FIG. 46 is graphs showing various aberrations of the wide zoom lens system according to Example 7 of the present invention in the telephoto end state focusing on infinity. FIG. 47 is graphs showing various aberrations of the wide zoom lens system according to Example 7 of the present invention in the wide-angle end state where the shooting distance R is 300 mm. FIG. 48 is graphs showing various aberrations of the wide zoom lens system according to Example 7 of the present invention in the intermediate focal length state where the shooting distance R is 300 mm. FIG. 49 is graphs showing various aberrations of the wide zoom lens system according to Example 7 of the present invention in the telephoto end state where the shooting distance R is 300 mm.

As is apparent from the respective graphs, the wide zoom lens system according to Example 7 shows superb optical performance as a result of good corrections to various aberrations in each focal length state from the wide-angle end state to the telephoto end state.

EXAMPLE 8

Figure 50:
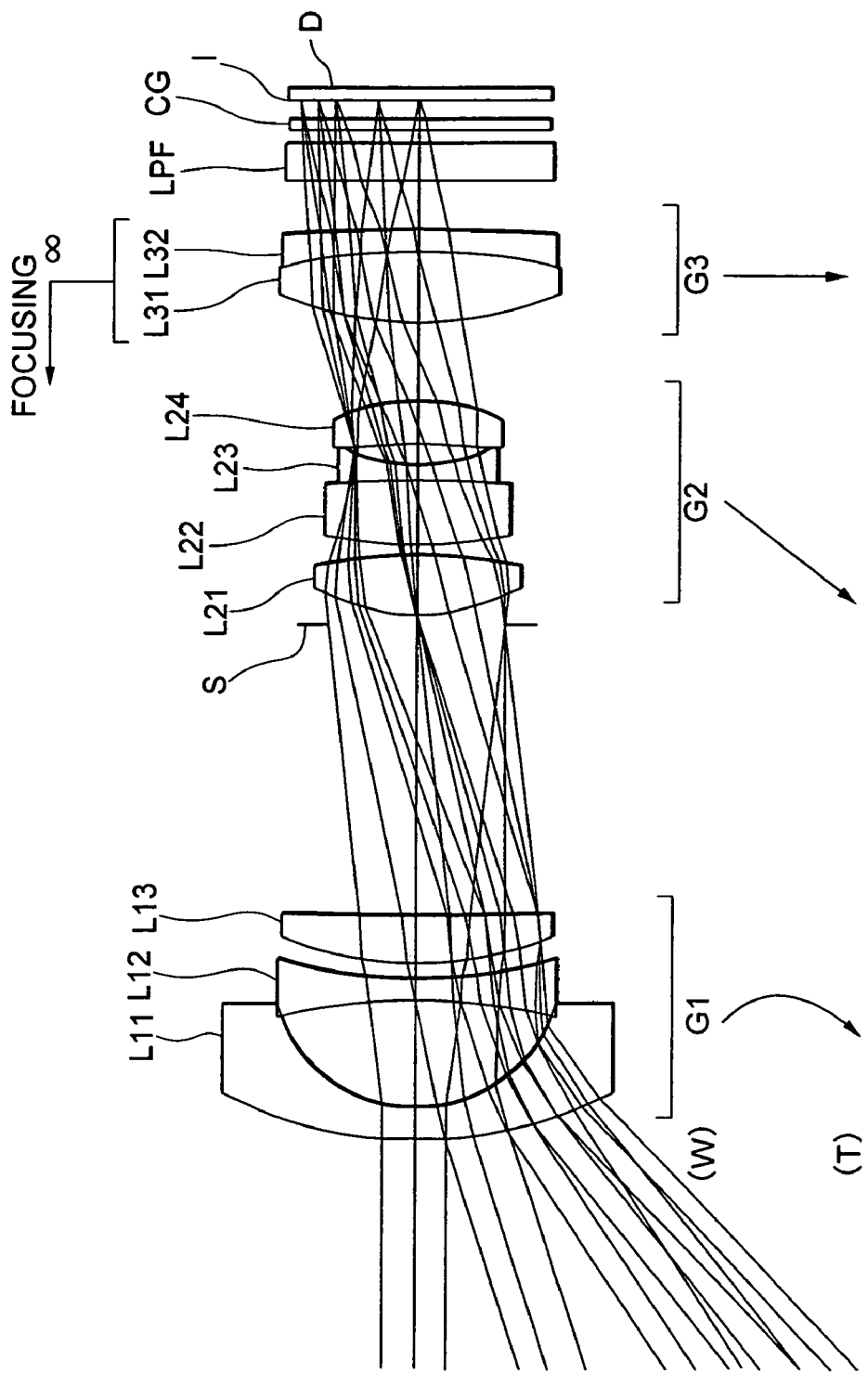
FIG. 50 is a diagram showing a lens configuration of a wide zoom lens system according to Example 8 of the present invention.

FIG. 50 is a diagram showing a lens configuration of a wide zoom lens system according to Example 8 of the present invention.

In FIG. 50, the wide zoom lens system according to Example 8 is composed of, in order from an object, a first lens group G1 having negative refractive power, an aperture stop S, a second lens group G2 having positive refractive power, and a third lens group G3 having positive refractive power. The first lens group G1 is composed of, in order from the object, a negative meniscus lens L11 having convex surface facing to the object, a double concave negative lens L12, and a positive meniscus lens L13 having a convex surface facing to the object. The second lens group G2 is composed of, in order from the object, a double convex positive lens L21, a cemented lens constructed by a double convex positive lens L22 cemented with a double concave negative lens L23, and a positive meniscus lens L24 having concave surface facing to the object. The third lens group G3 is composed of a cemented lens constructed by, in order from the object, a double convex positive lens L31 cemented with a negative meniscus lens L32 having a concave surface facing to the object. The image side surface of the negative meniscus lens L11 in the first lens group G1, both surfaces of the double convex positive lens L21 in the second lens group G2, and the object side surface of the double convex positive lens L31 in the third lens group G3 are composed of respective aspherical surfaces. An optical low-pass filter LPF and a cover glass CG for an imaging device D disposed in the image plane I are arranged between the third lens group G3 and the image plane I.

When a state of lens group positions varies from a wide-angle end state W to a telephoto end state T, the third lens group G3 is fixed relative to the image plane I, and the first lens group G1 and the second lens group G2 are moved. Focusing from infinity to a close object is carried out by moving the third lens group G3 to the object side.

With this construction, a wide angle of view of 78 degrees or more in the wide-angle end state is accomplished with securing high optical performance.

Various values associated with the wide zoom lens system according to Example 8 are listed in Table 8.

TABLE 8

[Specifications]

|     | W     | T     |
| --- | ----- | ----- |
| f = | 6.28  | 12.40 |
| Bf = | 0.99 |       |
| FNO = | 2.04 | 2.89 |
| 2A = | 86.33 | 50.65 |
| y = | 5.70 |       |

[Lens Data]

|    | r | d | νd | nd |
|----|---|---|----|----|
| 1) | 21.0338 | 1.5000 | 45.53 | 1.754000 |
| 2*) | 5.9416 | 5.2000 | | |
| 3) | −28.1184 | 1.0000 | 81.61 | 1.497000 |
| 4) | 22.1020 | 0.8000 | | |
| 5) | 17.1037 | 2.3000 | 32.35 | 1.850260 |
| 6) | 253.0880 | (D1) | | |
| 7> | 0.0000 | 0.5000 | Aperture Stop S | |
| 8*) | 8.9736 | 3.0000 | 59.10 | 1.583320 |
| 9*) | −19.9349 | 0.5000 | | |
| 10) | 21.6625 | 3.2063 | 65.47 | 1.603000 |
| 11) | −55.7030 | 0.8000 | 28.55 | 1.795040 |
| 12) | 7.3512 | 1.0000 | | |
| 13) | −34.8392 | 2.1000 | 81.61 | 1.497000 |
| 14) | −8.9814 | (D2) | | |
| 15*) | 17.9579 | 3.5000 | 59.10 | 1.583320 |
| 16) | −27.1609 | 1.0000 | 22.76 | 1.808090 |
| 17) | −86.6139 | (D3) | | |
| 18) | 0.0000 | 1.7200 | 64.20 | 1.516800 |
| 19) | 0.0000 | 0.7071 | | |
| 20) | 0.0000 | 0.5000 | 64.20 | 1.516800 |
| 21) | 0.0000 | (Bf) | | |

[Aspherical Data]

Surface Number 2

κ = 0.5536
C2 = 0.00000E+00
C4 = −2.18410E−05
C6 = −1.95960E−07
C8 = 1.22630E−08
C10 = −4.59840E−10

Surface Number 8

κ = 0.6024
C2 = 0.00000E+00
C4 = −1.24750E−04
C6 = 1.00080E−07
C8 = 0.00000E+00
C10 = 0.00000E+00

Surface Number 9

κ = −10.3826
C2 = 0.00000E+00
C4 = 1.86130E−05
C6 = 7.55990E−07
C8 = 0.00000E+00
C10 = 0.00000E+00

Surface Number 15

κ = 2.7379
C2 = 0.00000E+00
C4 = 0.00000E+00
C6 = 0.00000E+00
C8 = 0.00000E+00
C10 = 0.00000E+00

[Variable Distances]

|     | W | M | T |
| --- | --- | --- | --- |
| <upon focusing on infinity> | | | |
| R = | ∞ | ∞ | ∞ |
| f = | 6.28000 | 8.20000 | 12.40000 |
| D0 = | ∞ | ∞ | ∞ |
| D1 = | 14.15840 | 8.64853 | 2.54436 |
| D2 = | 3.87203 | 6.60367 | 12.57914 |
| D3 = | 2.43436 | 2.43436 | 2.43436 |
| Bf = | 0.99000 | 0.99000 | 0.99000 |
| <upon focusing on a close object> | | | |
| R = | 500 | 500 | 500 |
| β = | −0.01369 | −0.01777 | −0.02672 |
| D0 = | 449.2115 | 451.9900 | 452.1188 |
| D1 = | 14.15840 | 8.64853 | 2.54436 |
| D2 = | 3.69081 | 6.29856 | 11.89831 |
| D3 = | 2.61558 | 2.73947 | 3.11519 |
| Bf = | 0.99000 | 0.99000 | 0.99000 |

[Values for Conditional Expressions]

| (1A): ν12 = | 81.610 |
| (1B): n12 + 0.007 × ν12 = | 2.068 |
| (2): n11 = | 1.754 |
| (3): n11 + 0.012 × ν11 = | 2.300 |
| (4): f2/f1 = | −1.000 |
| (5): f3/f2 = | 2.069 |
| (6): D23W/f2 = | 0.267 |
| (7): ν13 = | 32.350 |

TABLE 8-continued

| | |
|---|---|
| (8): n13 = | 1.850 |
| (9): f1/r12A = | 0.516 |
| (10A): ν25 = | 81.610 |
| (10B): n25 + 0.007 × ν25 = | 2.068 |
| (11): ν23 = | 28.550 |
| (12): n23 = | 1.795 |

Figure 51:
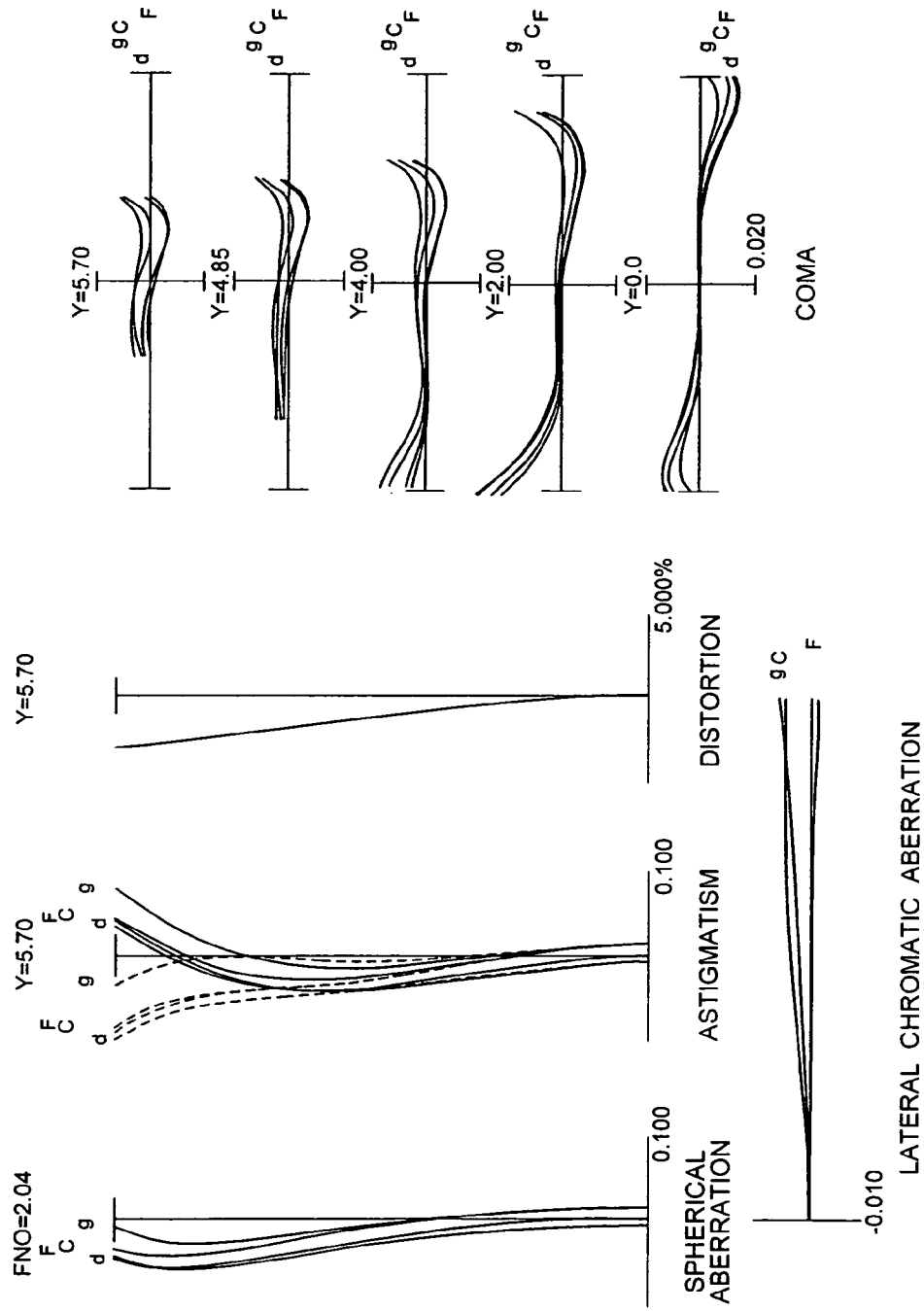
FIG. 51 is graphs showing various aberrations of the wide zoom lens system according to Example 8 of the present invention in the wide-angle end state focusing on infinity.
Figure 52:
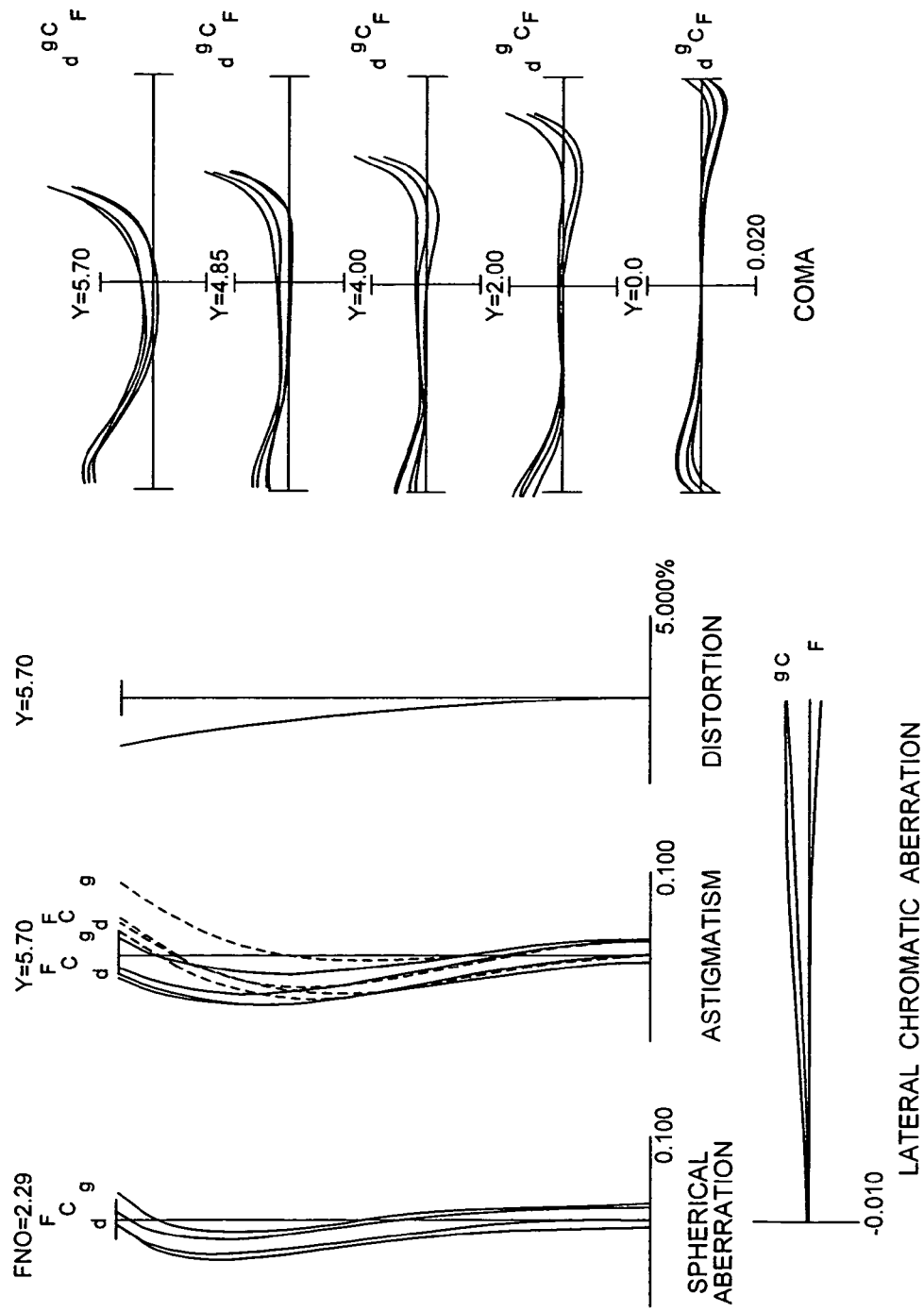
FIG. 52 is graphs showing various aberrations of the wide zoom lens system according to Example 8 of the present invention in the intermediate focal length state focusing on infinity.
Figure 53:
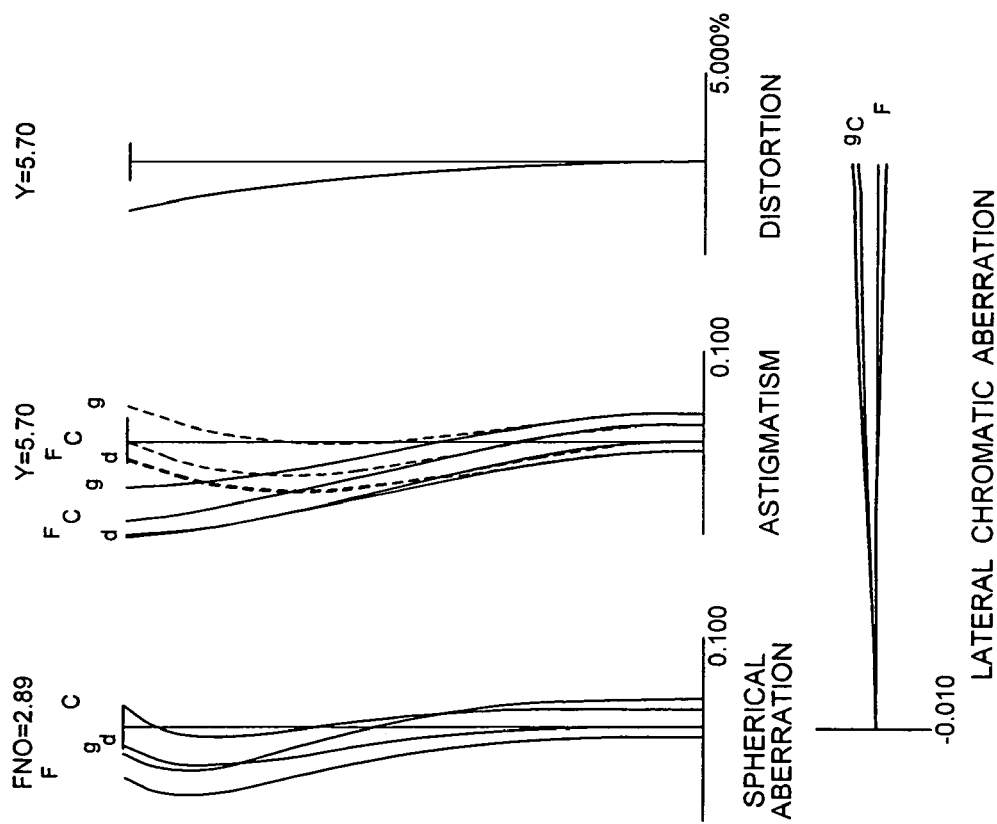
FIG. 53 is graphs showing various aberrations of the wide zoom lens system according to Example 8 of the present invention in the telephoto end state focusing on infinity.
Figure 54:
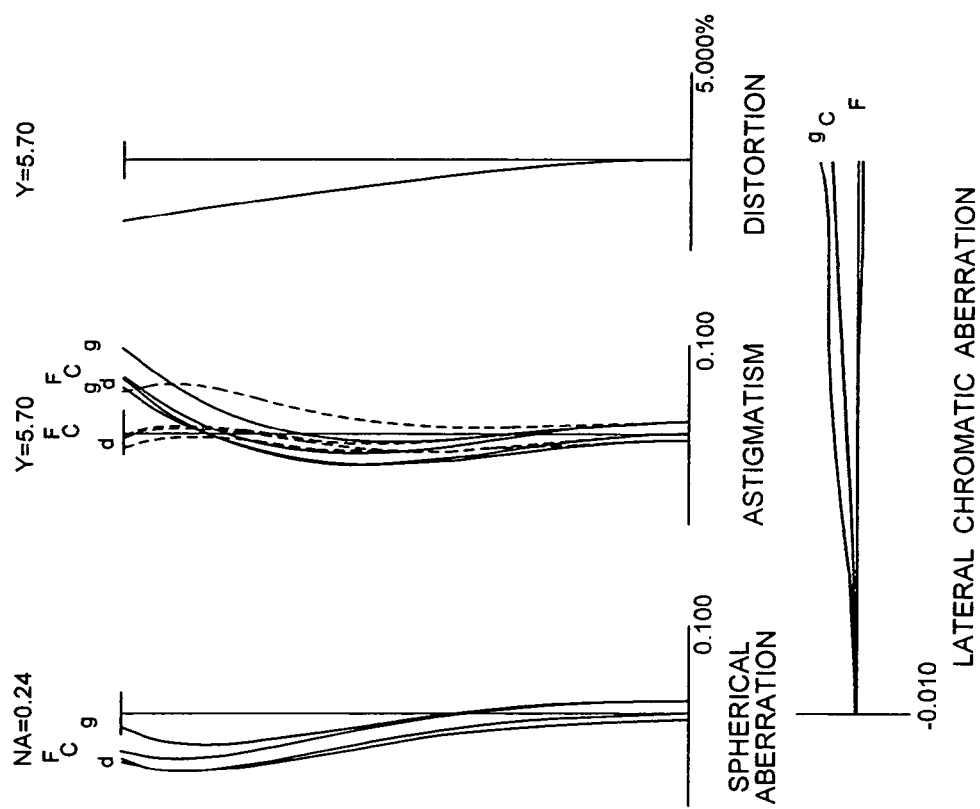
FIG. 54 is graphs showing various aberrations of the wide zoom lens system according to Example 8 of the present invention in the wide-angle end state where the shooting distance R is 500 mm.
Figure 55:
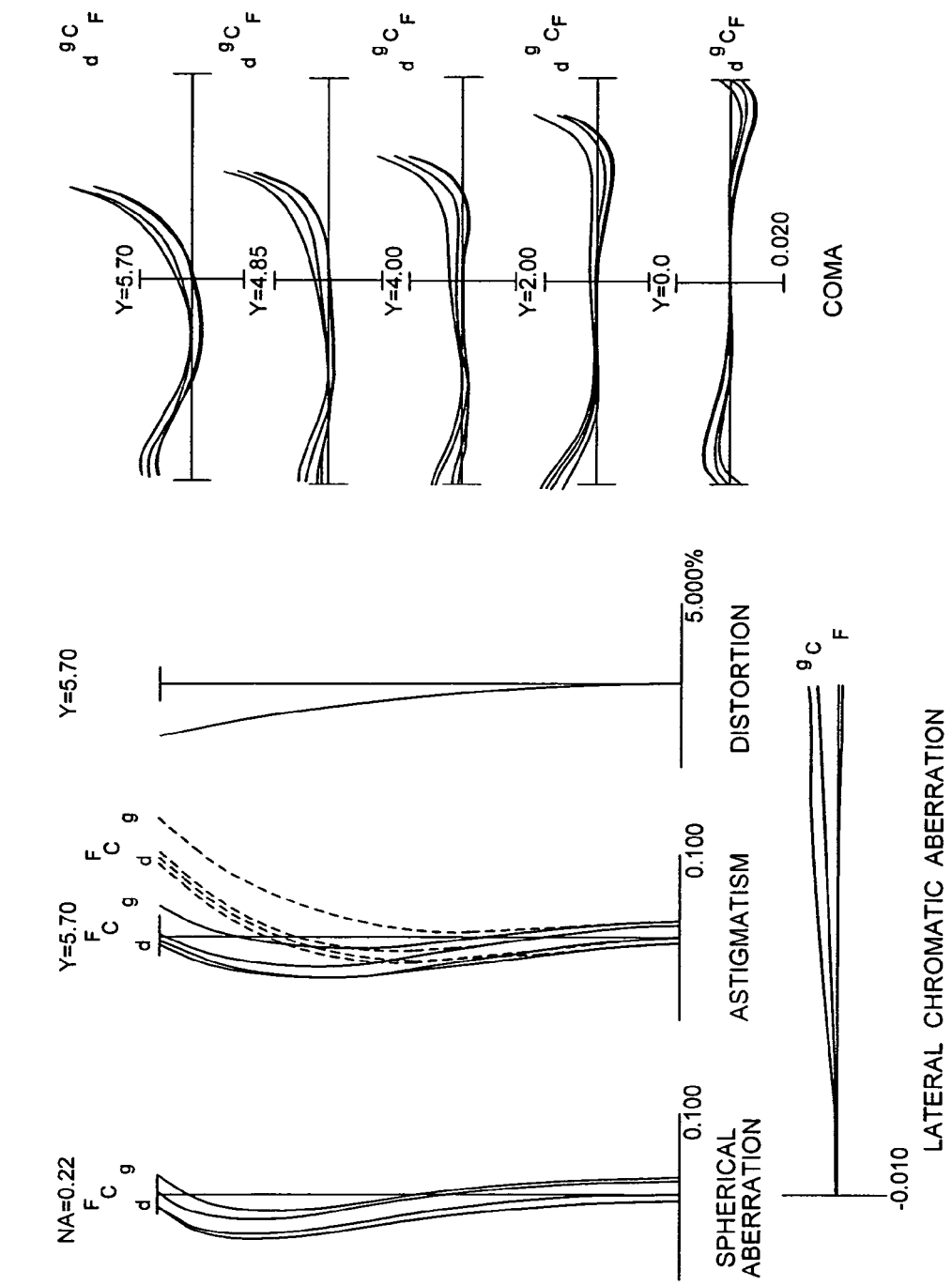
FIG. 55 is graphs showing various aberrations of the wide zoom lens system according to Example 8 of the present invention in the intermediate focal length state where the shooting distance R is 500 mm.
Figure 56:
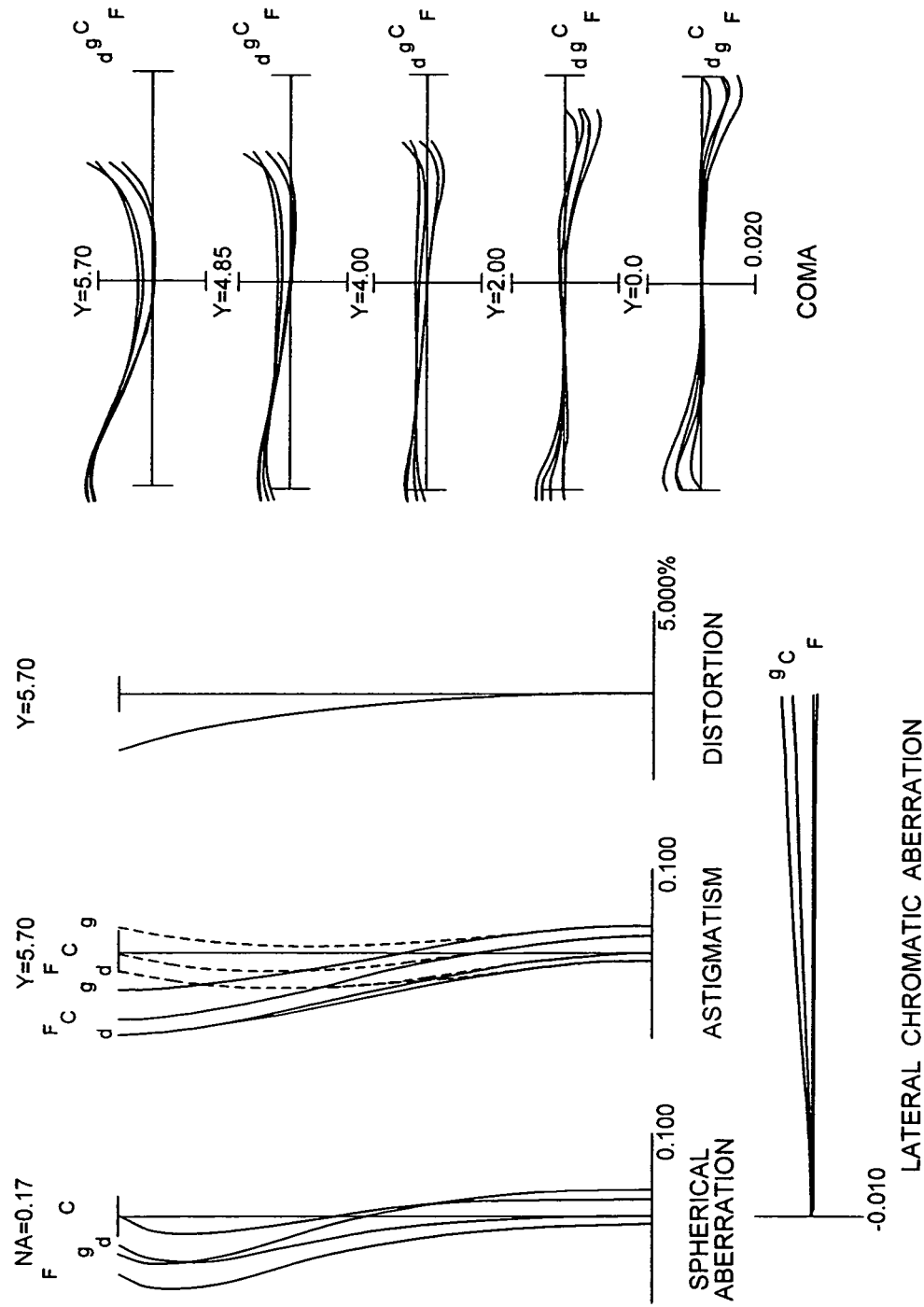
FIG. 56 is graphs showing various aberrations of the wide zoom lens system according to Example 8 of the present invention in the telephoto end state where the shooting distance R is 500 mm.

FIG. 51 is graphs showing various aberrations of the wide zoom lens system according to Example 8 of the present invention in the wide-angle end state focusing on infinity. FIG. 52 is graphs showing various aberrations of the wide zoom lens system according to Example 8 of the present invention in the intermediate focal length state focusing on infinity. FIG. 53 is graphs showing various aberrations of the wide zoom lens system according to Example 8 of the present invention in the telephoto end state focusing on infinity. FIG. 54 is graphs showing various aberrations of the wide zoom lens system according to Example 8 of the present invention in the wide-angle end state where the shooting distance R is 500 mm. FIG. 55 is graphs showing various aberrations of the wide zoom lens system according to Example 8 of the present invention in the intermediate focal length state where the shooting distance R is 500 mm. FIG. 56 is graphs showing various aberrations of the wide zoom lens system according to Example 8 of the present invention in the telephoto end state where the shooting distance R is 500 mm.

As is apparent from the respective graphs, the wide zoom lens system according to Example 8 shows superb optical performance as a result of good corrections to various aberrations in each focal length state from the wide-angle end state to the telephoto end state.

EXAMPLE 9

Figure 57:
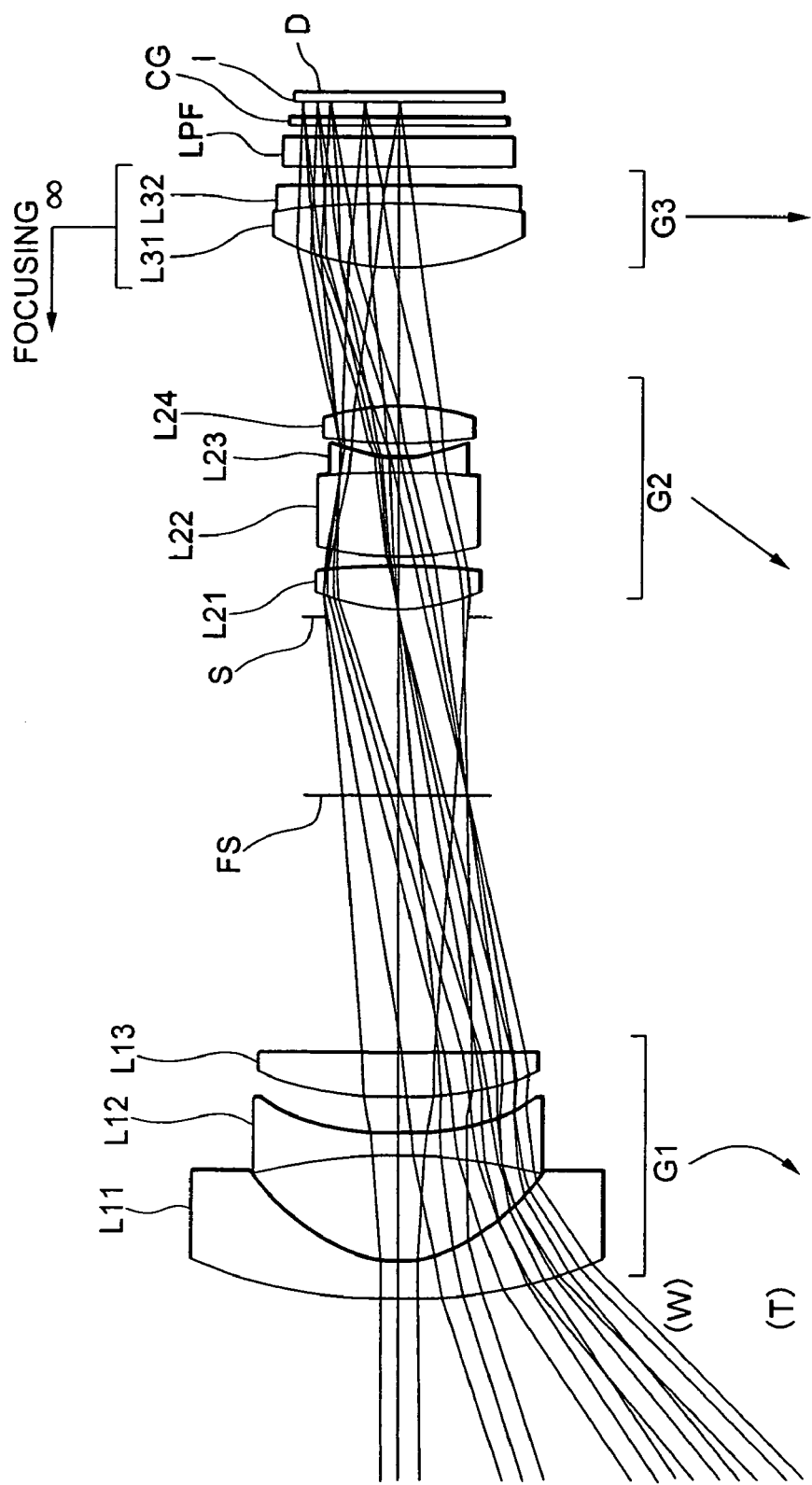
FIG. 57 is a diagram showing a lens configuration of a wide zoom lens system according to Example 9 of the present invention.

FIG. 57 is a diagram showing a lens configuration of a wide zoom lens system according to Example 9 of the present invention.

In FIG. 57, the wide zoom lens system according to Example 9 is composed of, in order from an object, a first lens group G1 having negative refractive power, a flare stopper FS, an aperture stop S, a second lens group G2 having positive refractive power, and a third lens group G3 having positive refractive power. The first lens group G1 is composed of, in order from the object, a negative meniscus lens L11 having convex surface facing to the object, a double concave negative lens L12, and a positive meniscus lens L13 having a convex surface facing to the object. The second lens group G2 is composed of, in order from the object, a double convex positive lens L21, a cemented lens constructed by a double convex positive lens L22 cemented with a double concave negative lens L23, and a double convex positive lens L24. The third lens group G3 is composed of a cemented lens constructed by, in order from the object, a double convex positive lens L31 cemented with a double concave negative lens L32. The image side surface of the negative meniscus lens L11 in the first lens group G1, the object side surface of the double convex positive lens L21 in the second lens group G2, and the object side surface of the double convex positive lens L31 in the third lens group G3 are composed of respective aspherical surfaces. An optical low-pass filter LPF and a cover glass CG for an imaging device D disposed in the image plane I are arranged between the third lens group G3 and the image plane I.

When a state of lens group positions varies from a wide-angle end state W to a telephoto end state T, the third lens group G3 is fixed relative to the image plane I, and the first lens group G1 and the second lens group G2 are moved. Focusing from infinity to a close object is carried out by moving the third lens group G3 to the object side.

With this construction, a wide angle of view of 78 degrees or more in the wide-angle end state is accomplished with securing high optical performance.

Various values associated with the wide zoom lens system according to Example 9 are listed in Table 9.

TABLE 9

[Specifications]

| | W | T |
|---|---|---|
| f = | 6.28 | 21.00 |
| Bf = | 0.99 | |
| FNO = | 2.68 | 5.15 |
| 2A = | 87.30 | 30.34 |
| y = | 5.70 | |

[Lens Data]

| | r | d | νd | nd |
|---|---|---|---|---|
| 1) | 33.2600 | 2.2000 | 45.53 | 1.754000 |
| 2*) | 8.2752 | 6.4000 | | |
| 3) | −36.5301 | 1.3000 | 81.61 | 1.497000 |
| 4) | 16.3217 | 2.2000 | | |
| 5) | 21.4070 | 2.7000 | 32.35 | 1.850260 |
| 6) | 372.1116 | (D1) | | |
| 7) | ∞ | (D2) | Flare Stopper FS | |
| 8> | ∞ | 0.5000 | Aperture Stop S | |
| 9*) | 11.0529 | 2.6000 | 59.10 | 1.583320 |
| 10) | −63.4954 | 0.6000 | | |
| 11) | 18.0254 | 5.1998 | 40.11 | 1.762000 |
| 12) | −46.1146 | 0.9000 | 28.27 | 2.003300 |
| 13) | 8.6064 | 0.9000 | | |
| 14) | 29.3683 | 2.2000 | 81.61 | 1.497000 |
| 15) | −17.4089 | (D3) | | |
| 16*) | 15.4428 | 3.9000 | 57.44 | 1.606020 |
| 17) | −51.2130 | 1.0000 | 23.78 | 1.846660 |
| 18) | 452.1588 | (D4) | | |
| 19) | ∞ | 1.7200 | 64.20 | 1.516800 |
| 20) | ∞ | 0.7640 | | |
| 21) | ∞ | 0.5000 | 64.20 | 1.516800 |
| 22) | ∞ | (Bf) | | |

[Aspherical Data]

Surface Number 2

κ = 0.3333
C4 = 1.41260E−05
C6 = 2.17950E−07
C8 = 5.15730E−11
C10 = 1.61800E−12

Surface Number 9

κ = −0.0149
C4 = 1.69550E−06
C6 = −7.17640E−08
C8 = 3.04410E−09
C10 = −4.19770E−11

Surface Number 16

κ = 1.2219
C4 = −4.70030E−06
C6 = −1.53280E−07
C8 = 1.02090E−08
C10 = −9.81410E−11

[Variable Distances]

| W | M | T |
|---|---|---|

TABLE 9-continued

<upon focusing on infinity>

| | | | |
|---|---|---|---|
| R = | ∞ | ∞ | ∞ |
| f = | 6.28000 | 11.50000 | 21.00000 |
| D0 = | ∞ | ∞ | ∞ |
| D1 = | 15.89963 | 0.34444 | 0.30000 |
| D2 = | 11.03712 | 11.03712 | 2.61574 |
| D3 = | 8.57560 | 17.05747 | 32.49381 |
| D4 = | 1.22320 | 1.22320 | 1.22320 |
| Bf = | 0.99000 | 0.99000 | 0.99000 |

<upon focusing on a close object>

| | | | |
|---|---|---|---|
| R = | 500 | 500 | 500 |
| β = | −0.01426 | −0.02553 | −0.04569 |
| D0 = | 427.4061 | 434.4797 | 427.5089 |
| D1 = | 15.89963 | 0.34444 | 0.30000 |
| D2 = | 11.03712 | 11.03712 | 2.61574 |
| D3 = | 8.38085 | 16.43321 | 30.58245 |
| D4 = | 1.41795 | 1.84746 | 3.13456 |
| Bf = | 0.99000 | 0.99000 | 0.99000 |

[Values for Conditional Expressions]

| | |
|---|---|
| (1A): ν12 = | 81.610 |
| (1B): n12 + 0.007 × ν12 = | 2.068 |
| (2): n11 = | 1.754 |
| (3): n11 + 0.012 × ν11 = | 2.300 |
| (4): f2/f1 = | −1.199 |
| (5): f3/f2 = | 1.604 |
| (6): D23W/f2 = | 0.459 |
| (7): ν13 = | 32.350 |
| (8): n13 = | 1.850 |
| (9): f1/r12A = | 0.427 |
| (10A): ν25 = | 81.610 |
| (10B): n25 + 0.007 × ν25 = | 2.068 |
| (11): ν23 = | 28.270 |
| (12): n23 = | 2.003 |

Figure 58:
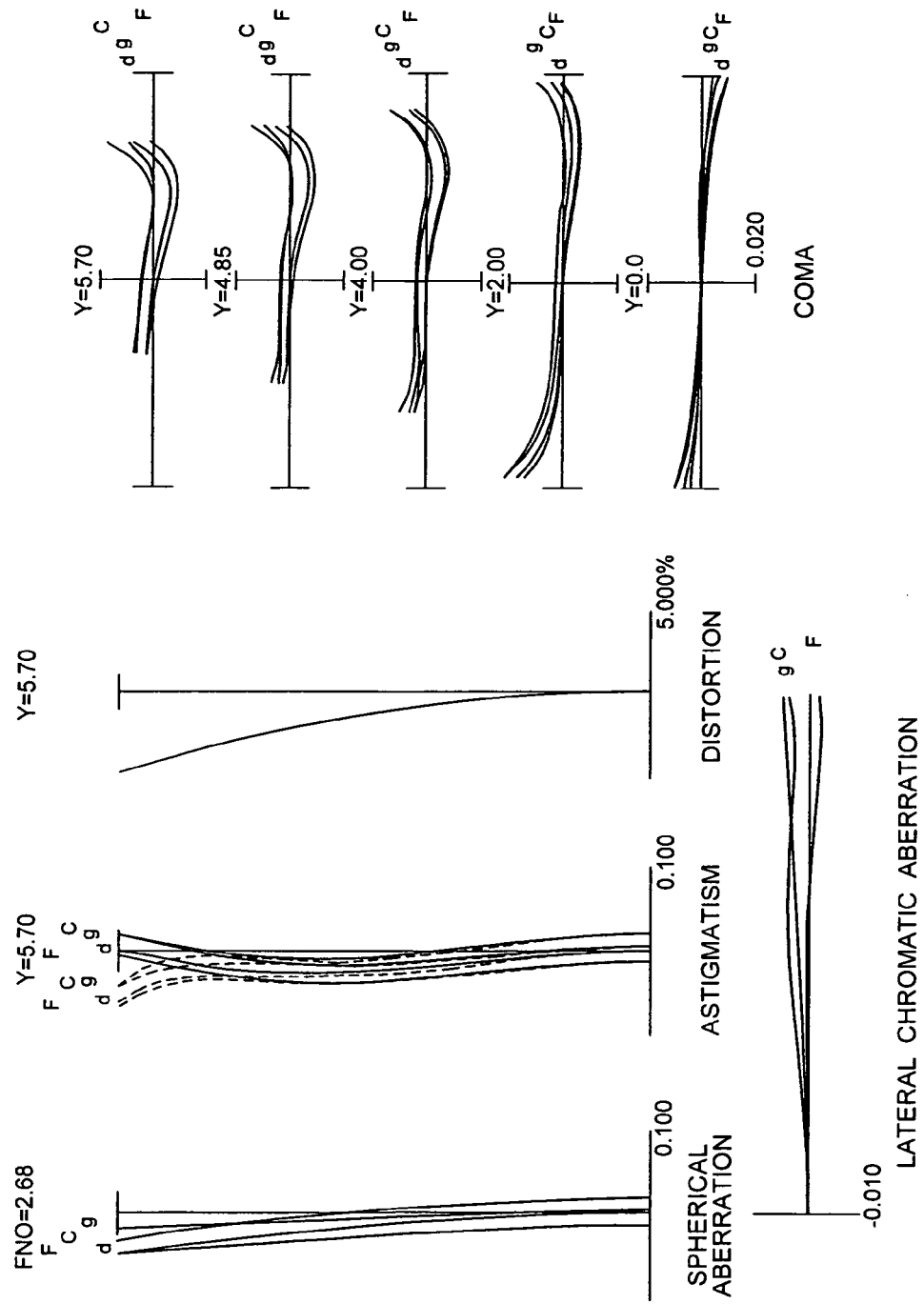
FIG. 58 is graphs showing various aberrations of the wide zoom lens system according to Example 9 of the present invention in the wide-angle end state focusing on infinity.
Figure 59:
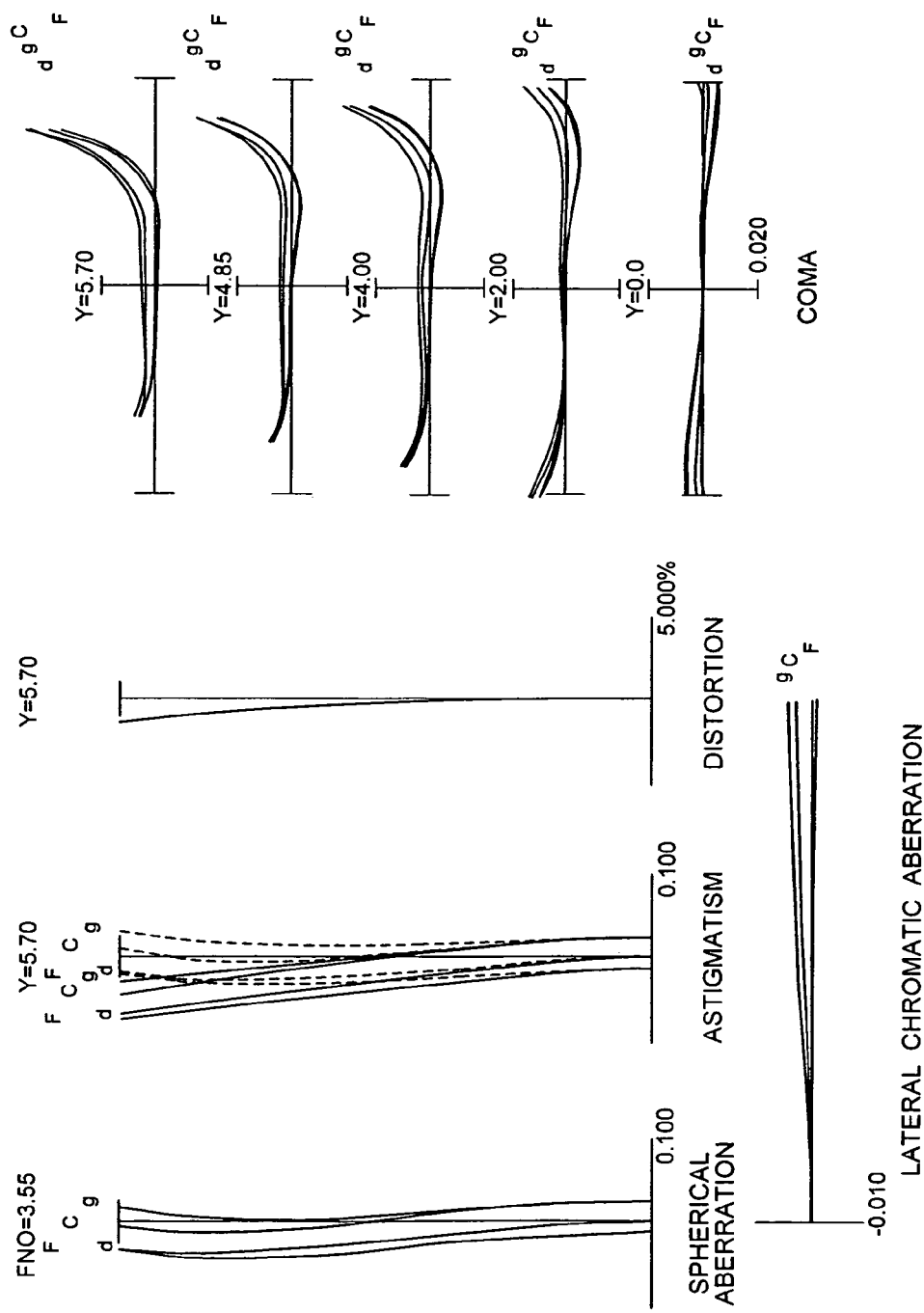
FIG. 59 is graphs showing various aberrations of the wide zoom lens system according to Example 9 of the present invention in the intermediate focal length state focusing on infinity.
Figure 60:
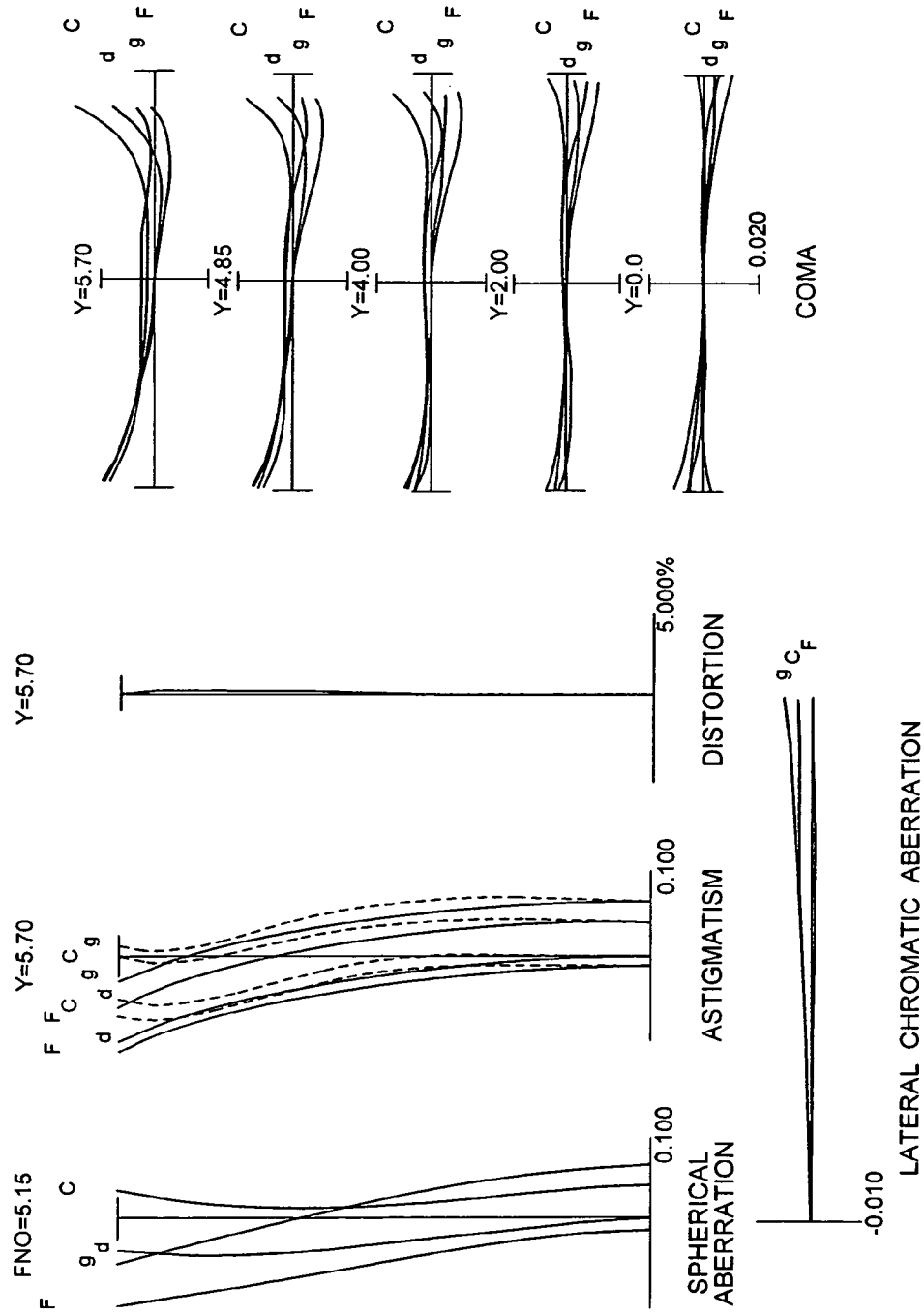
FIG. 60 is graphs showing various aberrations of the wide zoom lens system according to Example 9 of the present invention in the telephoto end state focusing on infinity.
Figure 61:
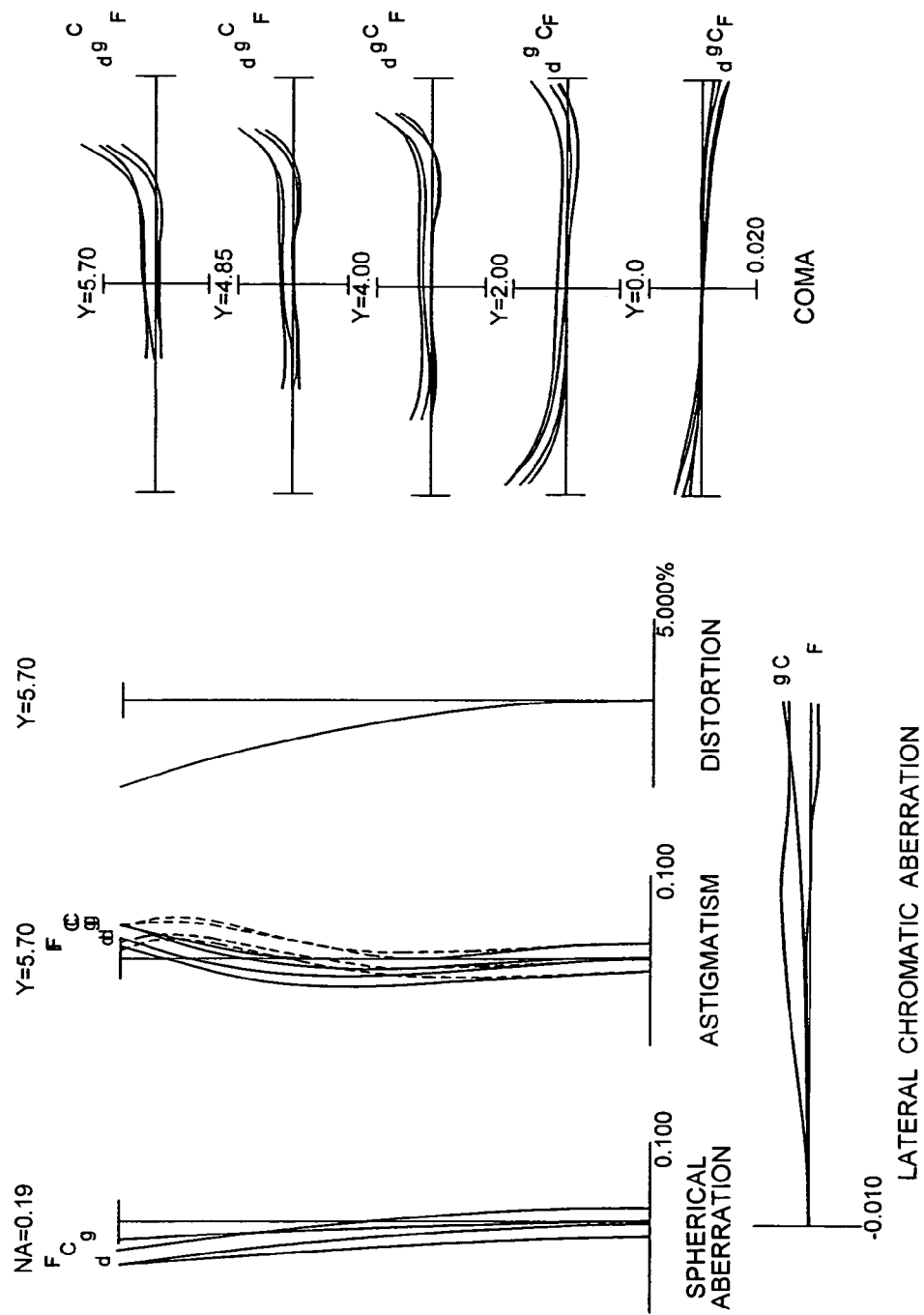
FIG. 61 is graphs showing various aberrations of the wide zoom lens system according to Example 9 of the present invention in the wide-angle end state where the shooting distance R is 500 mm.
Figure 62:
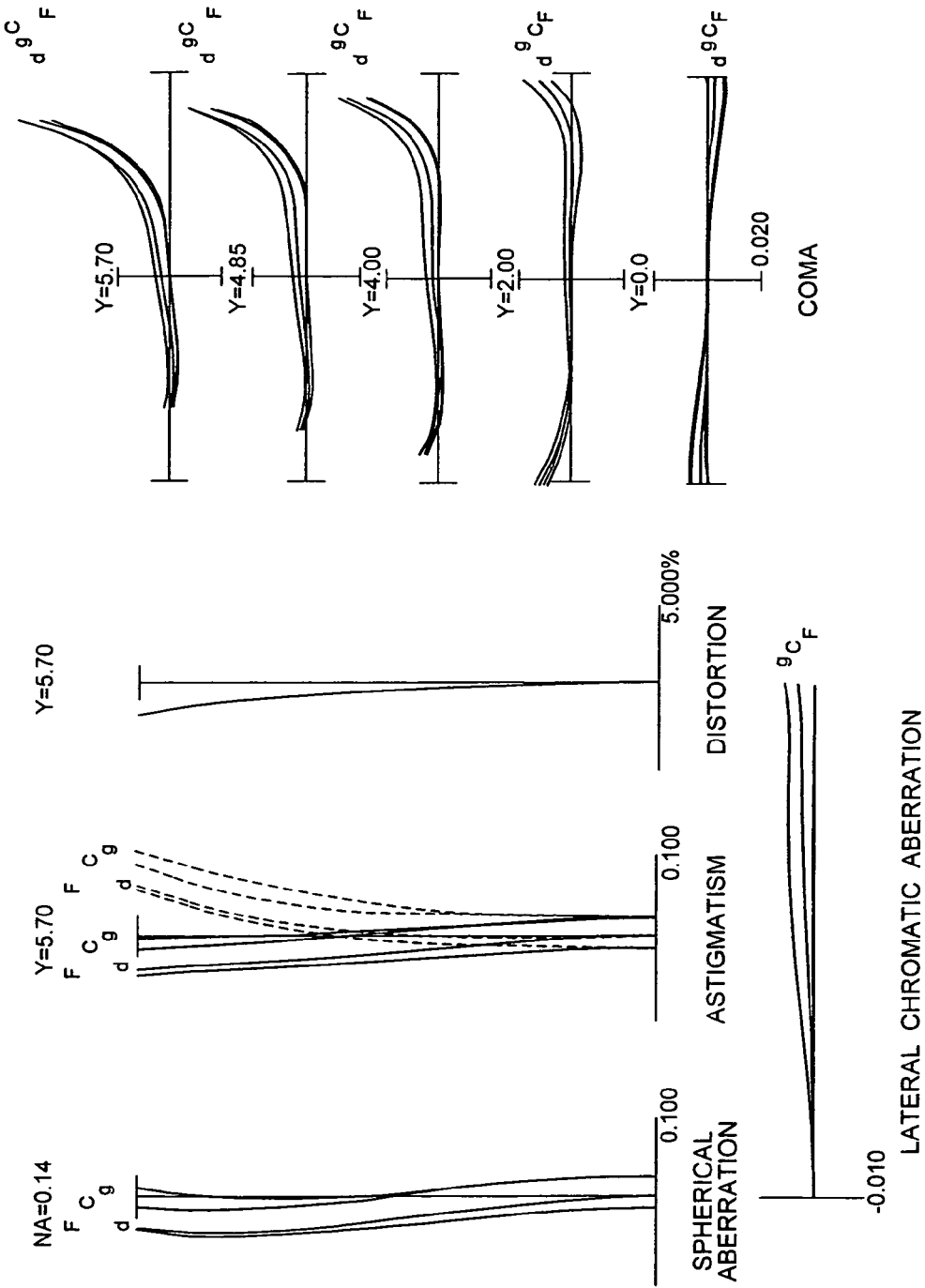
FIG. 62 is graphs showing various aberrations of the wide zoom lens system according to Example 9 of the present invention in the intermediate focal length state where the shooting distance R is 500 mm.
Figure 63:
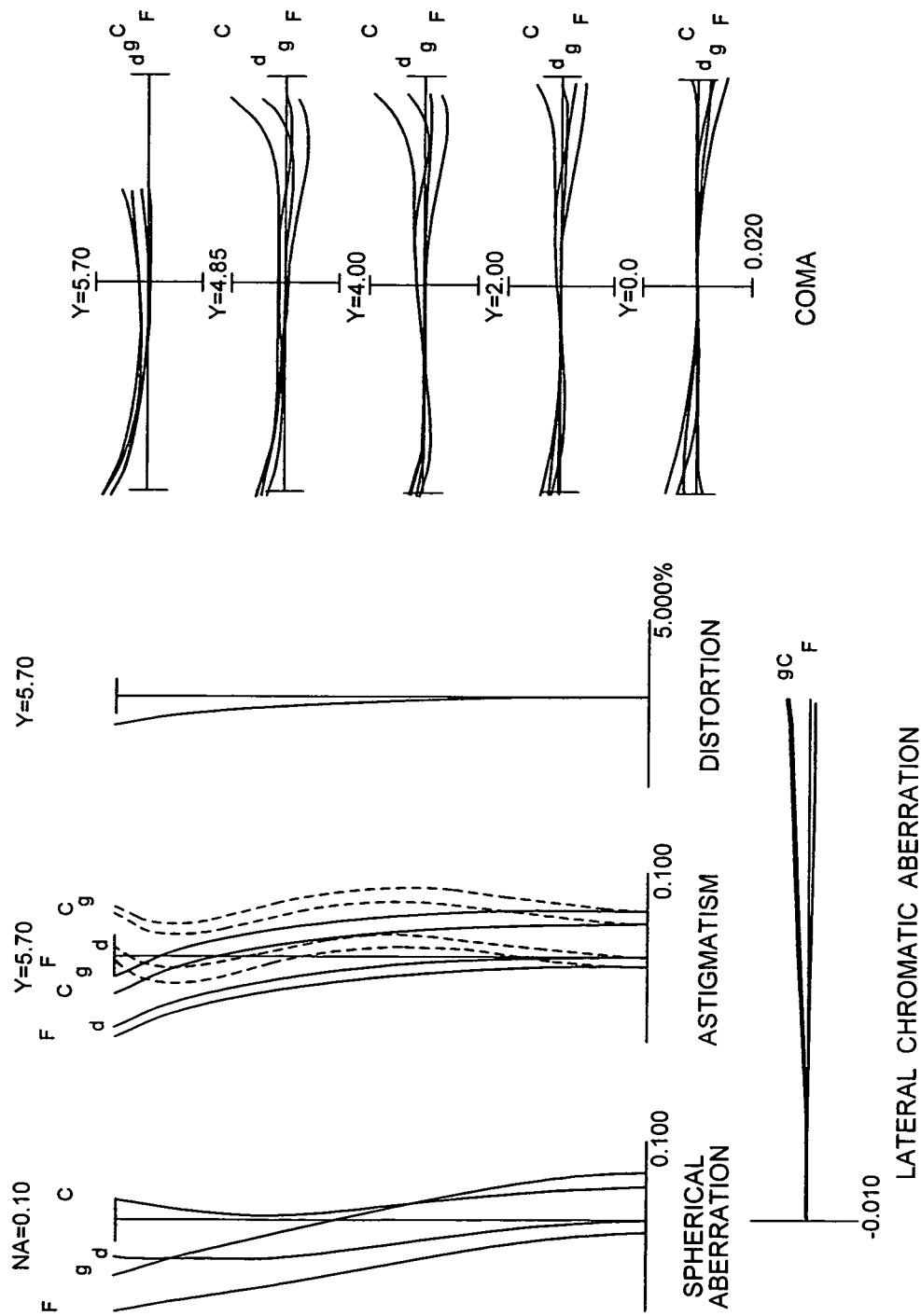
FIG. 63 is graphs showing various aberrations of the wide zoom lens system according to Example 9 of the present invention in the telephoto end state where the shooting distance R is 500 mm.

FIG. 58 is graphs showing various aberrations of the wide zoom lens system according to Example 9 of the present invention in the wide-angle end state focusing on infinity. FIG. 59 is graphs showing various aberrations of the wide zoom lens system according to Example 9 of the present invention in the intermediate focal length state focusing on infinity. FIG. 60 is graphs showing various aberrations of the wide zoom lens system according to Example 9 of the present invention in the telephoto end state focusing on infinity. FIG. 61 is graphs showing various aberrations of the wide zoom lens system according to Example 9 of the present invention in the wide-angle end state where the shooting distance R is 500 mm. FIG. 62 is graphs showing various aberrations of the wide zoom lens system according to Example 9 of the present invention in the intermediate focal length state where the shooting distance R is 500 mm. FIG. 63 is graphs showing various aberrations of the wide zoom lens system according to Example 9 of the present invention in the telephoto end state where the shooting distance R is 500 mm.

As is apparent from the respective graphs, the wide zoom lens system according to Example 9 shows superb optical performance as a result of good corrections to various aberrations in each focal length state from the wide-angle end state to the telephoto end state.

Incidentally, it is needless to say that although wide zoom lens systems with a three-lens-group configuration are shown as respective examples of the present invention, a wide zoom lens system simply added by a lens group to the three-lens-group configuration is included in the spirit or scope of the present invention. Moreover, in the configuration of each lens group, a lens group simply added by lens elements to the lens group shown in examples is included in the spirit or scope of the present invention.

Additional advantages and modification will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A wide zoom lens system comprising, in order from an object:

a first lens group having negative refractive power; and
a second lens group having positive refractive power;
the first lens group including, in order from the object, a negative meniscus lens having a convex surface facing to the object, a negative lens, and a positive lens having a convex surface facing to the object,
the second lens group including, in order from the object, a positive lens, and a negative lens,
the negative meniscus lens in the first lens group having at least one aspherical surface,
the focal length being varied by changing a distance between the first lens group and the second lens group, and
the negative lens in the first lens group satisfying the following conditional expressions:

$$67 < \nu12$$

$$2.05 < n12 + 0.007 \times \nu12$$

where ν12 denotes Abbe number of the negative lens in the first lens group at d-line (λ=587.6 nm), and n12 denotes refractive index of the negative lens in the first lens group at d-line (λ=587.6 nm).

2. The wide zoom lens system according to claim 1, wherein the negative meniscus lens in the first lens group satisfies the following conditional expressions:

$$1.69 < n11 < 1.90$$

$$2.29 < n11 + 0.012 \times \nu11 < 2.39$$

where n11 denotes refractive index of the negative meniscus lens in the first lens group at d-line (λ=587.6 nm), and ν11 denotes Abbe number of the negative meniscus lens in the first lens group at d-line (λ=587.6 nm).

3. The wide zoom lens system according to claim 2, wherein a third lens group having positive refractive power is disposed to the image side of the second lens group, focusing is carried out by moving the third lens group along the optical axis, and the following conditional expressions are satisfied:

$$-1.3 < f2/f1 < -0.9$$

$$1.5 < f3/f2 < 2.5$$

$$0.3 < D23W/f2 < 0.6$$

where f1 denotes the focal length of the first lens group, f2 denotes the focal length of the second lens group, f3 denotes the focal length of the third lens group, and D23W denotes a distance between the second lens group and the third lens group in the wide-angle end state.

4. The wide zoom lens system according to claim 3, wherein the following conditional expressions are satisfied:

$$28 < \nu13 < 35$$

$$1.79 < n13$$

where ν13 denotes Abbe number of the positive lens in the first lens group at d-line (λ=587.6 nm), and n13 denotes refractive index of the positive lens in the first lens group at d-line (λ=587.6 nm).

5. The wide zoom lens system according to claim 2, wherein the following conditional expressions are satisfied:

$$28 < \nu13 < 35$$

$$1.79 < n13$$

where ν13 denotes Abbe number of the positive lens in the first lens group at d-line (λ=587.6 nm), and n13 denotes refractive index of the positive lens in the first lens group at d-line (λ=587.6 nm).

6. The wide zoom lens system according to claim 1, wherein a third lens group having positive refractive power is disposed to the image side of the second lens group, focusing is carried out by moving the third lens group along the optical axis, and the following conditional expressions are satisfied:

$$-1.3 < f2/f1 < -0.9$$

$$1.5 < f3/f2 < 2.5$$

$$0.3 < D23W/f2 < 0.6$$

where f1 denotes the focal length of the first lens group, f2 denotes the focal length of the second lens group, f3 denotes the focal length of the third lens group, and D23W denotes a distance between the second lens group and the third lens group in the wide-angle end state.

7. The wide zoom lens system according to claim 1, wherein the following conditional expressions are satisfied:

$$28 < \nu13 < 35$$

$$1.79 < n13$$

where ν13 denotes Abbe number of the positive lens in the first lens group at d-line (λ=587.6 nm), and n13 denotes refractive index of the positive lens in the first lens group at d-line (λ=587.6 nm).

8. The wide zoom lens system according to claim 1, wherein the following conditional expression is satisfied:

$$0.3 < f1/r12A < 1$$

where f1 denotes the focal length of the first lens group, and r12A denotes a radius of curvature of the object side surface of the negative lens in the first lens group.

9. The wide zoom lens system according to claim 1, wherein the second lens group includes, in order from the object, the positive lens disposed to the most object side, the negative lens, and a positive lens disposed to the most image side, at least one surface of the positive lens disposed to the most object side has an aspherical surface, and the following conditional expressions are satisfied:

$$67 < \nu25$$

$$2.05 < n25 + 0.007 \times \nu25$$

where ν25 denotes Abbe number of the positive lens disposed to the most image side at d-line (λ=587.6 nm), and n25 denotes refractive index of the positive lens disposed to the most image side at d-line (λ=587.6 nm).

10. The wide zoom lens system according to claim 1, wherein the following conditional expressions are satisfied:

$$28 < \nu23 < 42$$

$$1.75 < n23$$

where ν23 denotes Abbe number of the negative lens in the second lens group at d-line (λ=587.6 nm), and n23 denotes refractive index of the negative lens in the second lens group at d-line (λ=587.6 nm).

11. A wide zoom lens system comprising, in order from an object:

a first lens group having negative refractive power;

a second lens group having positive refractive power; and a third lens group having positive refractive power;

the first lens group including, in order from the object, a negative meniscus lens having a convex surface facing to the object, a negative lens, and a positive lens having a convex surface facing to the object, the second lens group including, in order from the object, a positive lens disposed to the most object side, a cemented lens constructed by a positive lens cemented with a negative lens, and a positive lens disposed to the most image side, each of the negative meniscus lens in the first lens group and of the positive lens disposed to the most object side of the second lens group having at least one aspherical surface, the focal length being varied by changing a distance between the first lens group and the second lens group, focusing being carried out by moving the third lens group along the optical axis, and the following conditional expressions being satisfied:

$$1.69 < n11 < 1.90$$

$$67 < \nu12$$

$$2.05 < n12 + 0.007 \times \nu12$$

$$67 < \nu25$$

$$2.05 < n25 + 0.007 \times \nu25$$

where n11 denotes refractive index of the negative meniscus lens in the first lens group at d-line (λ=587.6 nm), ν12 denotes Abbe number of the negative lens in the first lens group at d-line (λ=587.6 nm), n12 denotes refractive index of the negative lens in the first lens group at d-line (λ=587.6 nm), n25 denotes refractive index of the positive lens disposed to the most image side of the second lens group at d-line (λ=587.6 nm), and ν25 denotes Abbe number of the positive lens disposed to the most image side of the second lens group at d-line (λ=587.6 nm).

12. The wide zoom lens system according to claim 11, wherein the following conditional expression is satisfied:

$$0.3 < f1/r12A < 1$$

where f1 denotes the focal length of the first lens group, and r12A denotes a radius of curvature of the object side surface of the negative lens in the first lens group.

13. The wide zoom lens system according to claim 11, wherein the following conditional expressions are satisfied:

$$28 < \nu13 < 35$$

$$1.79 < n13$$

where v13 denotes Abbe number of the positive lens in the first lens group at d-line (λ=587.6 nm), and n13 denotes refractive index of the positive lens in the first lens group at d-line (λ=587.6 nm).

14. A wide zoom lens system comprising, in order from an object:
   a first lens group having negative refractive power; and
   a second lens group having positive refractive power;
   the first lens group including, in order from the object, a negative meniscus lens having a convex surface facing to the object, a negative lens, and a positive lens having a convex surface facing to the object,
   the second lens group including, in order from the object, a positive lens, and a negative lens,
   the negative meniscus lens in the first lens group having at least one aspherical surface,
   the focal length being varied by changing a distance between the first lens group and the second lens group, and
   the following conditional expressions being satisfied:

$67 < v12$ $28 < v13 < 35$ $1.79 < n13$ where v12 denotes Abbe number of the negative lens in the first lens group at d-line (λ=587.6 nm), v13 denotes Abbe number of the positive lens in the first lens group at d-line (λ=587.6 nm), and n13 denotes refractive index of the positive lens in the first lens group at d-line (λ=587.6 nm).

15. The wide zoom lens system according to claim 14, wherein the negative meniscus lens in the first lens group satisfies the following conditional expressions:

$1.69 < n11 < 1.90$ $2.29 < n11 + 0.012 \times v11 < 2.39$ where n11 denotes refractive index of the negative meniscus lens in the first lens group at d-line (λ=587.6 nm), and v11 denotes Abbe number of the negative meniscus lens in the first lens group at d-line (λ=587.6 nm).

16. The wide zoom lens system according to claim 14, wherein a third lens group having positive refractive power is disposed to the image side of the second lens group, focusing is carried out by moving the third lens group along the optical axis, and the following conditional expressions are satisfied:

$-1.3 < f2/f1 < -0.9$ $1.5 < f3/f2 < 2.5$ $0.3 < D23W/f2 < 0.6$ where f1 denotes the focal length of the first lens group, f2 denotes the focal length of the second lens group, f3 denotes the focal length of the third lens group, and D23W denotes a distance between the second lens group and the third lens group in the wide-angle end state.

17. The wide zoom lens system according to claim 14, wherein the following conditional expression is satisfied:

$0.3 < f1/r12A < 1$ where f1 denotes the focal length of the first lens group, and r12A denotes a radius of curvature of the object side surface of the negative lens in the first lens group.

18. A method for forming an image of an object and varying a focal length, comprising the steps of:
   providing a wide zoom lens that includes, in order from the object, a first lens group having negative refractive power, and a second lens group having positive refractive power,
      the first lens group including, in order from the object, a negative meniscus lens having a convex surface facing to the object, a negative lens, and a positive lens having a convex surface facing to the object, the negative meniscus lens in the first lens group having at least one aspherical surface, and
      the second lens group including, in order from the object, a positive lens and a negative lens; and
   varying the focal length of the wide zoom lens by changing a distance between the first lens group and the second lens group, and
   wherein the following conditional expressions are satisfied:

$67 < v12$ $2.05 < n12 + 0.007 \times v12$ where v12 denotes Abbe number of the negative lens in the first lens group at d-line (λ=587.6 nm), and n12 denotes refractive index of the negative lens in the first lens group at d-line (λ=587.6 nm).

19. The method according to claim 18, wherein the following conditional expressions are satisfied:

$1.69 < n11 < 1.90$ $2.29 < n11 + 0.012 \times v11 < 2.39$ where n11 denotes refractive index of the negative meniscus lens in the first lens group at d-line (λ=587.6 nm), and v11 denotes Abbe number of the negative meniscus lens in the first lens group at d-line (80 =587.6 nm).

20. A method for forming an image of an object and varying a focal length, comprising the steps of:
   providing a wide zoom lens that includes, in order from the object, a first lens group having negative refractive power, and a second lens group having positive refractive power,
      the first lens group including, in order from the object, a negative meniscus lens having a convex surface facing to the object, a negative lens, and a positive lens having a convex surface facing to the object, the negative meniscus lens in the first lens group having at least one aspherical surface, and
      the second lens group including, in order from the object, a positive lens and a negative lens; and
   varying the focal length of the wide zoom lens by changing a distance between the first lens group and the second lens group,
   wherein the following conditional expressions are satisfied:

$67 < v12$ $28 < v13 < 35$ $1.79 < n13$ where 84 12 denotes Abbe number of the negative lens in the first lens group at d-line (84 =587.6 nm), v13 denotes Abbe number of the positive lens in the first lens group at d-line (λ=587.6 nm), and n13 denotes refractive index of the positive lens in the first lens group at d-line (λ=587.6 nm).

21. The method according to claim 20, wherein the following conditional expressions are satisfied:

$67 < \nu 12$ $28 < \nu 13 < 35$ $1.79 < n13$ where ν12 denotes Abbe number of the negative lens in the first lens group at d-line (λ=587.6 nm), denotes Abbe number of the positive lens in the first lens group at d-line (ν=587.6 nm), and n13 denotes refractive index of the positive lens in the first lens group at d-line (ν=587.6 nm).

* * * * *